United States Patent
Garner et al.

(10) Patent No.: US 10,779,461 B2
(45) Date of Patent: Sep. 22, 2020

(54) METERING MEMBER AND METHOD OF MOUNTING THE SAME

(71) Applicant: Deere & Company, Moline, IL (US)

(72) Inventors: Elijah B. Garner, Bettendorf, IA (US); Stanley R. Borkgren, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 97 days.

(21) Appl. No.: 15/995,541

(22) Filed: Jun. 1, 2018

(65) Prior Publication Data

US 2019/0364717 A1    Dec. 5, 2019

(51) Int. Cl.
| | | |
|---|---|---|
| *A01C 7/10* | (2006.01) | |
| *A01C 7/08* | (2006.01) | |
| *A01C 7/12* | (2006.01) | |
| *A01C 7/20* | (2006.01) | |
| *A01C 19/02* | (2006.01) | |

(52) U.S. Cl.
CPC .............. *A01C 7/105* (2013.01); *A01C 7/082* (2013.01); *A01C 7/128* (2013.01); *A01C 7/201* (2013.01); *A01C 19/02* (2013.01)

(58) Field of Classification Search
CPC ........... A01C 7/105; A01C 7/102; A01C 7/10; A01C 7/08; A01C 7/00; A01C 7/082; A01C 7/081; A01C 7/128; A01C 7/127; A01C 7/12; A01C 7/201; A01C 7/20; A01C 19/02; A01C 19/00
See application file for complete search history.

(56) References Cited

U.S. PATENT DOCUMENTS

| | | |
|---|---|---|
| 6,247,418 B1 | 6/2001 | Dunham |
| 2016/0255768 A1* | 9/2016 | Garner ................... A01C 7/128 |

OTHER PUBLICATIONS

European Search Report for European Patent Application No. EP 19171450.0 dated Oct. 17, 2019 in 9 pages.

* cited by examiner

*Primary Examiner* — Christopher J. Novosad
(74) *Attorney, Agent, or Firm* — Michael Best & Friedrich LLP

(57) ABSTRACT

A seed metering system for metering a plurality of seeds includes a meter housing having a first side and a second side. A seed inlet is positioned at the first side and an aperture is positioned at the second side. The seed metering system further includes a hub mounted within the aperture, a retaining member located at the hub, and a metering member positioned on the hub. The metering member compressively engages the retaining member.

12 Claims, 53 Drawing Sheets

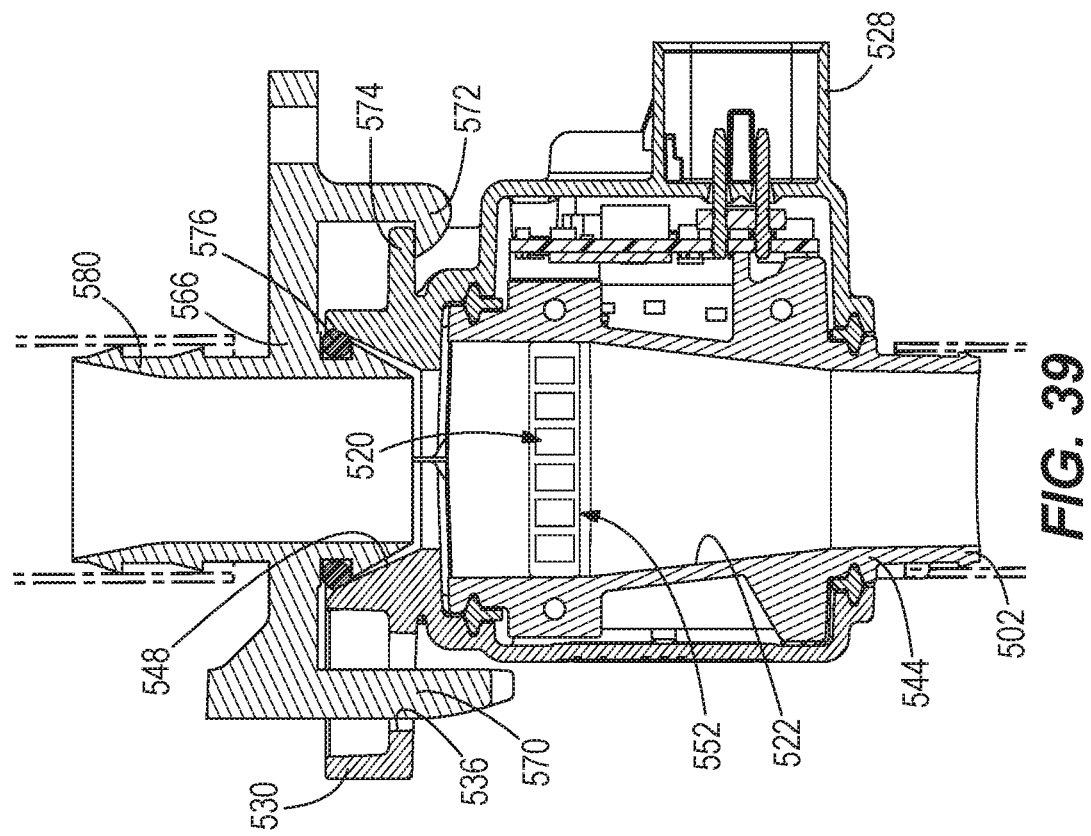
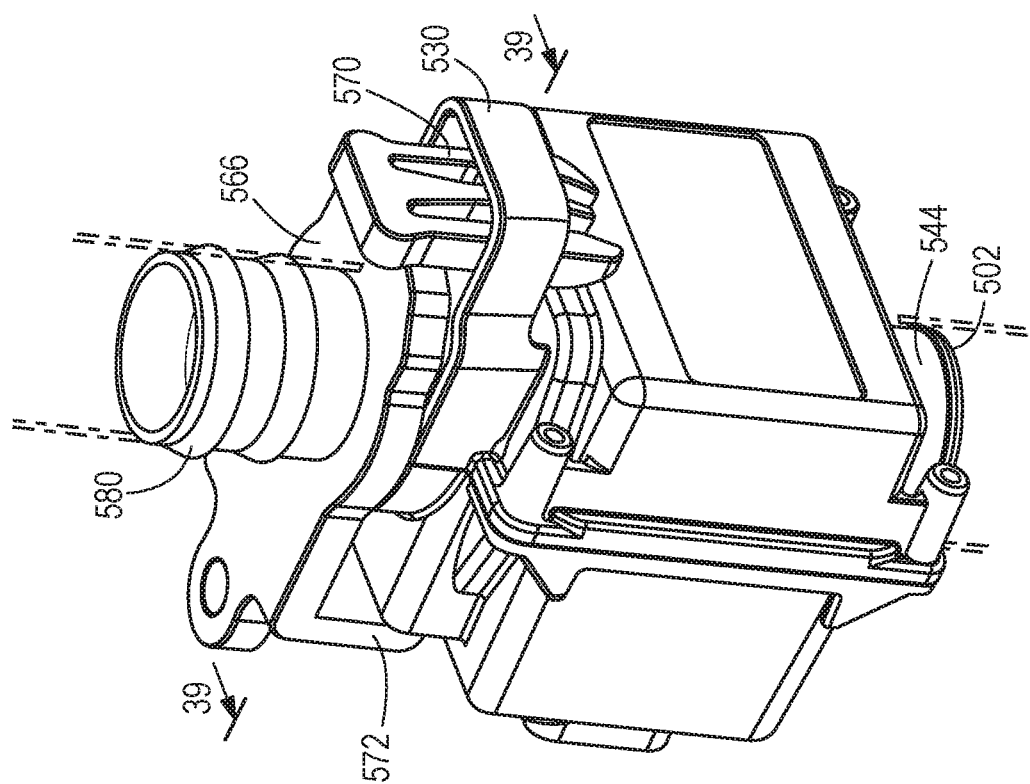
FIG. 39
FIG. 38

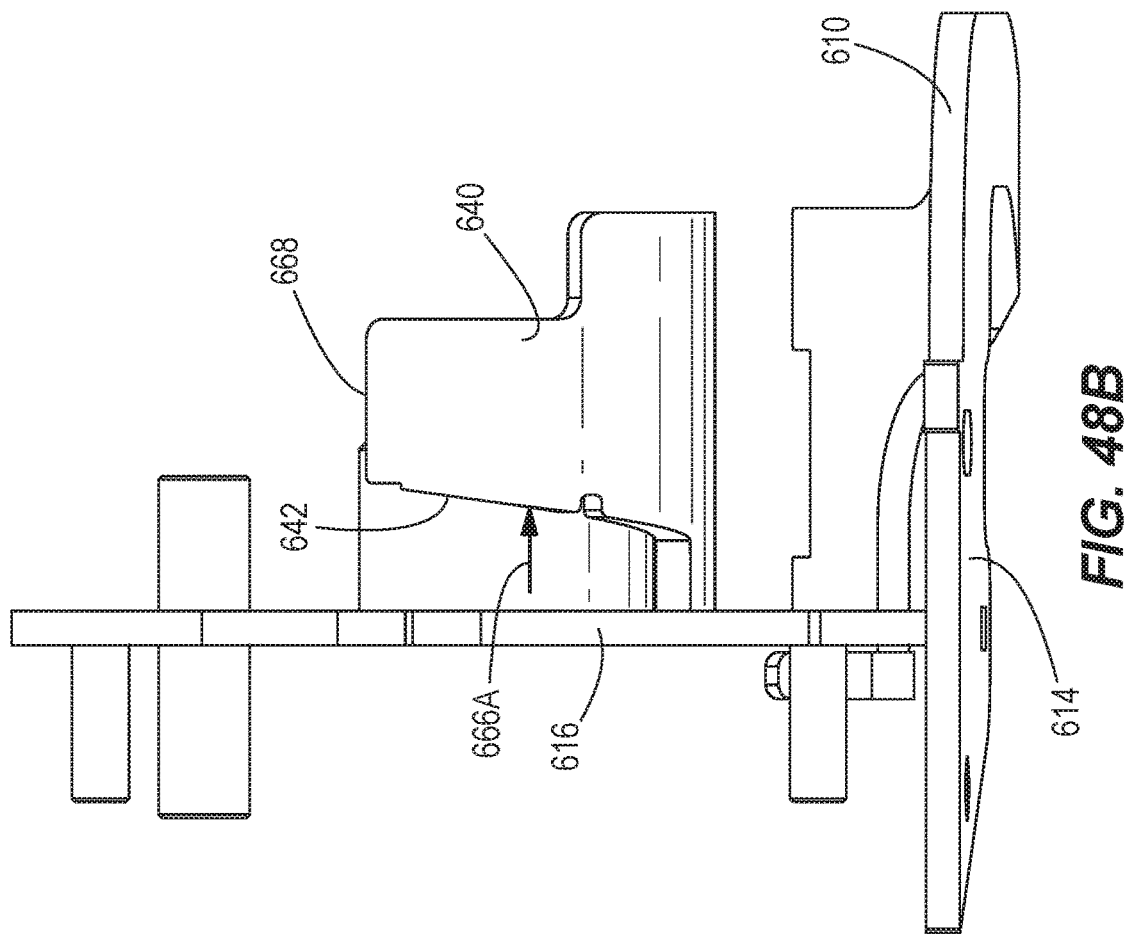
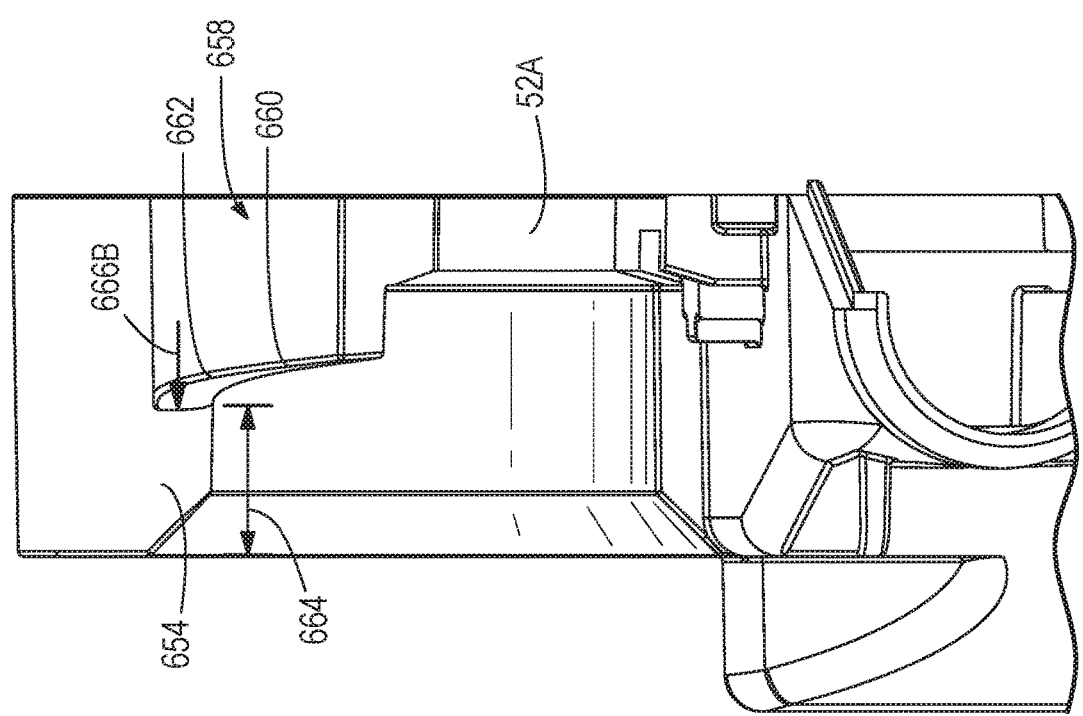
FIG. 48B
FIG. 48A

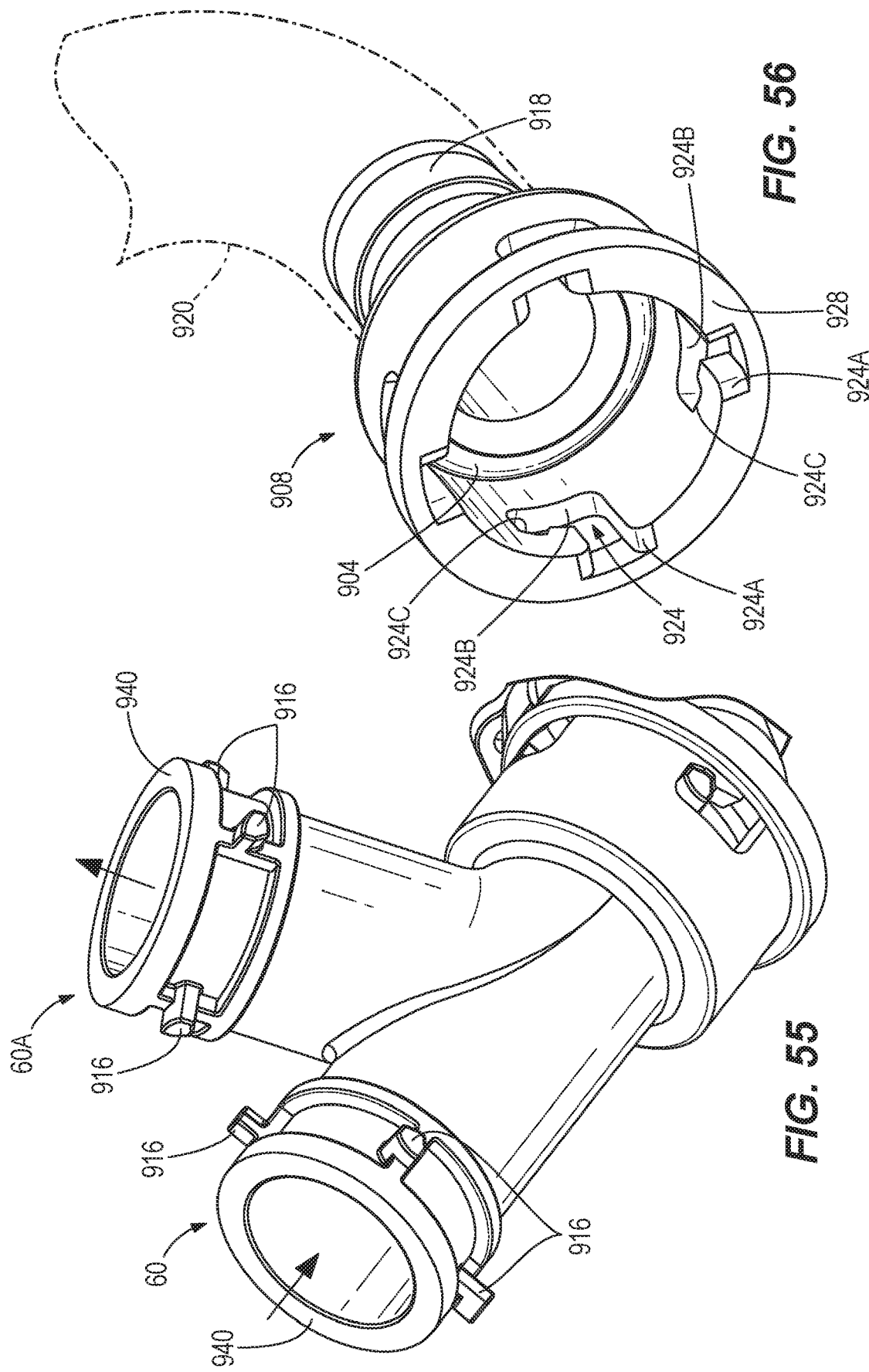

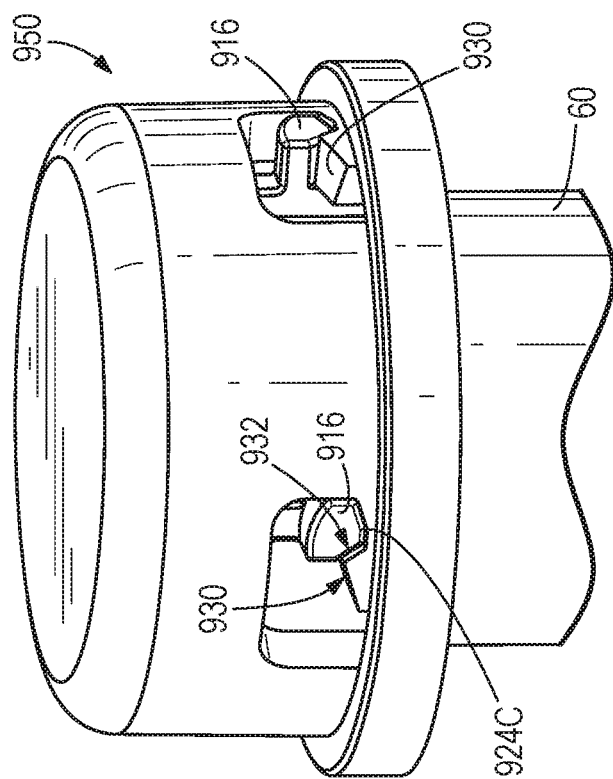
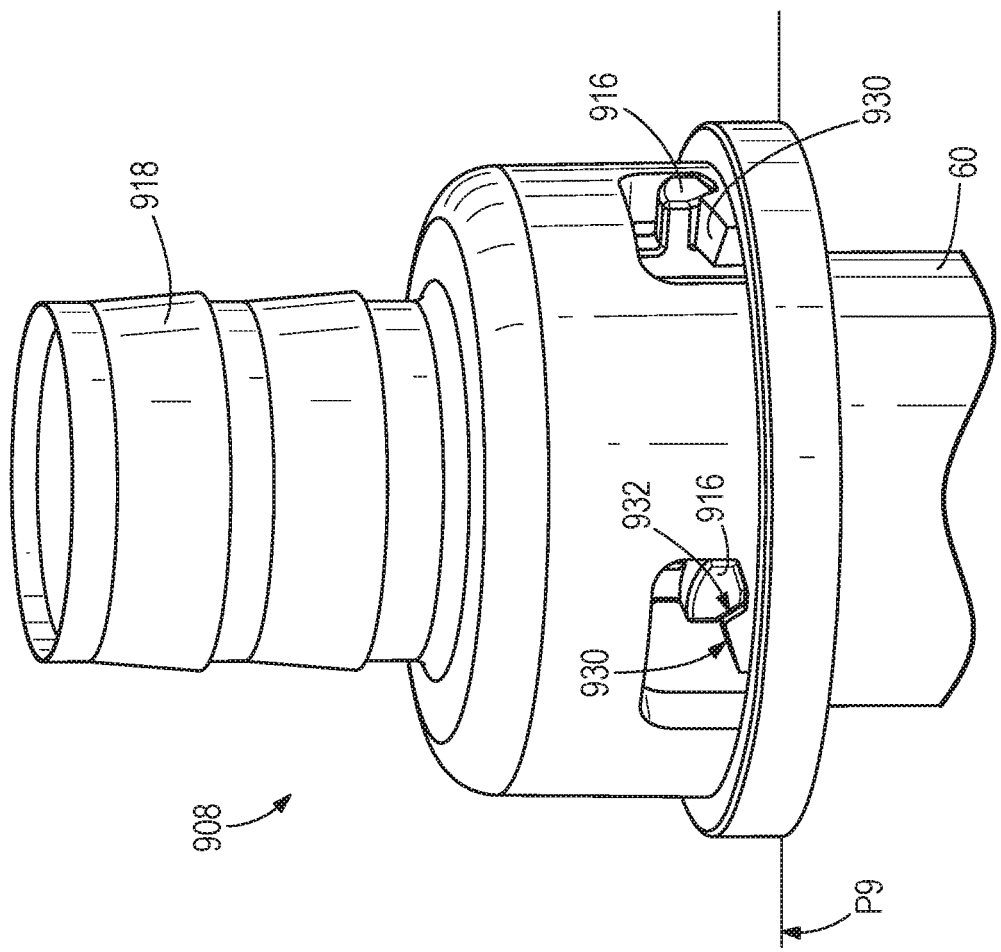

METERING MEMBER AND METHOD OF MOUNTING THE SAME

BACKGROUND

The present disclosure relates to a seeding system and more particularly to a seed meter having a metering member and a singulator for singulating a plurality of seeds.

SUMMARY

Current seeding practices tend to involve one of two types of seeding systems: planters and air seeders. Planters generally singulate or individually meter seeds prior to planting and are generally used to disperse seeds where precise placement is required for maximum yield and the seeding rate permits use of singulating technologies. Air seeders generally meter seeds volumetrically and are generally used in high rate seeding applications and where precise seed placement is of less importance or not practical due to the high rates.

The invention provides a seed metering system for metering a plurality of seeds. The seed metering system includes a meter housing having a first side and a second side. A seed inlet is positioned at the first side and an aperture is positioned at the second side. The seed metering system further includes a hub mounted within the aperture, a retaining member located at the hub, and a metering member positioned on the hub. The metering member compressively engages the retaining member.

The invention further provides a method of mounting a metering member to a hub within a meter housing. An aperture of the metering member is placed over a head of the hub. A retaining member is compressed within the aperture of the metering member. The retaining member is partially decompressed after a smallest diameter portion of the aperture passes over the retaining member.

The invention further provides a metering member for installation in a meter housing of a seeding system. The metering member includes a plate defined by a first side, a second side opposite the first side, and an axial thickness defined therebetween, a plurality of seed openings extending from the first side to the second side, and a central aperture defining an axis of rotation and having a varied diameter from the first side to the second side of the seed meter disk.

Other features and aspects of the disclosure will become apparent by consideration of the following detailed description and accompanying drawings.

BRIEF DESCRIPTION OF THE DRAWINGS

FIG. 38 is a perspective view of the seed sensor, including an optional snap-on adapter for in-line mounting.

FIG. 39 is a cross-section of the seed sensor, taken along line 39-39 of FIG. 38.

FIG. 48A is a partial side view of the seed side of the seed disk housing illustrating the mounting bracket mating surface.

FIG. 48B is a partial side view of the mounting bracket illustrating the seed disk housing mating surface.

FIG. 55 is a perspective view of a pair of seed port connectors of the seed meter according to one embodiment of the disclosure.

FIG. 56 is a perspective view of a hose connector piece operable with one of the seed port connectors of FIG. 55 to form a tool-less quick-connect coupling.

FIG. 57 is a side view of the attached quick-connect coupling.

FIG. 58 is a side view of an alternate embodiment of the quick-connect coupling in which the second connector piece is a plug rather than a conduit for hose attachment.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
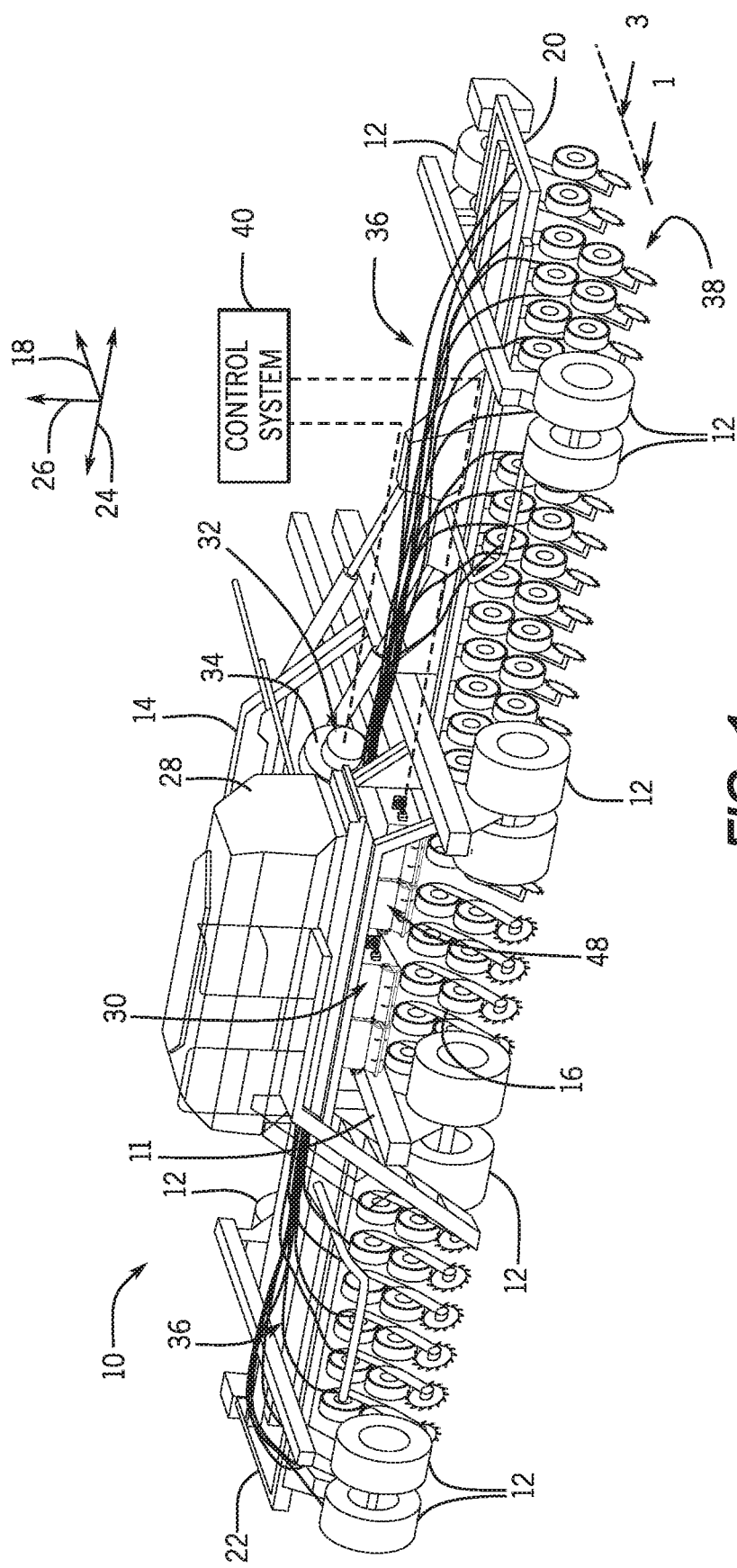
FIG. 1 is a perspective view of a vehicle having a plurality of seed meters.

FIG. 1 illustrates a work vehicle 10 according to example embodiments of the present disclosure. The work vehicle 10 may be towed by another vehicle, such as a tractor. Thus, the work vehicle 10 may be a towed work vehicle. In other embodiments, the work vehicle 10 of the present disclosure may be a self-propelled vehicle. In some embodiments, the work vehicle 10 may be an air cart or air seeder. It will be appreciated that the illustrated work vehicle 10 is an example embodiment. One or more features of the present disclosure may be included on a different work vehicle, such as a planter, a commodity cart, or other work vehicle without departing from the scope of the present disclosure.

The work vehicle 10 includes a front end 14 and a rear end 16, and a fore-aft axis 18 extends generally between the front and rear ends 14, 16. The work vehicle 10 also includes a first side 20 and a second side 22, and a lateral axis 24 extends generally between the first and second sides 20, 22. A vertical axis 26 extends perpendicular to both the fore-aft axis 18 and the lateral axis 24.

Generally, the work vehicle 10 may include a chassis 11 and a plurality of wheels 12. The chassis 11 may be a rigid frame that supports the components described in detail below. The wheels 12 may support the chassis 11 and enable movement of the vehicle 10 across the field.

The work vehicle 10 may also include one or more commodity containers 28. The container 28 may be supported on the chassis 11 and disposed proximate the rear end 16. Also, in some embodiments, the container 28 may be disposed centrally between the first side 20 and the second side 22. The commodity container 28 may contain seed, fertilizer, and/or another particulate or granular commodity.

Additionally, the work vehicle 10 may include a metering system 30. The metering system 30 may be a volumetric metering system. The metering system 30 may be disposed generally underneath the commodity container 28 in some embodiments. As such, particles of the commodity within the container 28 may fall due to gravity toward the metering system 30. The metering system 30 may operate to meter out the commodity from the container 28 at a controlled rate as the vehicle 10 moves across the field.

The work vehicle 10 may also include an airflow system 32. The airflow system 32 may include a fan 34 that generates a flow of air. The airflow system 32 may also include a plurality of airflow structures (e.g., plenums, tubes, lines, etc.) that receive the air blowing from the fan 34. Particles of the commodity (metered out by the metering system 30) may fall into the air stream and may flow to a distribution system 36. The distribution system 36 may include a plurality of hoses, lines, or other conduits that extend to different areas of the vehicle 10 along the lateral axis 24. The particles of the commodity may be propelled by the airstream through the distribution system 36, to a plurality of individual row units 45 and to the soil. Each row unit 45 of the vehicle 10 may include a seed meter 44 for singulating the commodity (e.g., seeds) and a ground system 38 with openers, tillers or other similar implements that prepare the soil for delivery of the seed, fertilizer, or other commodity delivered by the distribution system 36.

Moreover, the work vehicle 10 may include a control system 40. The control system 40 may be in communication with and may be configured for controlling the metering system 30, the airflow system 32, and/or other components of the work vehicle 10. The control system 40 may be wholly supported on the work vehicle 10, or the control system 40 may include components that are remote from the vehicle 10. The control system 40 may be in electronic, hydraulic, pneumatic, mechanical, or other communication with the metering system 30, the airflow system 32, etc. In some embodiments, the control system 40 may be in communication with actuators, sensors, and/or other components of the work vehicle 10.

During operation of the work vehicle 10 (e.g., when towed by a tractor or other towing vehicle across a field), the commodity may fall from the container 28 toward the metering system 30. The control system 40 may control the metering system 30 (e.g., by controlled actuation of a drive unit), which allows a controlled quantity of particles to pass into the airflow system 32 at a predetermined rate. The control system 40 may also control the fan 34 for generating a continuous airstream that blows through the airflow system 32, receives the particles metered out from the metering system 30, and flows through the distribution system 36 across the work vehicle 10 to the soil.

Figure 2:
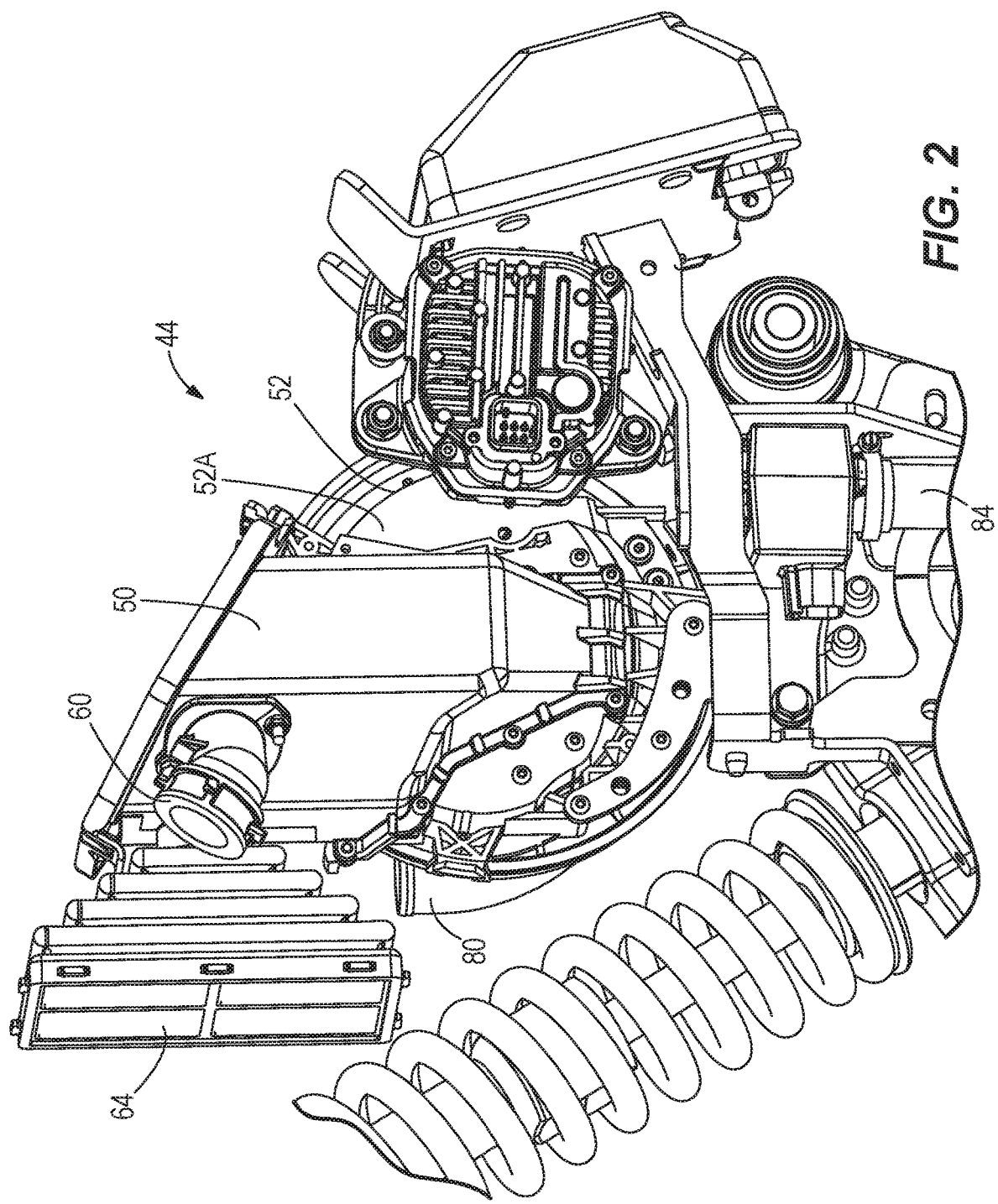
FIG. 2 is a perspective view of one of the seed meters shown in FIG. 1.
Figure 3:
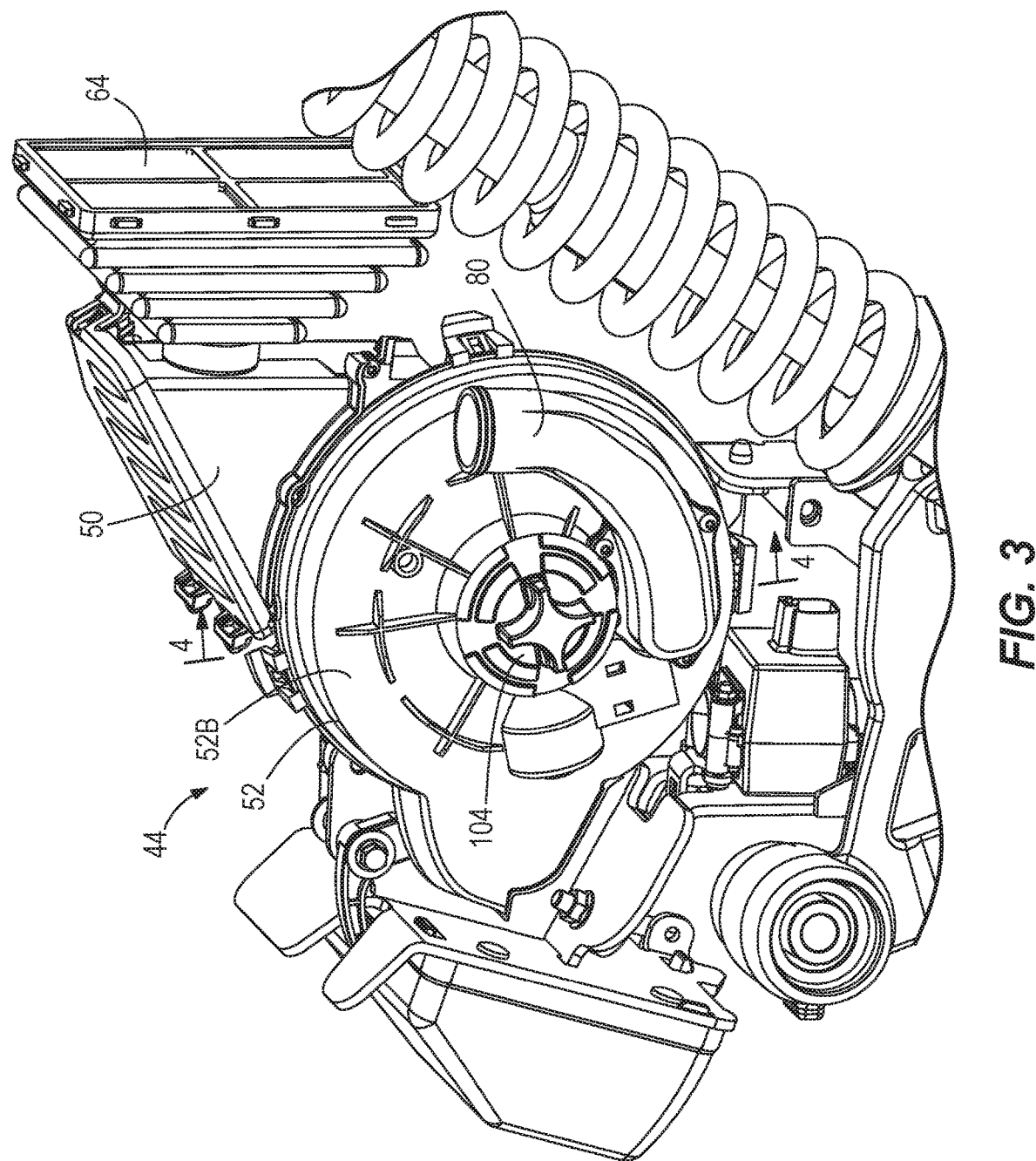
FIG. 3 is another perspective view of one of the seed meters shown in FIG. 1.
Figure 4:
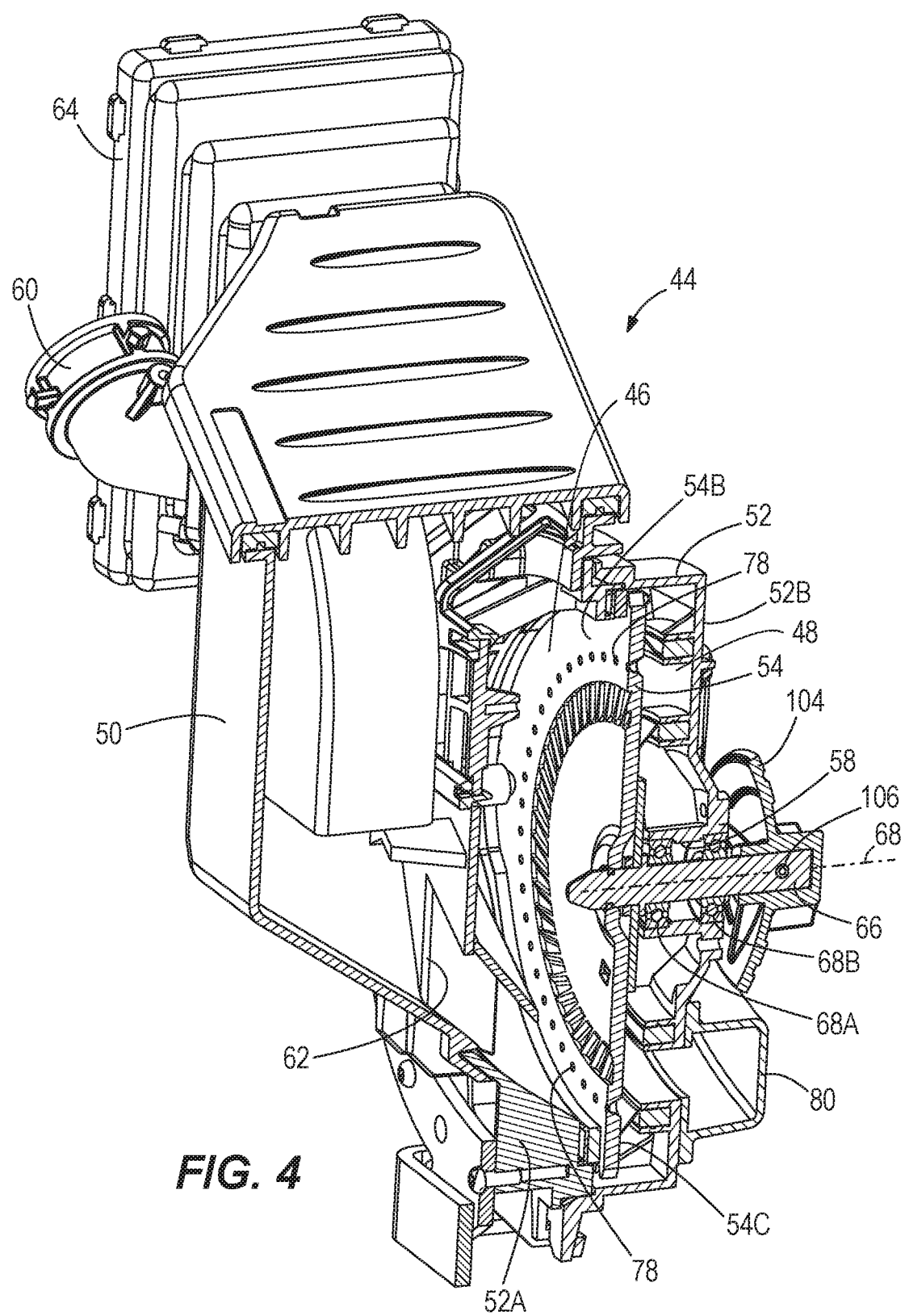
FIG. 4 is a perspective view of a cutaway of the seed meter, showing a metering member mounted on a hub.

As shown in FIGS. 2-4, the seed meter 44 includes a mini hopper 50, a seed disk housing 52 supporting a metering member such as a seed meter disk (or simply seed disk 54, shown at least in FIG. 4) and a singulator 56 (shown at least in FIG. 7), and a motor 72 for driving the seed disk 54.

The mini-hopper 50 is a receptacle that accepts seeds or other agricultural product from the storage tank 28 (and the volumetric meter 30) via a seed inlet 60. As shown, the seed inlet 60 is located adjacent to the top of the mini-hopper 50 such that seeds entering the mini-hopper 50 are directed by gravity to a seed outlet or seed disk housing inlet 62 (FIG. 4). The mini-hopper 50 further includes an air inlet 64 positioned adjacent to the seed inlet 60 and operable to provide an airflow through the mini-hopper 50 and into the seed disk housing 52.

The seed disk housing 52 is formed in two halves, a front or seed side of the seed disk housing 52A and a rear or vacuum side of the seed disk housing 52B. The seed disk 54 is housed therebetween. A hub 66 is rotatably mounted within bearings 68A, 68B positioned within a cavity or aperture 58 in the rear side of the seed disk housing 62B and defines an axis of rotation 68. The seed disk 54 is mounted to the hub 66 and rotates therewith about the axis of rotation 68.

Figure 5A:
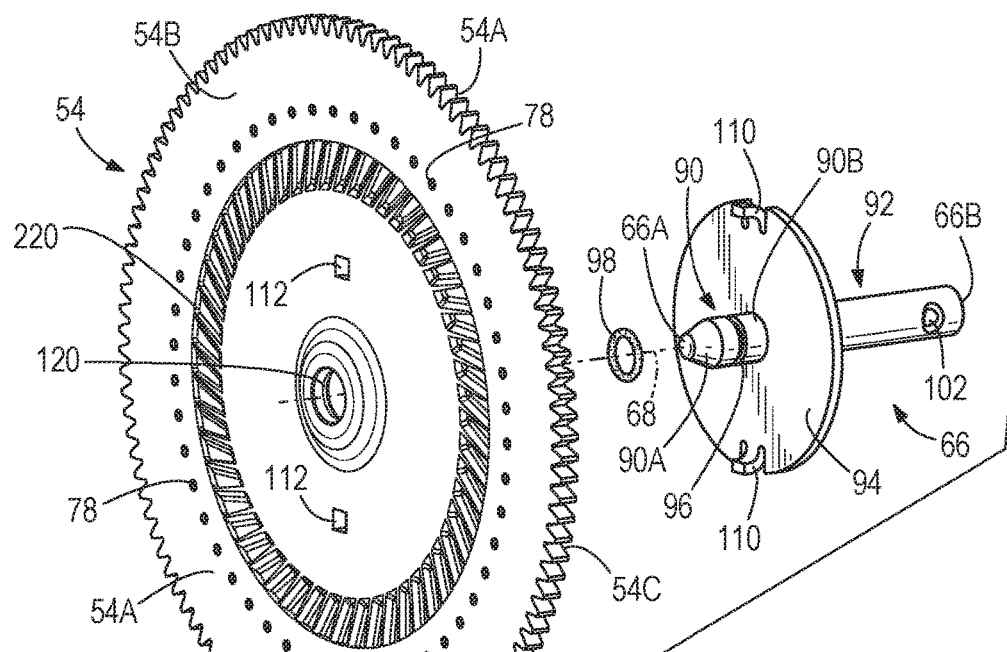
FIG. 5A is an exploded view of the metering member and the hub according to one embodiment.
Figure 5B:
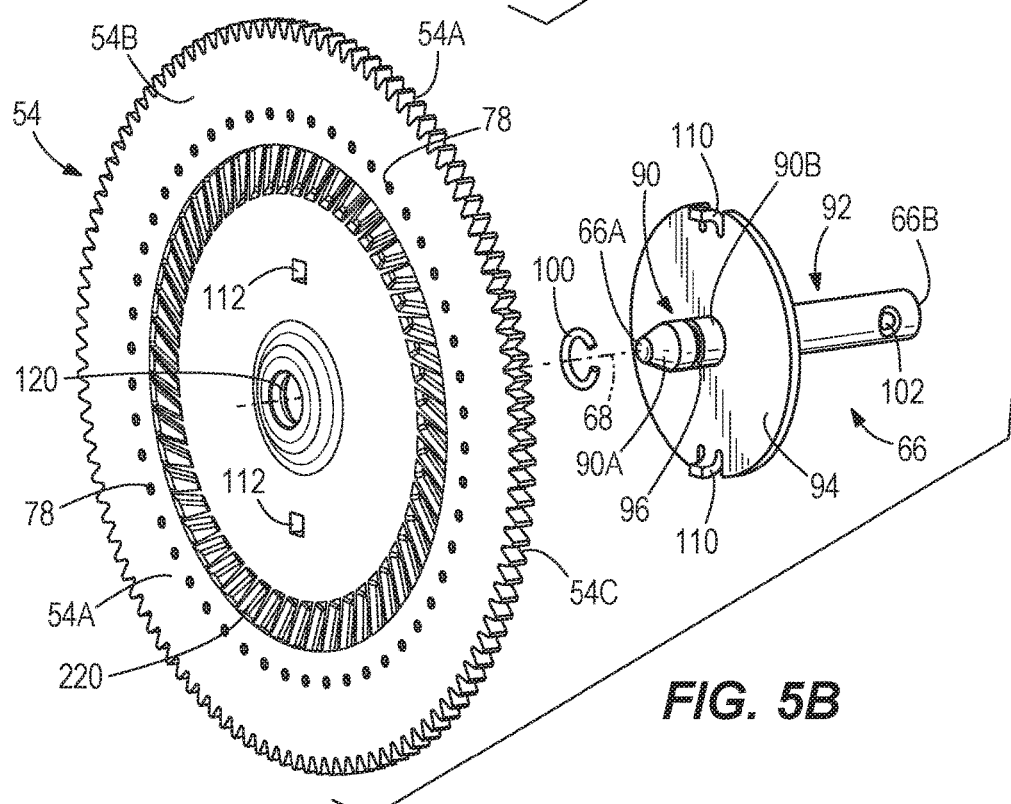
FIG. 5B is an exploded view of the metering member and the hub according to another embodiment.
Figure 6:
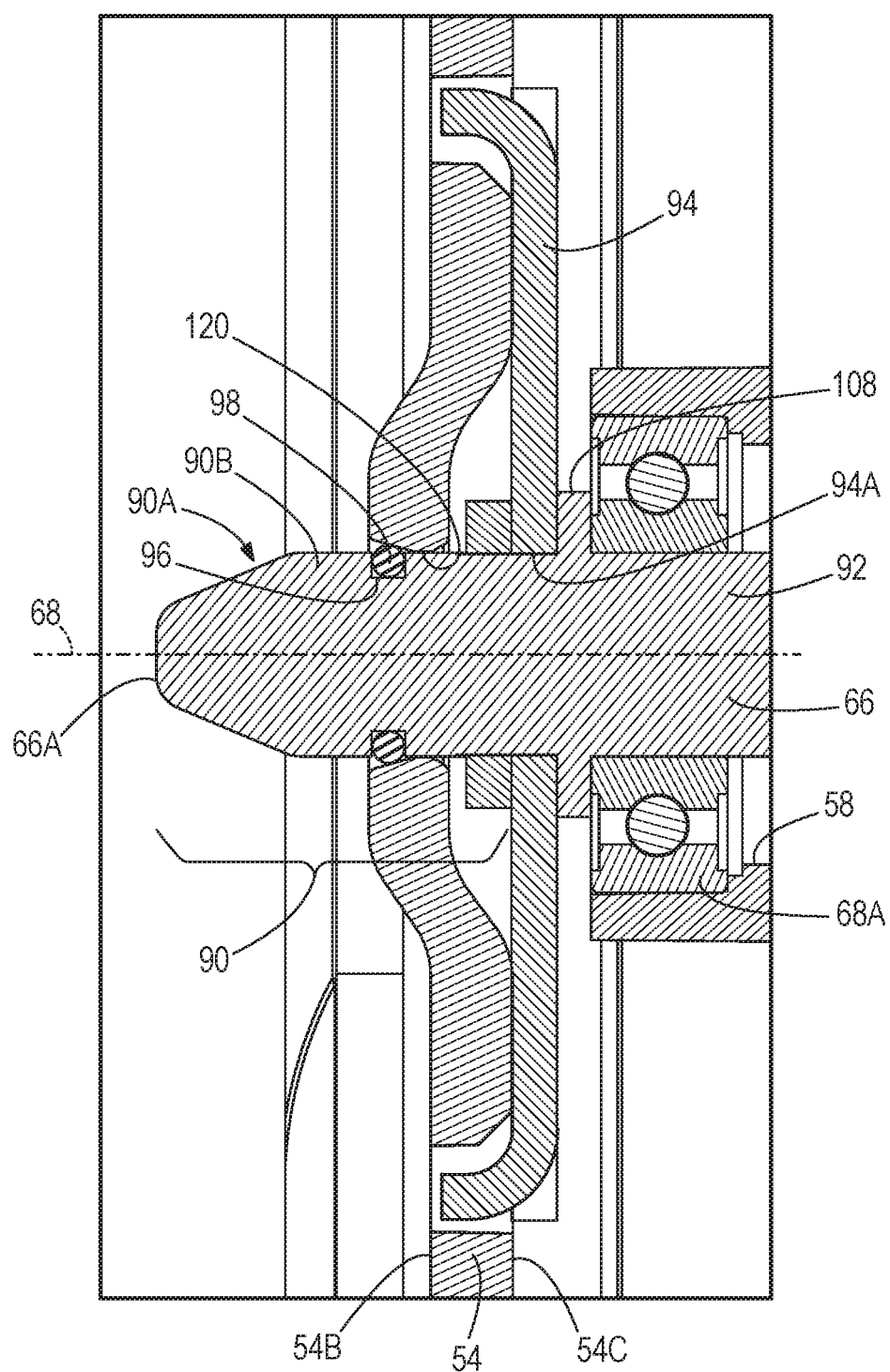
FIG. 6 is a cross-sectional view of the interface between the metering member and the hub.

The seed disk 54 is a gear (e.g., a spur gear) defined by a wheel having radially extending teeth 54A, a seed-side face 54B, and a vacuum-side face 54C. A first cavity 46 is defined within the seed disk housing 52 between the seed side of the seed disk housing 52A and the seed disk 54. A second cavity 48 is defined within the seed disk housing 52 between the vacuum side of the seed disk housing 52B and the seed disk 54. Both of the faces 54B, 54C are generally planar, though they can deviate from planar to define apertures (such as apertures 78, 112, 120 and agitator pockets 220 as described below) and to accommodate mounting to the hub 66, as shown in FIGS. 5A-6. The teeth 54A mesh with teeth 70A of a motor output gear 70 (either directly or indirectly via an intermediate gear) such that actuation of the motor 72 rotates the motor output gear 70, thereby rotating the seed disk 54 about the axis of rotation 68. The motor 72 and the output gear 70 represent one embodiment of a seed meter drive unit that is selectively energized to drive rotation of the seed disk 54. Rotation of the seed disk 54 can be carried out in a single, predefined rotational direction R by the drive unit. The seed disk 54 further includes a plurality of seed openings 78 located on the seed-side face 54B and extending at least partially through to the vacuum-side face 54C such that each seed opening 78 defines a passage through the seed disk 54. The seed openings 78 may be adapted for a particular predetermined seed type so that the seeds, which are larger than the seed openings 78 so as not to pass through the seed openings 78, can be retained against the seed openings 78 and carried away from the seed pool as the seed disk 54 rotates. The seed openings 78 are provided in a circumferential array along the seed disk 54. The spacing of the seed openings 78 may be even or uneven, although a full circumferential array of seed openings 78 with even spacing is hereby illustrated. Further, as shown in FIGS. 5A and 5B, the circumferential array of seed openings 78 may be arranged in more than one row, although a single row is optional. As illustrated, each row of seed openings 78 is located on the seed disk 54 at a single, fixed radial distance from the central axis of rotation 68. Seed agitators of various construction, such as the agitator pockets 220, may be located in a circumferential array at a radial position adjacent to the row(s) of seed openings 78. For example, FIGS. 5A and 5B illustrate a circumferential array of agitators consisting of a single row of agitator pockets 220 formed in the seed-side face 54B of the seed disk 54. The row of agitator pockets 220 is located radially inward of the seed openings 78. The agitator pockets 220 assist in stirring-up or agitating the seeds in the seed pool for encouraging seed retention within the seed openings 78 as the seed disk 54 rotates.

The rear side of the seed disk housing 52B includes an air outlet 80 that is attachable to a vacuum source (not shown) to draw air from within the rear side of the seed disk housing 52B, thereby creating a pressure differential across the seed disk 54. The seed disk housing 52 further includes a seed outlet or opening 82 for transferring the seeds and some air from the seed disk housing 52 and to the ground via an outlet chute 84.

In operation, seeds are dispersed from the storage tank 38 to the mini-hopper 50 via the distribution system 42, entering the mini-hopper 50 through the seed inlet 60. The seeds collect within the mini-hopper 50. The motor 72 is actuated by a controller 86 to rotate the seed disk 54 (via the interface of meshing teeth 54A, 70A). Simultaneously, the vacuum source is actuated to create a pressure differential across the seed disk 54, thereby providing a suction force at the seed openings 78 and holding the seeds against the seed openings 78 as the disk 54 rotates. The singulator 56 knocks off extraneous seeds (those seeds not within one of the seed openings 78) such that each seed opening 78 corresponds to a single seed. Once rotated past the singulator 56, the seeds are kicked out from the seed opening 78 and fall down the seed outlet 82 and to the ground to be planted.

As shown in FIGS. 5A-6, the hub 66 is a cylindrical post having a head portion 90 and a body portion 92 separated by a round plate structure 94. A cylindrical portion 90B of the head 90 includes an annular channel 96 for engaging a resilient retention member such as an elastomeric O-ring 98 (FIGS. 5A, 6) or a metal C-ring 100 (FIG. 5B). The head 90 further includes a nose 90A formed as a truncated cone (i.e., conical frustum) centered on the rotational axis 68 of the hub 66. A first axial end 66A of the hub 66 is defined by the tip of the truncated cone, the first axial end 66A having a cross-sectional area (and diameter) that is less than the cross-sectional area (and diameter) of the base of the truncated cone. The base of the truncated cone is similar in cross-sectional area (and diameter) to the cylindrical portion 90B of the head 90, excepting for the decreased cross-sectional area of the channel 96.

The body 92 of the hub 66 is cylindrical and has a diameter sized to engage the bearings 68A, 68B in the rear side of the seed disk housing 52B. The body 92 extends from the head 90 (or from the plate structure 94) to a second axial end 66B, opposite the first axial end 66A. Further, the body 92 includes a radial through hole 102 that extends transverse to the rotational axis 68 adjacent to the second axial end 66B of the hub 66. As shown in FIG. 4, a handle 104 is mounted on the second axial end 66B of the hub 66 to permit manual rotation of the hub 66 relative to the seed disk housing 52. The handle 104 slides over the second axial end 66B of the hub 66, having an inner diameter seated against the outer diameter of the body 92 of the hub 66. Once seated, an aperture (not shown) in the handle 104 is aligned with the through hole 102 and a fastener 106 (e.g., a threaded fastener, a pin, a rivet, etc.) is positioned therein such that rotation of the handle 104 results in rotation of the hub 66. Alternatively, the handle may be affixed to the hub 66 without a fastener (e.g., press fit) or with an alternative fastener such as an adhesive.

As shown in FIG. 6, the hub 66 may include a collar 108 integrally formed with the head 90 and the body 92 at a location between the head 90 and the body 92. The collar 108 includes a larger circular cross-sectional area than the cross-sectional area of the body 92 and functions as a backstop for the plate structure 94. Further, the collar 108 functions as a spacer between the plate structure 94 and the bearing 68A.

The plate structure 94 is a generally flat circular plate and includes a central aperture 94A (aligned with the rotational axis 68 when assembled) for sliding over the head 90 of the hub 66. Once abutted against the collar 108, the plate structure 94 may be fixed to the collar 108 via an adhesive, a weld, a press fit, or a fastener to prevent rotation and axial translation of the plate structure 94 relative to the collar 108. Two prongs 110 extend axially (i.e., in the axial direction defined by the rotational axis 68) from the periphery of the plate 94 toward the head 90 of the hub 66. The prongs 110 are diametrically opposed from one another (i.e., antipodal points) and correspond to mating apertures 112 in the seed disk 54. When the prongs 110 engage the apertures 112 in the seed disk 54, rotation of the seed disk 54 results in rotation of the hub 66 and rotation of the hub 66 results in rotation of the seed disk 54.

The seed disk 54 includes the seed openings 78, the apertures 112, as well as a central mounting aperture 120 for mounting to the hub 66, and specifically to the head portion 90 of the hub 66. The central mounting aperture 120 extends from the seed-side face 54B of the seed disk 54 through to the vacuum-side face 54C, defining a channel therebetween. As shown in FIG. 6, the diameter of the mounting aperture 120 is variable from the seed-side 54B to the vacuum-side 54C. More specifically, the diameter of the mounting aperture decreases (e.g., linearly, parabolically, etc.) from the seed-side 54B to the vacuum-side 54C.

Assembly of the seed meter 44 includes mounting the seed disk 54 within the seed disk housing 52. The bearings 68A, 68B are positioned within the cavity 58 in the rear side of the seed disk housing 52B and are fixed axially by a press fit, spacer, adhesive, or other fastener to prevent the outer race of the bearings 68A, 68B from rotating relative to the seed disk housing 52. The second axial end 66B of the hub 66 is axially inserted through the bearings 68A, 68B from an interior of the seed disk housing 52 such that the second axial end 66B passes through both bearings 68A, 68B. The hub 66 is fully inserted into the bearings 68A, 68B when the spacer or collar 108 abuts the first bearing 68A. With the collar 108 positioned against the bearing 68A, the second axial end 66B extends past the housing 52 a distance to permit assembly of the handle 104 to the hub 66.

The round plate structure 94 is placed over the first axial end 66A of the hub 66, over the nose 90A and seated axially against the collar 108. The round plate structure 94 is fixed to the head portion 90 or the collar 108 via a press fit, a weld, an adhesive, or another fastener (e.g., threaded fastener, rivet, etc.) such that rotation of the round plate structure 94 rotates the collar 108 and the head portion 90. Alternatively, the round plate structure 94 may be integrally formed with the collar 108 and would therefore not require the separate step of assembling the plate structure 94 to the collar 108.

The ring (O-ring 98 or C-ring 100) is inserted into the annular channel 96. The O-ring 98 is slid over the nose 90A and cylindrical portion 90B of the head portion 90 and into the channel 96. The C-ring may also be axially inserted into the channel 96 or may otherwise be elastically expanded (e.g., via a tool such as a snap ring pliers) and inserted radially into the channel 96.

With the ring 98, 100 in place, the central mounting aperture 120 of the seed disk 54 is inserted onto the hub 66 over the tapered nose 90A with the vacuum-side face 54C of the seed disk 54 in facing relation to the collar 118, the round plate structure 94, and the vacuum side of the seed disk housing 52B. The increasing diameter of the tapered nose 90A aids in initial placement of the seed disk 54 onto the hub 66 and centering of the seed disk 54 relative to the hub 66.

Once the central mounting aperture 120 of the seed disk 54 clears the tapered nose 90A, it is guided along the cylindrical portion 90B of the head portion 90. At this stage, a number of alignment features are implemented to interface the seed disk 54 with the motor output gear 70 and the hub 66. Namely, the teeth 54A of the seed disk 54 are aligned with the teeth 70A of the motor output gear 70 (or an intermediate gear therebetween). Further, the apertures 112 in the seed disk 54 are aligned with the prongs 110 on the hub 66. Once these components are aligned, the seed disk 66 can be axially translated along the hub 66 and over the ring 98, 100.

As shown in FIG. 6, translating the seed disk 54 over the ring 98, 100 includes compressing the ring 98, 100 a first amount to pass the narrowest point of the mounting aperture 120 over the ring 98, 100. Once past the narrowest point, the ring 98, 100 is compressed a second amount, less than the first amount, but great enough to maintain contact between with the channel 96 and the mounting aperture 120. With the ring 98, 100 compressed the second amount less than the first amount, removal of the seed disk 54 requires once again compressing the ring 98, 100 the first amount, which can prevent accidental removal of the seed disk 54 from the hub 66.

When the ring 98, 100 is compressed the second amount, the vacuum-side face 54C of the seed disk 54 abuts against the round plate structure 94, further limiting translation of the seed disk toward the rear side of the seed disk housing 52B. Therefore, the ring 98, 100 and the round plate structure 94 limit axial translation of the seed disk 54 relative to the seed disk housing 52 and the ring 98, 100 limits radial translation of the seed disk 54 relative to the seed disk housing 52. Due to the interface between the apertures 112 and the prongs 110, rotation of the seed disk 54 produces similar rotation of the hub 66, and vice versa. Likewise, the interface between the teeth 54A, 70A permits rotation of the seed disk 54 in response to actuation of the motor 72 and rotation of the motor output gear 70.

As an alternative to the ring 98, 100 and the annular channel 96, the hub 66 may include an alternative retention member. For example, the retention member may be a detent feature or spring-biased member such as a ball or a plunger that is biased radially outward from the cylindrical portion 90B of the hub 66 (i.e., at a similar axial position to the annular channel 96) by a spring. The spring biases the ball or plunger into engagement with the central aperture 94A of the seed disk 54 similar to the rings 98, 100, as discussed above. The hub may further comprise a button for retracting the spring to decrease or eliminate the force provided on the aperture 94A by the spring-biased member and spring.

Figure 7:
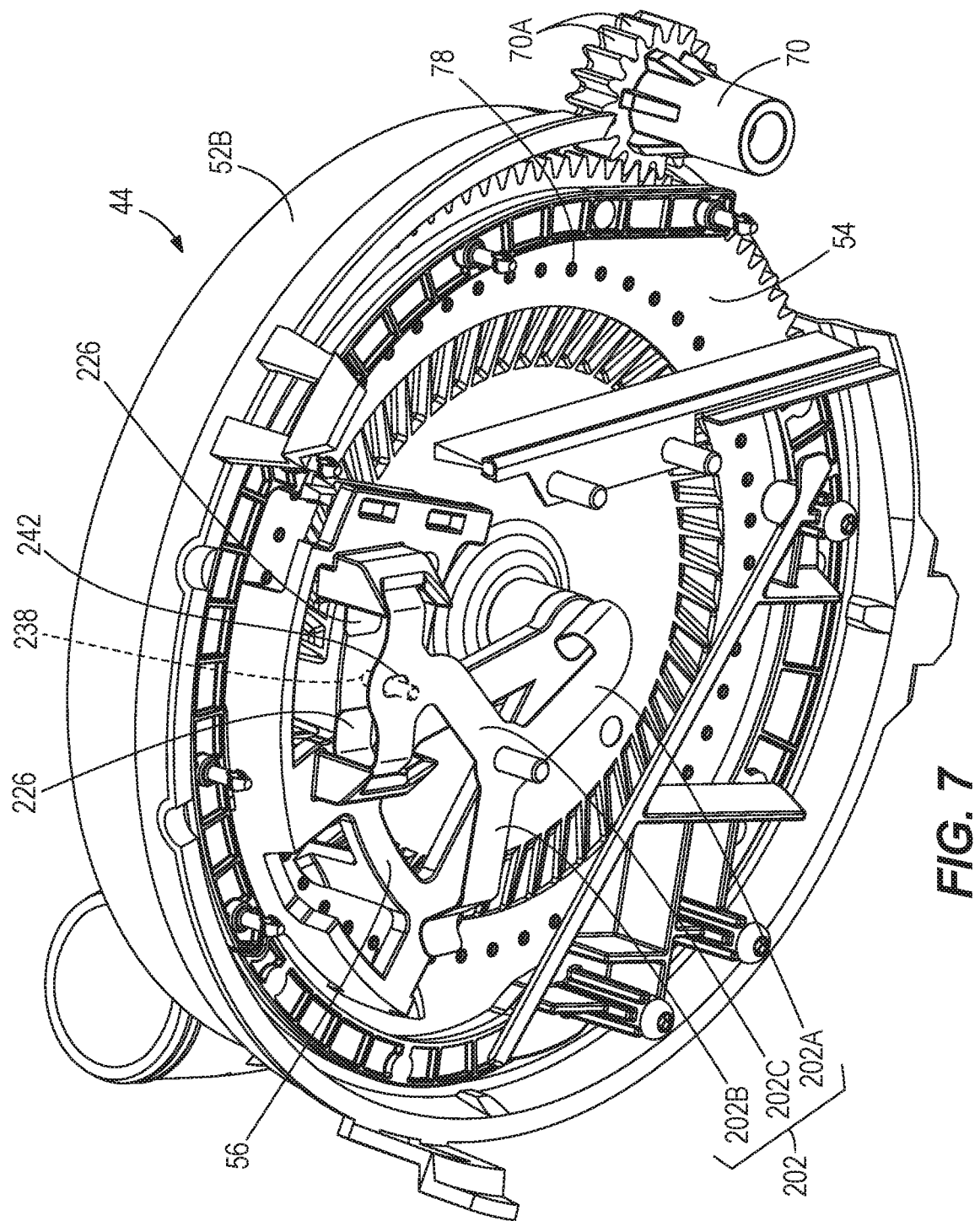
FIG. 7 is a perspective view of the seed meter with a portion of the meter housing removed to reveal a seed meter disk and seed singulator according to one embodiment of the present disclosure.
Figure 8:
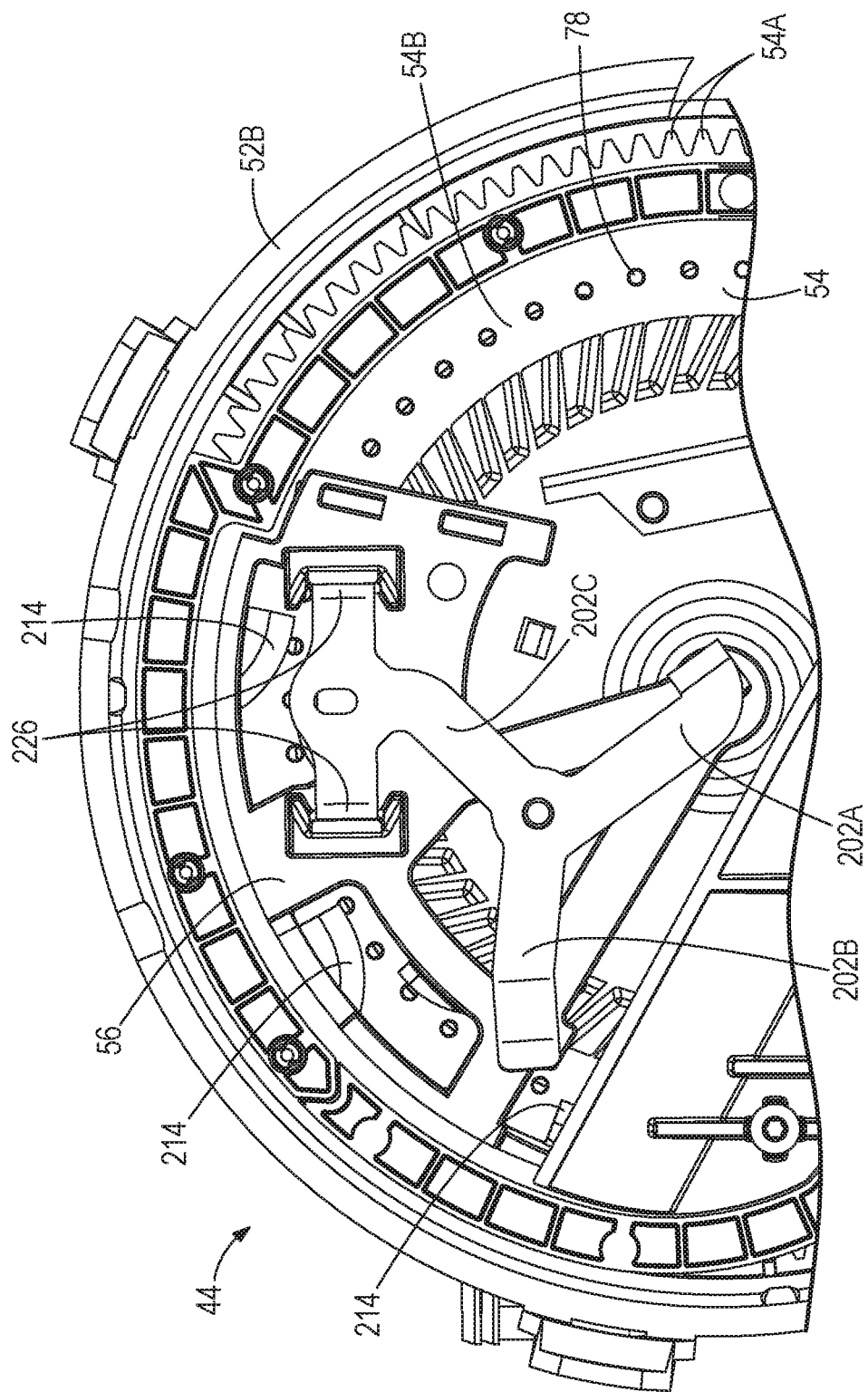
FIG. 8 is a front view of the seed meter with in situ singulator of FIG. 7.

FIGS. 7 and 8 illustrate an interior of the seed meter 44, as viewed from the seed-side face 54B of the seed meter disk 54, by way of the front housing 52A being removed. The singulator 56 and its biasing spring 202 are illustrated in the in-use position. However, it should be understood from FIGS. 9 to 11 that the biasing spring 202 is mounted, e.g., via a single fastener 206, to the front housing 52A that is removed in FIGS. 7 and 8. Although further discussion of the biasing spring 202 is provided below, it is also noted here that the biasing spring 202 extends in at least two or at least three separate directions from the mounting point where the fastener 206 is provided. The mounting point can be a central point of the biasing spring 202 as shown, with the biasing spring 202 having two, three or more arms 202A, 202B, 202C that extend in a radially outward manner therefrom to individual distal ends.

Turning now to FIGS. 9-12, it is shown that the singulator 56 is formed with a cup or pocket 210 at the position of the seed meter disk central rotation axis 68. The singulator pocket 210 receives the nose 90A of the meter hub 66. It is noted, while that the nose 90A of the meter hub 66 supports the seed meter disk 54 for rotation about its central axis 68, the disk 54 is not necessarily hub-driven during operation. The radial positioning of the singulator 56, in at least one direction, is referenced directly from the engagement of the hub 66 with a portion of the singulator 56. In particular, the outer surface of the hub nose 90A is engaged into the inner surface of the singulator pocket 210. The radial positioning of the singulator 56 is thus fully defined by this engagement with the hub 66. Because the seed meter disk 54 also has its radial position referenced from the hub 66, the relative radial positioning of the singulator 56 with respect to the seed meter disk 54 is highly precise and furthermore requires no special adjustment, but rather is automatic upon installation of both the seed meter disk 54 and the singulator 56 to the hub 66. This affords great precision in the operation of the singulating edges or singulator "knives" in particular, which may sequentially increase in radial overlap with each seed opening 78 of the meter disk 54 as it rotates past the singulator 56 for best performance. It should also be noted that the singulator 56, for example the singulator pocket 210, may have its radial position referenced in part or in whole from a portion of the meter disk 54, which constitutes part of the meter hub 66. As such, the hub 66 is not necessarily limited to strictly a post or shaft on which the meter disk 54 is mounted.

Figure 13:
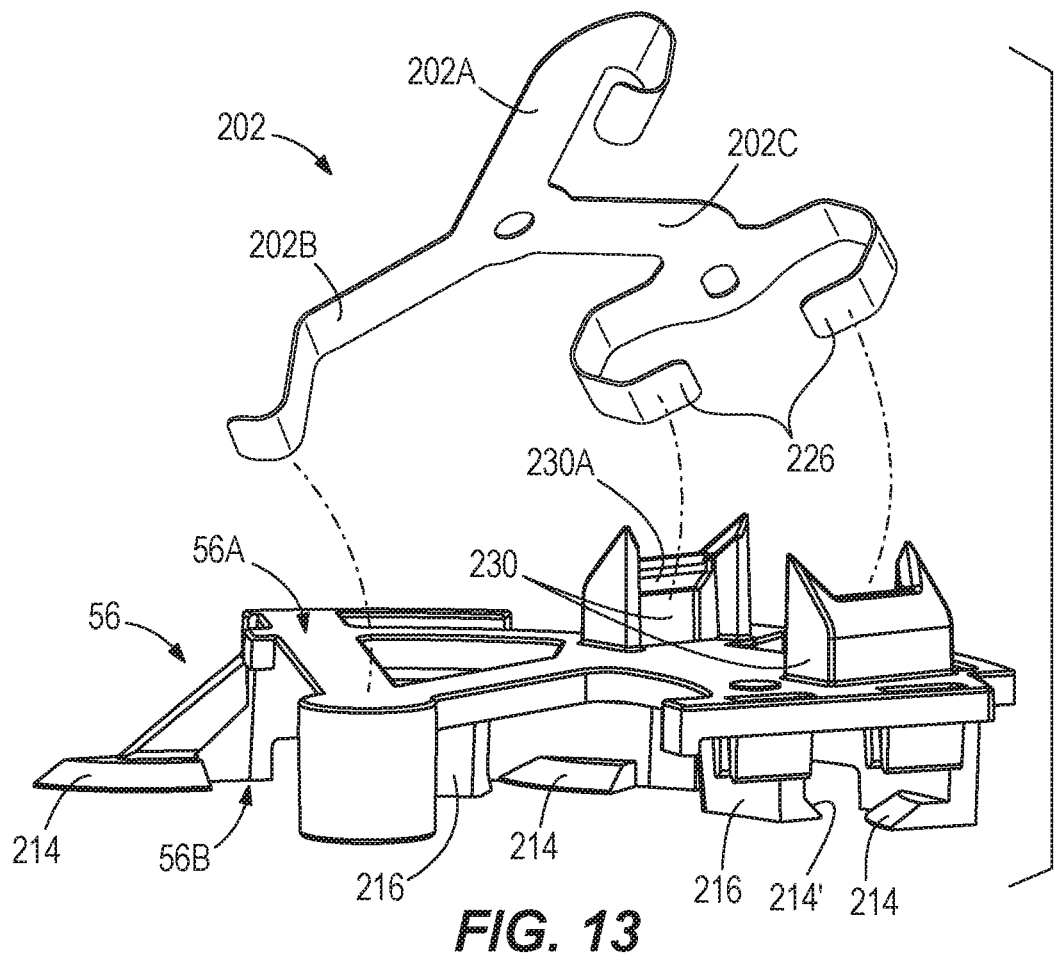
FIG. 13 is an exploded assembly view of the biasing spring and a back side of the singulator that cooperates with the biasing spring.
Figure 14:
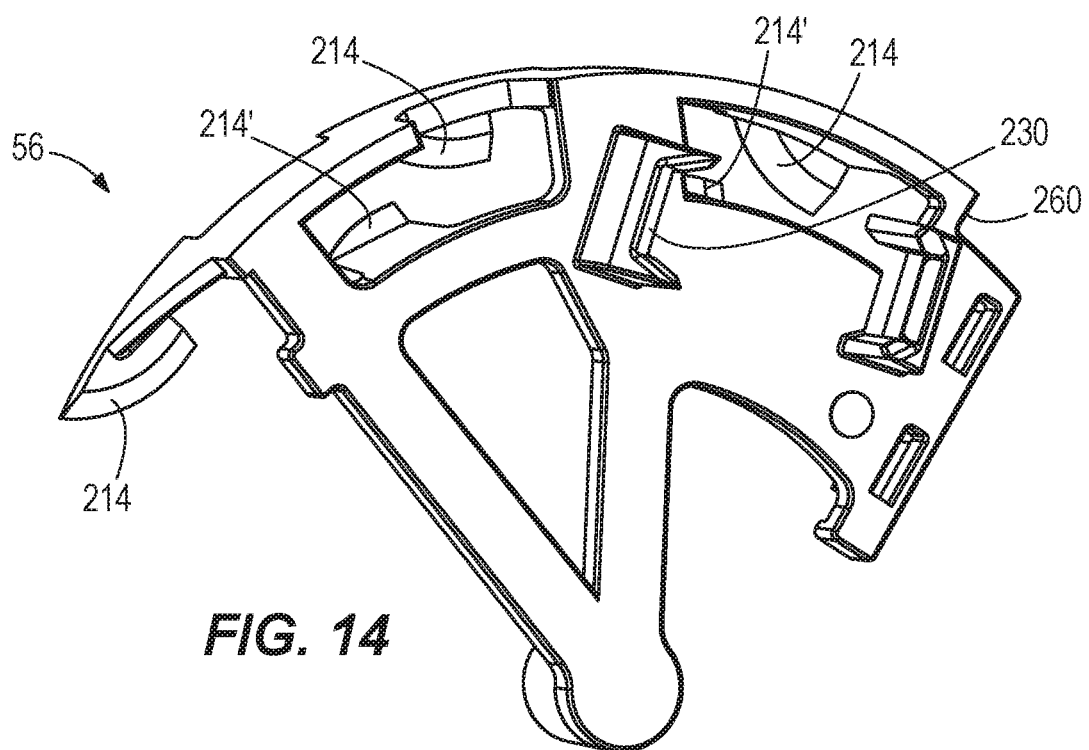
FIG. 14 is a perspective view of the singulator of FIGS. 7 to 13, as viewed from the back side thereof.
Figure 15:
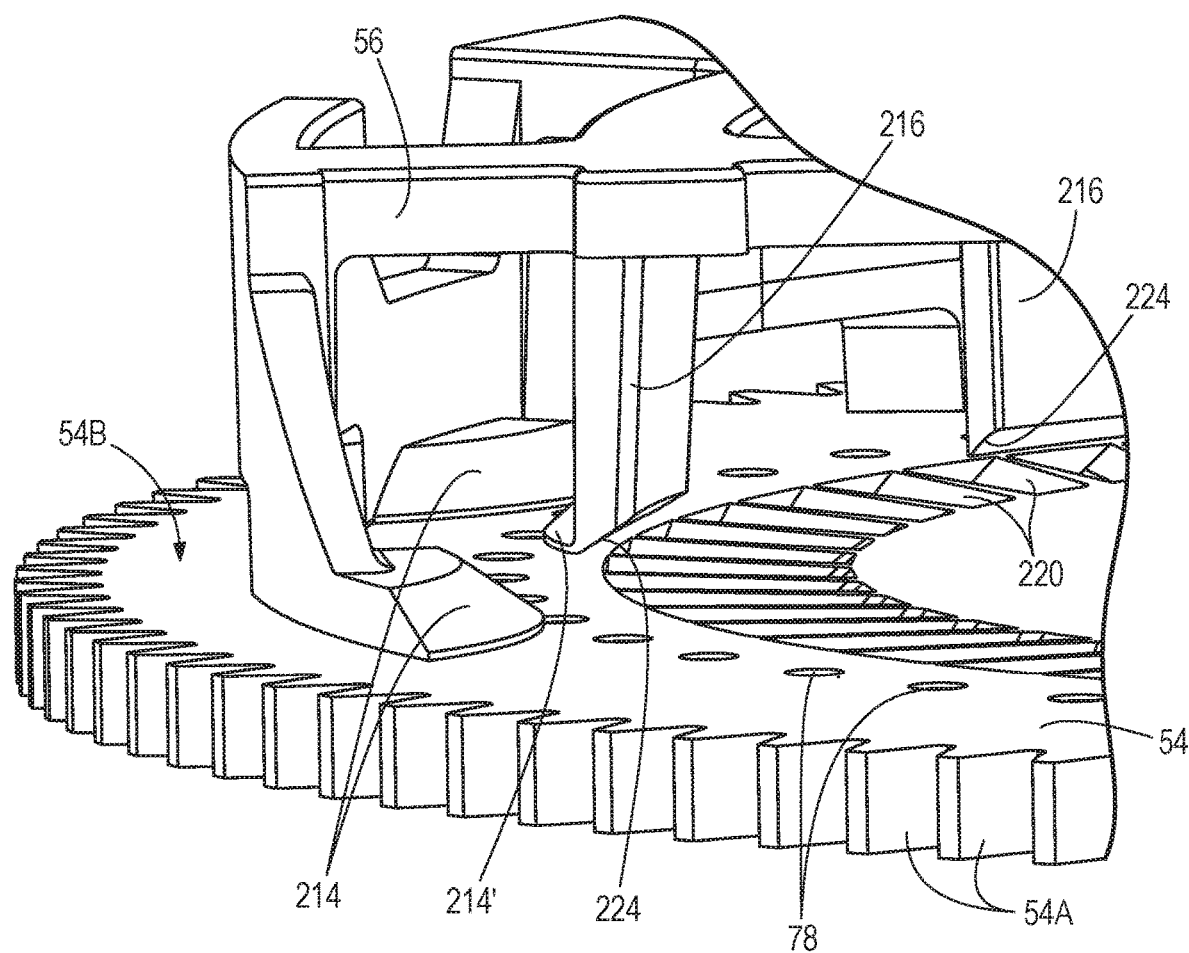
FIG. 15 is a perspective view of a chamfer portion of the singulator overlying the seed agitator recesses in the seed meter disk.

Turning particularly to FIGS. 13 to 15, the illustrated singulator 56 includes radially outboard singulating edges or knives 214 that extend radially inward toward the path defined by the array of seed openings 78. The singulator 56 also includes radially inboard singulating edges or knives 214' that extend radially outward toward the path defined by the array of seed openings 78. The leading edge of each knife 214, 214' forms a knife edge that is thinnest at the initial point of contact. Each of the knife edges can be curved as shown. In the case of the radially inboard singulating knives 214', support structures 216 and/or the knives 214' themselves extend toward the seed-side face 54B at or very near to the path of a plurality of seed agitation recesses or pockets 220 formed in the seed meter disk 54 for stirring or agitating the seeds in the seed pool to maximize seed pick-up. As shown and labeled in FIG. 15, chamfers 224 on the radially inboard singulator knives 214' allow the agitation recesses 220 to be formed as near as possible, radially, to the seed openings 78 without "scissoring" seeds, which can lead to grinding or popping noises. By having the agitation recesses 220 very near the seed openings 78 in the radial direction, the effectiveness of the agitation recesses 220 is maximized.

Figure 9:
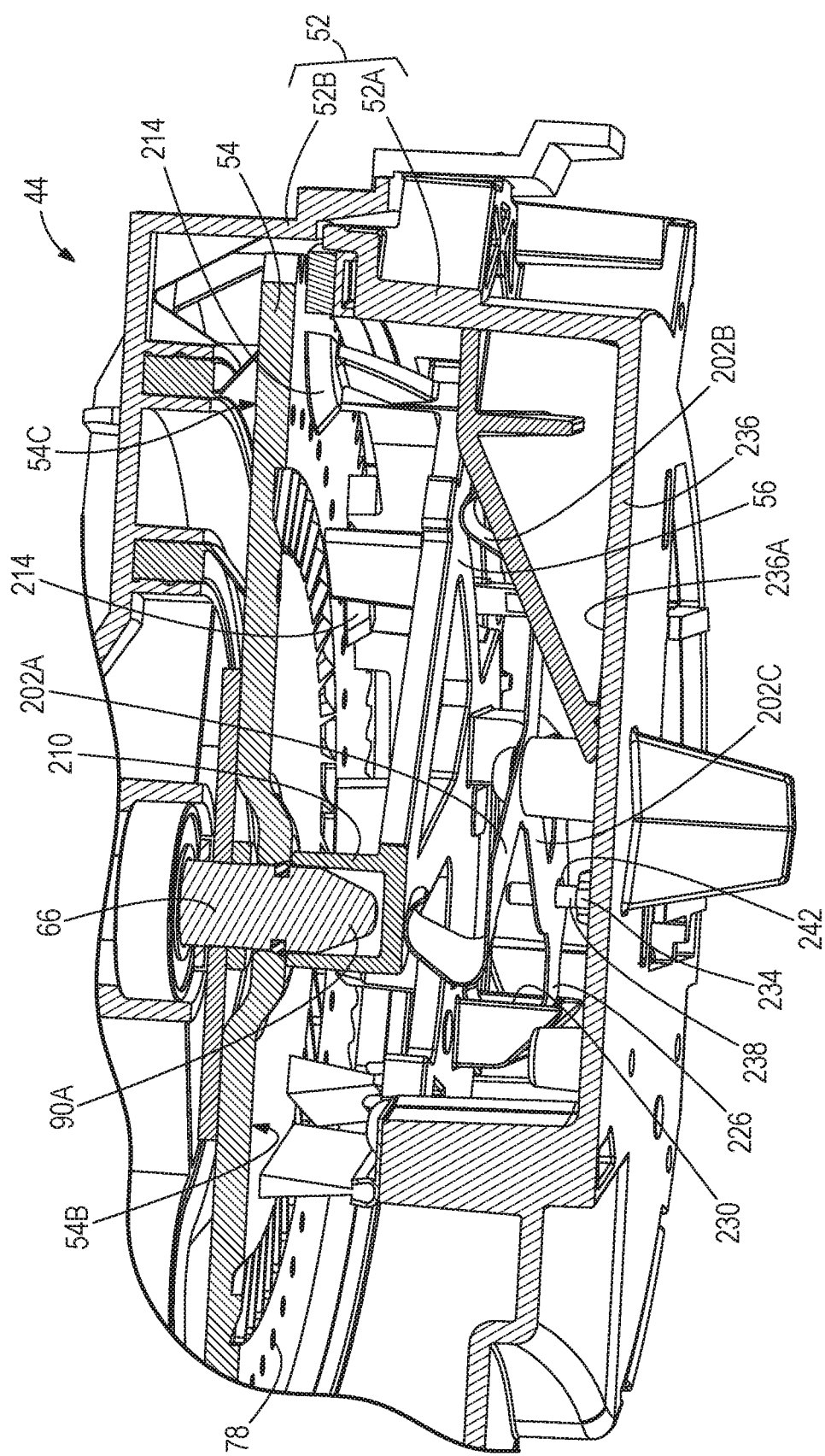
FIG. 9 is a cross-section of the seed meter taken through a central axis of the seed meter disk and hub.
Figure 10:
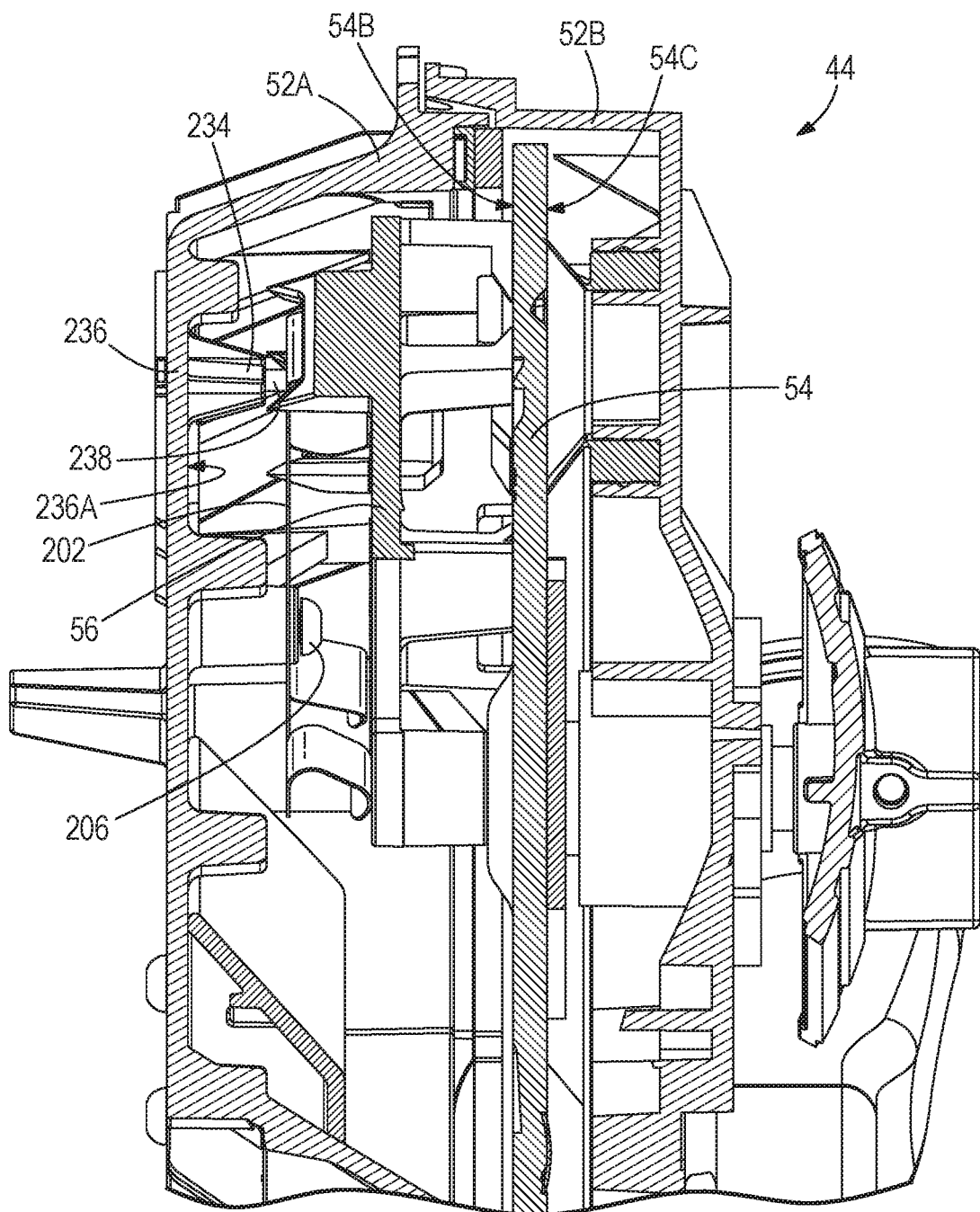
FIG. 10 is a cross-section of the seed meter taken through a plane offset from and parallel to the central axis.

Turning back to FIGS. 7, 8, 12, and 13, the biasing spring 202 is described in further detail with respect to its placement and engagement with the singulator 56. As mentioned briefly above, the biasing spring 202 contacts the singulator 56 in multiple spaced locations. For example, the biasing spring 202 is forked to include three separate prongs or arms 202A, 202B, 202C that extend outwardly to define separate contact regions with a back side 56A of the singulator 56 that is opposite a seed meter disk-facing side 56B thereof. The contact regions correspond to multiple contact regions between the singulator 56 and the seed-side face 54B (formed by one or more of the knives 214, 214' and also the surface at the end of the hub-receiving pocket 210), thus reliably maintaining the attitude of the singulator 56 with respect to the seed meter disk 54 under the bias of the biasing spring 202 during operation. The first contact region, defined by the first spring arm 202A, is at the position of the hub 66 along the central axis 68, where the singulator pocket 210 receives the hub nose 90A. In addition, the second and third contact regions, respectively defined by the second and third spring arms 202B, 202C, are two circumferentially-spaced regions proximate a radially outer portion of the singulator 56 where the knives 214 or other singulating structures are located. One of these regions is further provided with retention geometry for positively engaging and retaining the singulator 56 to the biasing spring 202. For example, this can be the third contact region, which in fact, defines two separate contact locations for exerting the axially biasing force on the singulator 56. The third contact region as a whole is formed by two spaced-apart wings or prongs 226 of the biasing spring 202, both of which are received into corresponding recesses or pockets 230 formed on the back side 56A of the singulator 56. The pockets 230 can be formed as undercuts defining respective shoulders 230A (FIGS. 13 and 14) that retain the biasing spring 202 by blocking the free axial removal of the biasing spring 202 therefrom. Thus, the singulator 56 is retained directly to the biasing spring 202, which is in turn fixedly secured to the front housing 52A, by pressing the singulator 56 against the biasing spring 202 such that the third contact region is pressed into the pockets 230, the third contact region of the biasing spring 202 being elastically deformed in the process. During assembly of the singulator 56 to the biasing spring 202, the pressing of the singulator pockets 230, or shoulders 230A thereof, against the prongs 226 of the biasing spring third contact region tends to induce a certain amount of axial deflection in the biasing spring 202 since other portions of the biasing spring 202, e.g., the central portion and other arms 202A, 202B, do not define a resistive fit with the singulator 56 like the third spring arm 202C does. To ensure that the biasing spring prongs 226 enter the corresponding pockets 230, rather than simply deflecting the entire third arm 202C, the front housing 52A is provided with an inwardly extending backstop 234 as shown in FIGS. 9 and 10. The backstop 234, which is optionally formed as an integral part of the front housing 52A (e.g., single molded component), protrudes from the directly adjacent portions of the wall 236 defined by the front housing 52A. As such, the backstop 234 provides a distal contact surface that is spaced inwardly from the other surrounding portions of the front housing wall interior surface 236A. As such, upon pressing the singulator 56 onto the biasing spring 202, deflection of the third spring arm 202C is specifically limited by the backstop 234 as shown in FIGS. 9 and 10, and cannot be so great as to reach the interior surface 236A. The backstop 234 is positioned to be proximate or within the third contact region of the biasing spring 202, and in particular may be between the prongs 226 as shown in the illustrated construction. Other positions and/or additional backstops are optional. The backstop 234 allows certainty in the position control of the biasing spring 202 during installation of the singulator 56 and can be used to set a desirable predetermined snap-in force for the singulator 56 without damaging the biasing spring 202. It is also noted that a positioning pin 238 may extend from the backstop 234 in the front housing 52A to extend through a corresponding opening 242 in the biasing spring 202 to define a positioning interface that prevents the biasing spring 202 and the singulator 56 from sliding out of alignment, particularly during installation. Further, it will be appreciated that the pin 238 and the opening 242 may be reversed in defining this positioning interface.

It is noted that the illustrated biasing spring 202 is formed of a single unitary metallic element having a variety of bends formed therein. For example, the central portion and part of each arm 202A, 202B, 202C extending therefrom can generally define a reference plane P2 (FIG. 10), and distal ends of the arms forming the various contact regions can be formed by one or more bends (e.g., waves, curls, loops, etc.) that extend away from this reference plane P2. The three spaced points of contact between the biasing spring 202 and the singulator 56 keep the singulator 56 axially referenced to the seed-side face 54B of the seed meter disk 54, no matter where or how the disk works.

Figure 11:
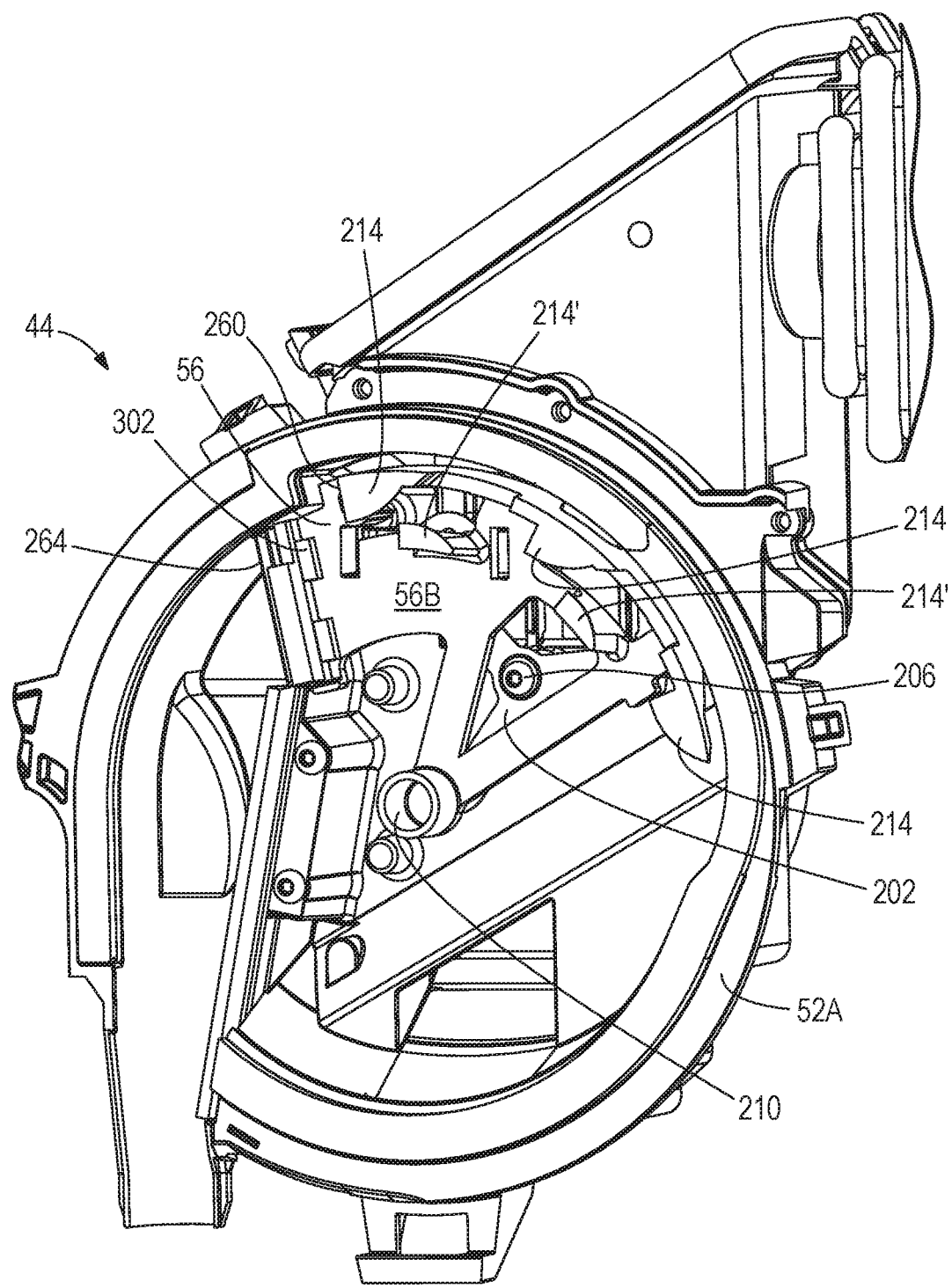
FIG. 11 is a perspective view of the seed meter with an opposite portion of the meter housing removed as compared to FIGS. 7 and 8, and with the seed meter disk removed, revealing a side of the singulator that faces the seed meter disk.
Figure 12:
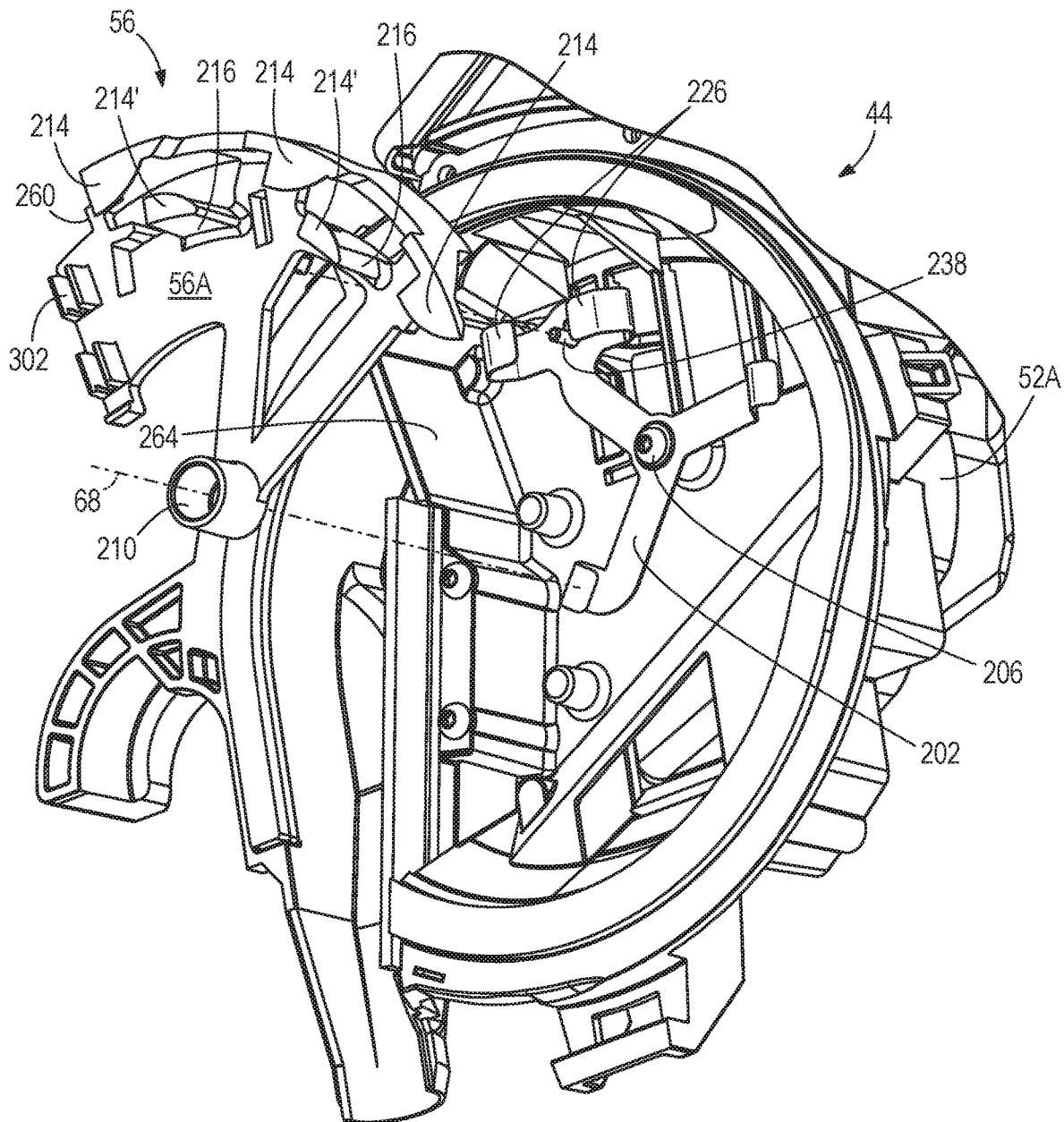
FIG. 12 is an exploded assembly view of the singulator removed from a singulator biasing spring that is secured to the meter housing.

While much of the preceding discussion focuses on the axial direction assembly features and the centering of the singulator 56 with respect to the hub 66 and the seed meter disk 54, it must also be noted that the singulator 56 must be held at a single fixed position about the rotational axis 68 during operation while the seed meter disk 54, which is in contact with the singulator 56, continuously rotates. The friction between the seed meter disk 54 and the singulator 56 tends to urge the singulator 56 in the rotational direction of the seed meter disk 54. However, a trailing edge of the singulator 56 with respect to the rotation direction of the seed meter disk 54 defines an anti-rotation abutment surface 260 in abutment with the front housing 52A to prevent rotation of the singulator 56 as the seed meter disk 54 rotates against it. As shown in FIGS. 11 and 12, an upstanding interior wall 264 projects into the cavity defined by the front housing 52A. The interior wall 264 can be integrally formed with the front housing 52A in some constructions, as shown, but may alternately be a separately-formed component forming part of the front housing 52A when assembled. As shown, the trailing edge of the singulator 56 is stepped so as not to be located exclusively along one radial line.

Figure 16:
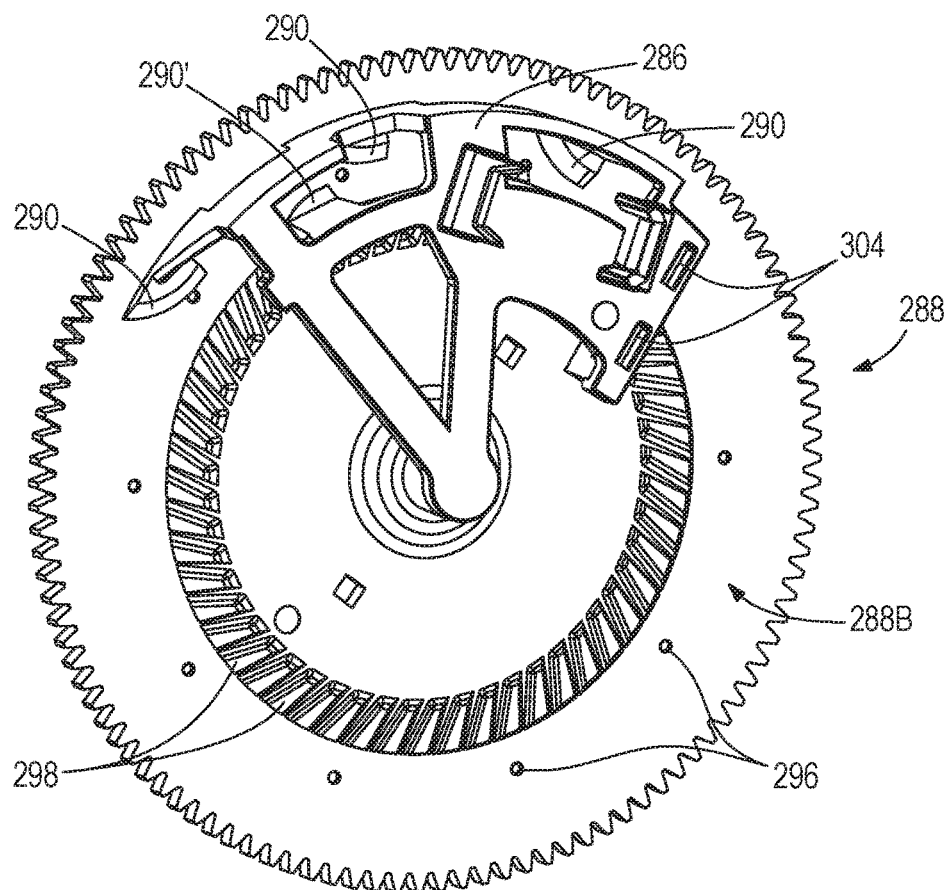
FIG. 16 is a front view of a seed meter disk and singulator according to another embodiment of the disclosure.
Figure 17:
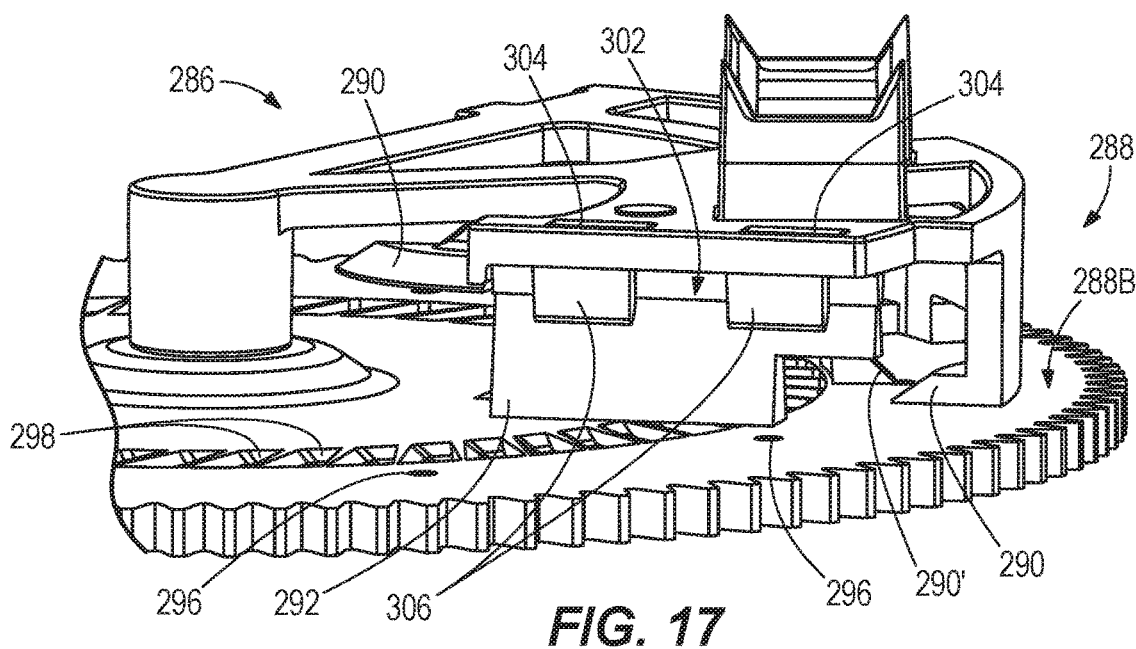
FIG. 17 is a perspective of a notched brush portion of the singulator of FIG. 16.

Although knifes 214, 214' as singulation structures have been illustrated and described, it is also noted that alternate singulators according to the present disclosure may include one or more brushes in addition to or in lieu of knives. FIGS. 16 and 17 illustrate one such singulator 286, along with a paired seed meter disk 288, for example, designed for an alternate seed type compared to that of the earlier drawings. It will be understood that the singulator 286 and paired seed meter disk 288 may generally correspond to the features discussed above for the singulator 56 and seed meter disk 54 described above including, and the above description is thus referenced for a majority of features, while the description below focuses on additional or alternate features. For example, the seed meter disk 288 of FIGS. 16 and 17 includes seed openings 296 and agitator recesses 298, although differently configured than those of the seed meter disk 54. The seed meter disk 288 is provided with a single circumferential row of seed openings 296, each of which is larger than the seed openings 78 shown in FIGS. 7 and 8. Further, the seed openings 296 in the seed meter disk 288 of FIGS. 16 and 17 have increased circumferential spacing as compared to the tightly spaced seed openings 78 as shown in FIGS. 7 and 8. In some constructions, the singulators 56, 286 and their associated seed meter disks 54, 288 may be interchangeable within the housing 52, with the same or alternate biasing spring 202, to reconfigure the seed meter 44 for different crops.

The singulator 286 includes knives (e.g., outer and inner knives 290, 290' like those of the singulator 56) in addition to a trailing end or "last chance" brush 292, positioned opposite the leading edge of the singulator 286 with respect to the rotation direction of the seed meter disk 288. The brush 292 includes bristles extended toward the seed meter disk 288. Some or all of the brush bristles may contact the seed-side face 288B of the disk 288, although it is also considered that some or all of the brush bristles may be spaced from a seed-side face 288B. The brush 292, as shown, features a stepped or notched shape in which the distal end of the brush 292 is further spaced from the seed-side face 288B at a radial position of the seed openings 296. The brush 292 may be very closely spaced to the seed-side face 288B of the seed meter disk 288, or in contact therewith, at a radial position corresponding to the agitation recesses 298. It will be appreciated that a large number of different brush configurations may be desirable for use with different crops and thus different seed meter disks and singulators. By directly incorporating the brush 292 into the singulator 286 (e.g., instead of mounting the brush 292 to the housing 52), replacement of the singulator 286 also automatically removes and/or replaces the brush 292 associated therewith, and a separate changeover is not required. It is also noted that the singulator 286 includes a brush mounting receptacle 302, which in the illustrated construction is provided by openings 304 through the singulator 286 along with opposed prongs 306 arranged to grip the brush 292 from two opposed sides (two prongs 306 on one side shown in FIG. 17, and two similar prongs 306, not shown, on the other side of the brush 292). Although no brush is shown at the trailing end of the singulator 56 of FIGS. 7 to 15, the same or similar brush mounting receptacle may also be provided in the singulator 56 (see FIGS. 7, 8, 11, 12, 14) for an optional brush.

Figure 18:
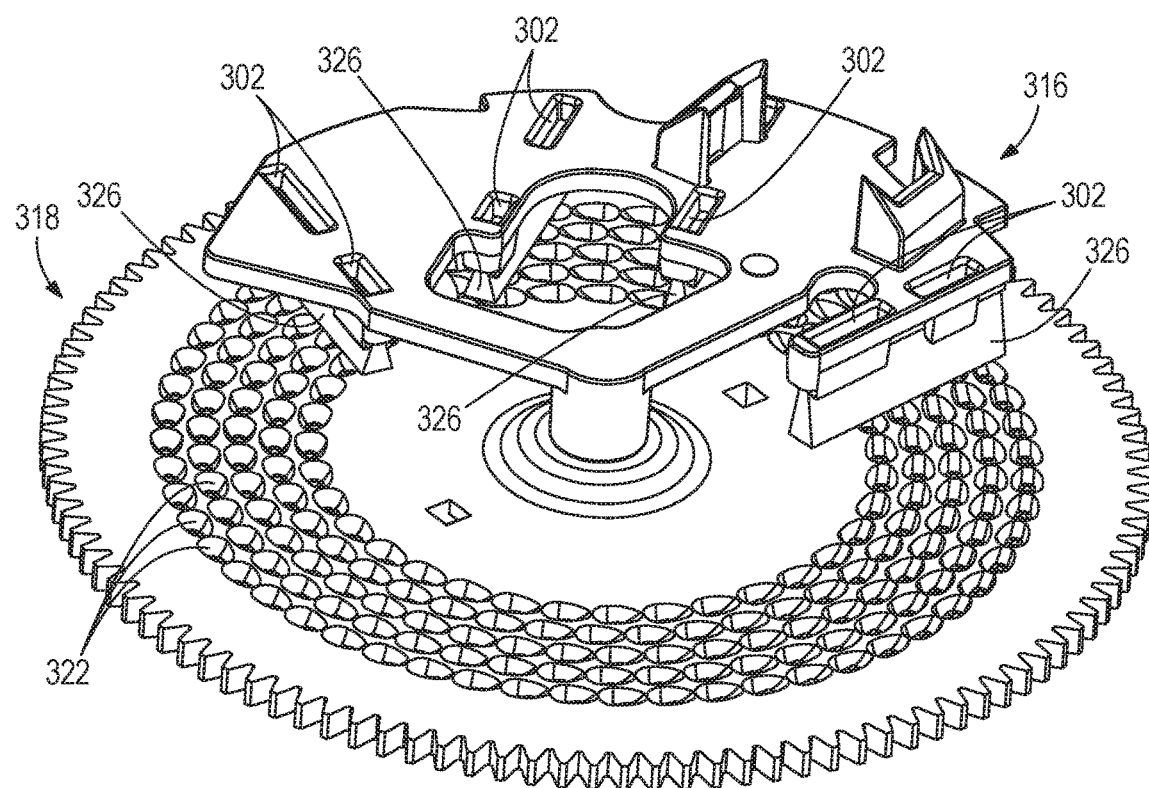
FIG. 18 is a perspective view of a seed meter disk and singulator according to yet another embodiment of the disclosure
Figure 19:
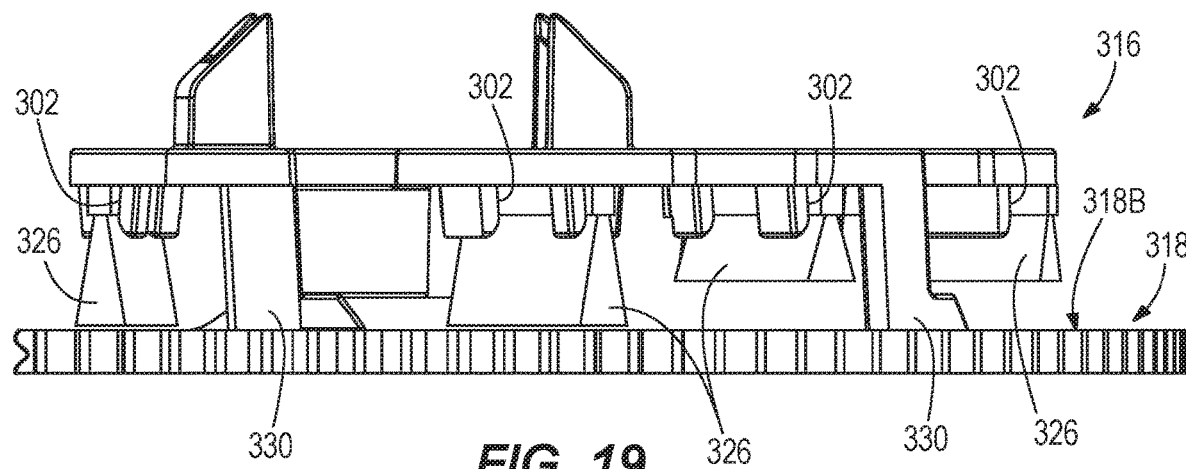
FIG. 19 is a side view of a plurality of singulator brushes of the singulator of FIG. 18.
Figure 20:
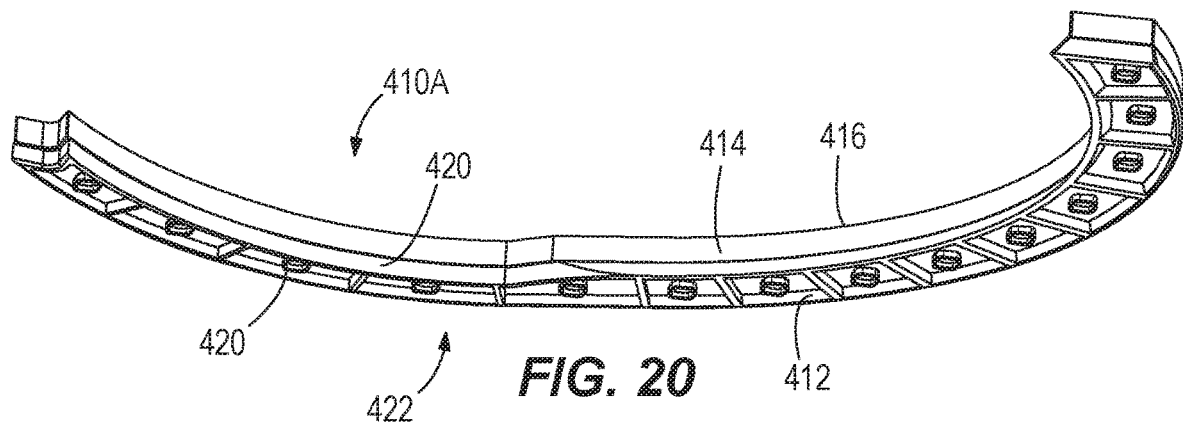
FIG. 20 is a perspective view illustrating a first flexible seal having first and second layers.

As alluded to briefly above, the use of brushes in a singulator is not limited to a notched trailing end brush. Further, a singulator for other crop types, such as wheat, may include singulating elements consisting essentially of one or more brushes, without any knives. FIGS. 18 and 19 illustrate one such singulator 316 and seed meter disk 318 combination. The seed meter disk 318 includes multiple (e.g., five) circumferential rows of seed openings 322, and the singulator 316 includes multiple (e.g., four) brushes 326, each of which extends across multiple ones, for example all four, of the circumferential rows of seed openings 322. In addition to being spaced at unique positions along the singulator 316, between its leading and trailing ends, each brush 326 is of a different configuration (e.g., angle orientation, spacing, if any, to seed-side face 318B of the seed meter disk 318, etc.). Each of the brushes 326 is mounted to the singulator 316 with a brush mounting receptacle 302 as disclosed earlier. Unlike the other singulators 56, 286, that have knives in contact with the respective seed meter disks, the singulator 316 has one or more (e.g., two) seed disk referencers 330 provided separately from the singulation elements to maintain a desired attitude of the singulator 316 with respect to the seed meter disk 318 under bias from the biasing spring 202. The seed disk referencers 330 are rigid upstanding structures, for example having flat surfaces in abutment with the seed-side face 318B, so that the desired attitude of the singulator 316 is maintained, thus maintaining the predetermined spacing (or interference) of each brush 330 with the seed-side face 318B, without relying on the brushes 326 themselves to set the reference to the seed meter disk 318. As shown, the seed disk referencers 330 are provided radially outside the seed openings 322, but one or more referencers can also be positioned radially inside the seed openings 322. It is also noted that the portion of the singulator 316 that receives the hub nose 90A effectively serves as another referencer for the singulator 316 as it is biased against the seed-side face 318B at the center of the seed disk 318. Combinations of the various singulator and seed meter disk features, along with modifications thereof such as the different brush types and configurations, may be used with a variety of different seed meter disk configurations in the construction of various different types of seed meters, not limited to the specific combinations shown herein. It will be apparent that the disclosure sets forth multiple specific operative embodiments, but not all such combinations, enabled by the disclosure.

FIGS. 20-23 show a seal 410 (and specifically a first flexible seal 410A) for use with the seed meter 44. The seal 410 is a flexible seal and includes a first layer and a second layer. The first layer is a rigid back plate 412. The second layer is a material with greater compression and flexibility than the rigid back plate 412, such as a closed-cell foam 414 with a wear resistant low friction plastic surface 416. The second layer may be two ply having an inner compression ply 414 and an outer low-friction surface 416. The flexible seal 410 may be a solid replaceable wear member. Alternatively, the flexible seal 410 may be non-replaceable. Though described as a flexible seal 410, it should be understood that only a portion of the seal 410 may be flexible (having compression) while the structure of the overall seal 410 may be rigid, with only substantial flexibility in one direction (e.g., transverse to the planar direction of the seal 410).

Figure 21:
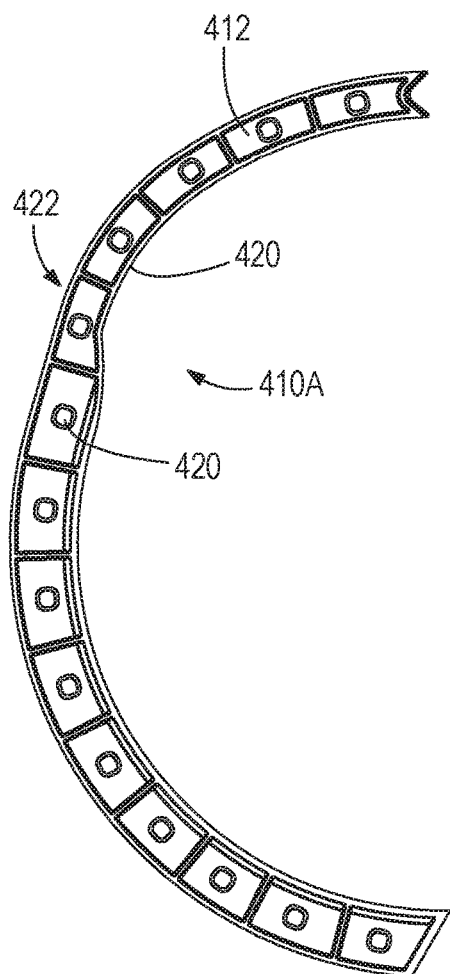
FIG. 21 is a perspective view of the first flexible seal, showing the first layer.
Figure 22:
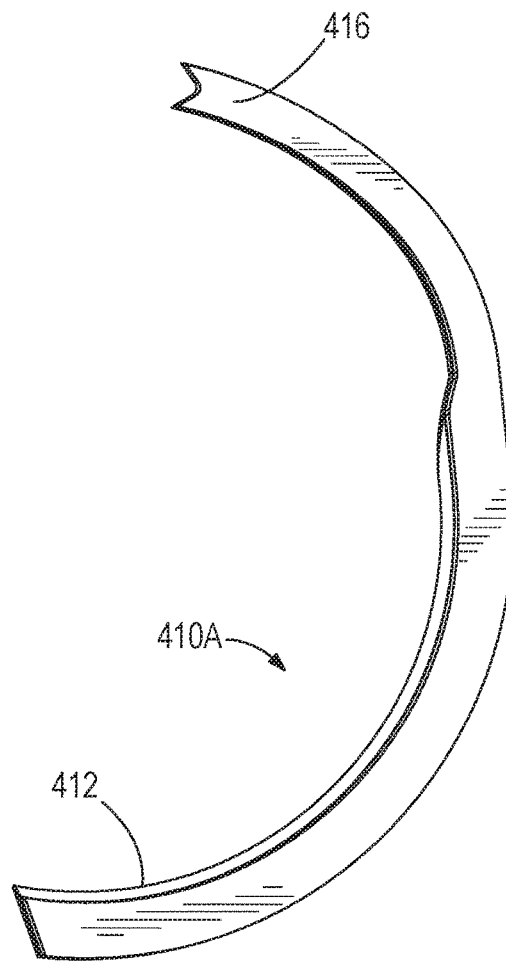
FIG. 22 is a perspective view of the first flexible seal, showing the second layer.
Figure 26:
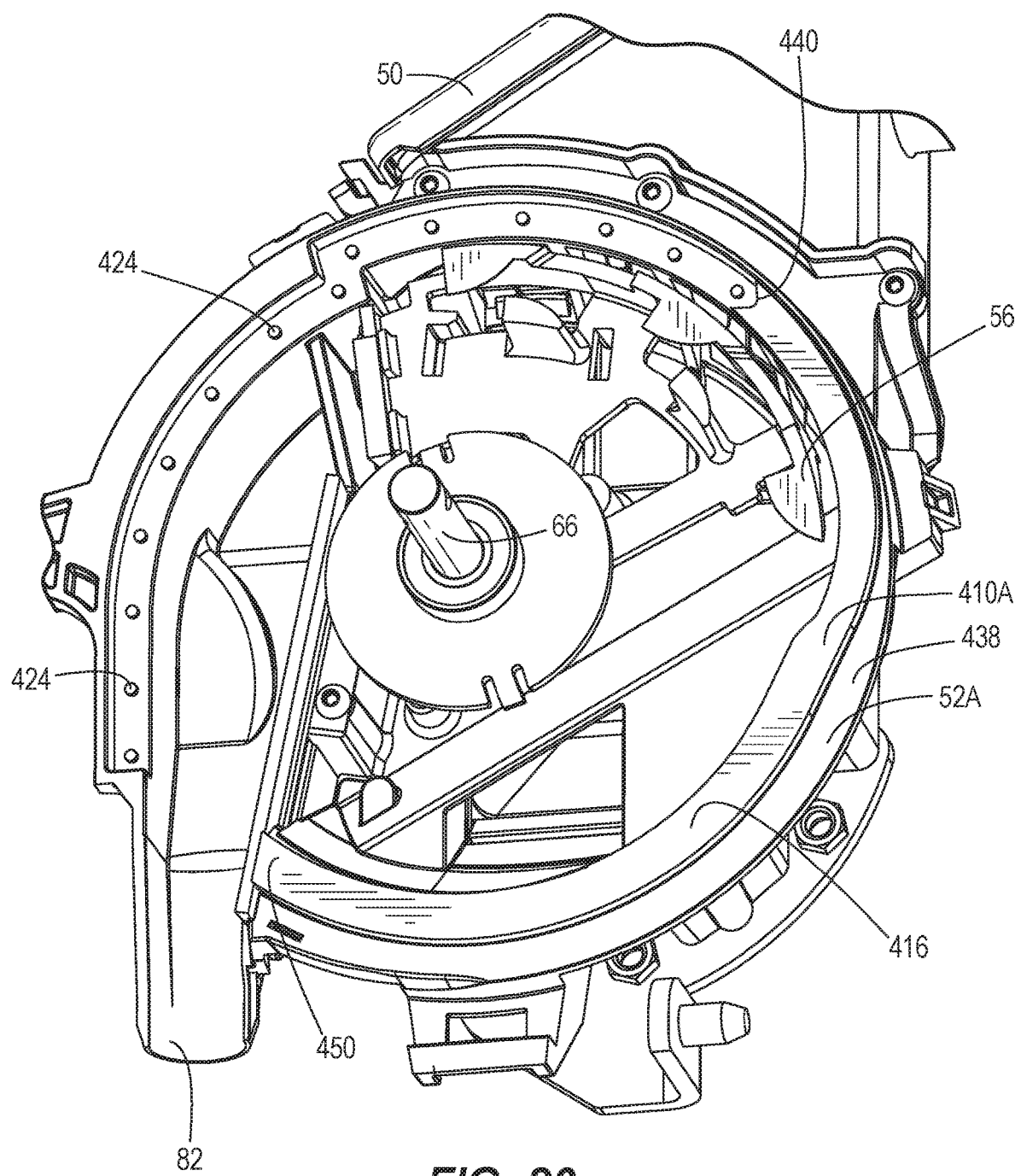
FIG. 26 is another perspective view of the first flexible seal relative to the seed meter.

As shown in FIG. 21, the rigid back plate 412 may have raised portions 420 that form interlocking members 422 for engaging with the front side 52A of the seed disk housing 52. The interlocking members 422 of FIG. 21 include a raised perimeter 420 forming a geometric shape (e.g., rectangular, circular, two spaced apart semi-circles, etc.) that snap to engage with posts 424 (FIG. 26) on the mating surface of the seed meter 44 (i.e., the front of the seed disk housing 52A) when installed. The posts 424 may snap into the raised perimeter 420 forming the closed geometry. Alternatively, the rigid back plate 412 may be provided with posts and the mating surface of the seed meter may include the raised perimeter.

Figure 27:
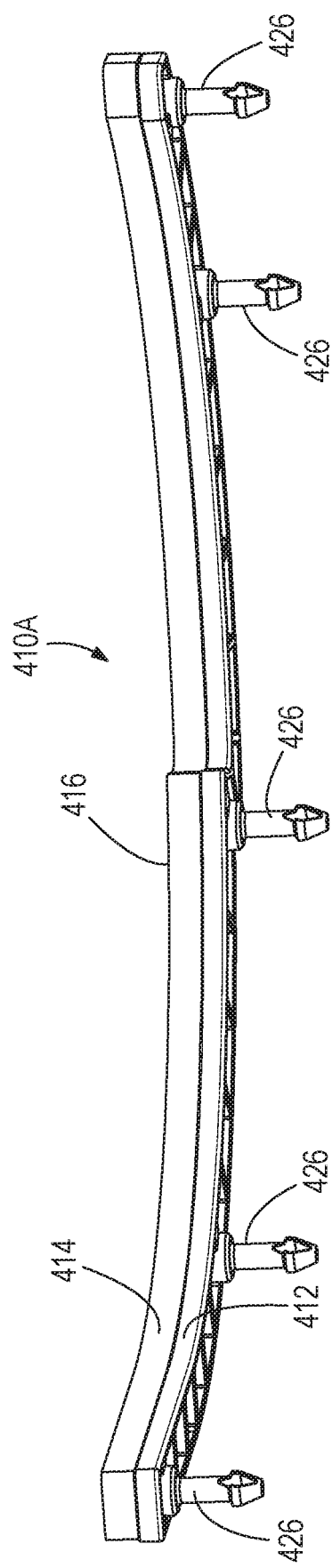
FIG. 27 is a perspective view illustrating a first flexible seal according to another embodiment, the first flexible seal having prongs.
Figure 28:
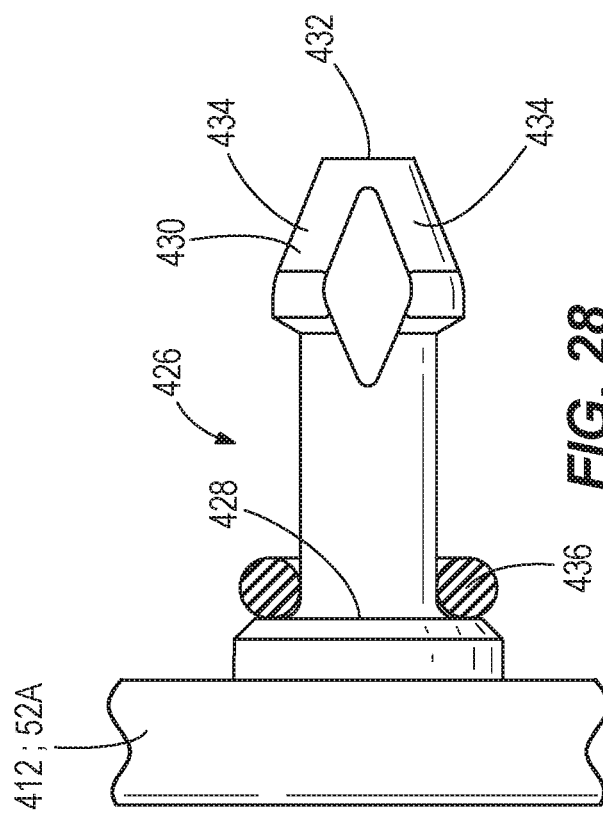
FIG. 28 is a side view of one of the prongs shown in FIG. 27.

Alternatively, as shown in FIGS. 27-28, the rigid back plate 412 may be provided with posts or prongs 426 that extend transverse to the plane of the flexible seal 410. As shown in FIG. 28 specifically, the prongs 426 may be attached to or integrally formed with the rigid back plate 412. Each prong 426 extends from a base 428 at the back plate 412 to a flex portion 430 at a distal end 432. The flex portion 430 includes thin-wall sections 434 that are configured to flex when the prong 426 is axially inserted into an aperture (such as an aperture on the mating surface of the seed meter 44 (i.e., the front of the seed disk housing 52A). Once compressed through the aperture, the flex portion 430 can expand to prevent the prong 426 from disengaging with the aperture 430 unless a predefined axial force compresses the flex portion 430 for removal. An additional sealing member such as an O-ring 436 may be provided on the prong 426. Alternatively, the rigid back plate 412 may be provided with apertures and the mating surface 52A of the seed meter may include prongs.

As a further alternative, the flexible seal 410 may be attached to the mating surface (i.e., the front of the seed disk housing 52A) by an alternative fastener, such as a snap fit about the perimeter of the rigid back plate 412, a tongue-and-groove engagement, a threaded fastener, or an adhesive.

Figure 23:
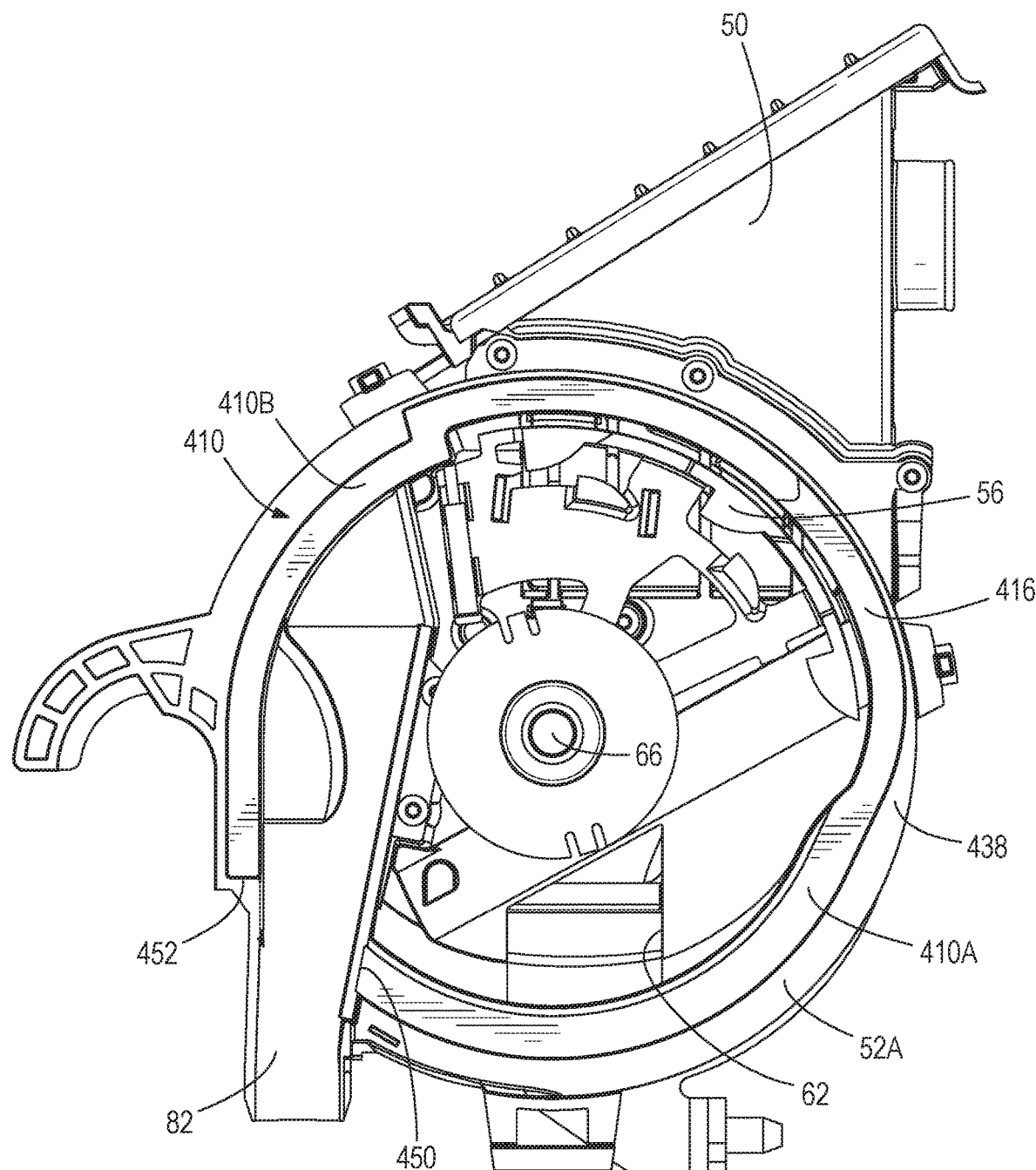
FIG. 23 is a front view of the first flexible seal and a second flexible seal relative to a seed meter.
Figure 24:
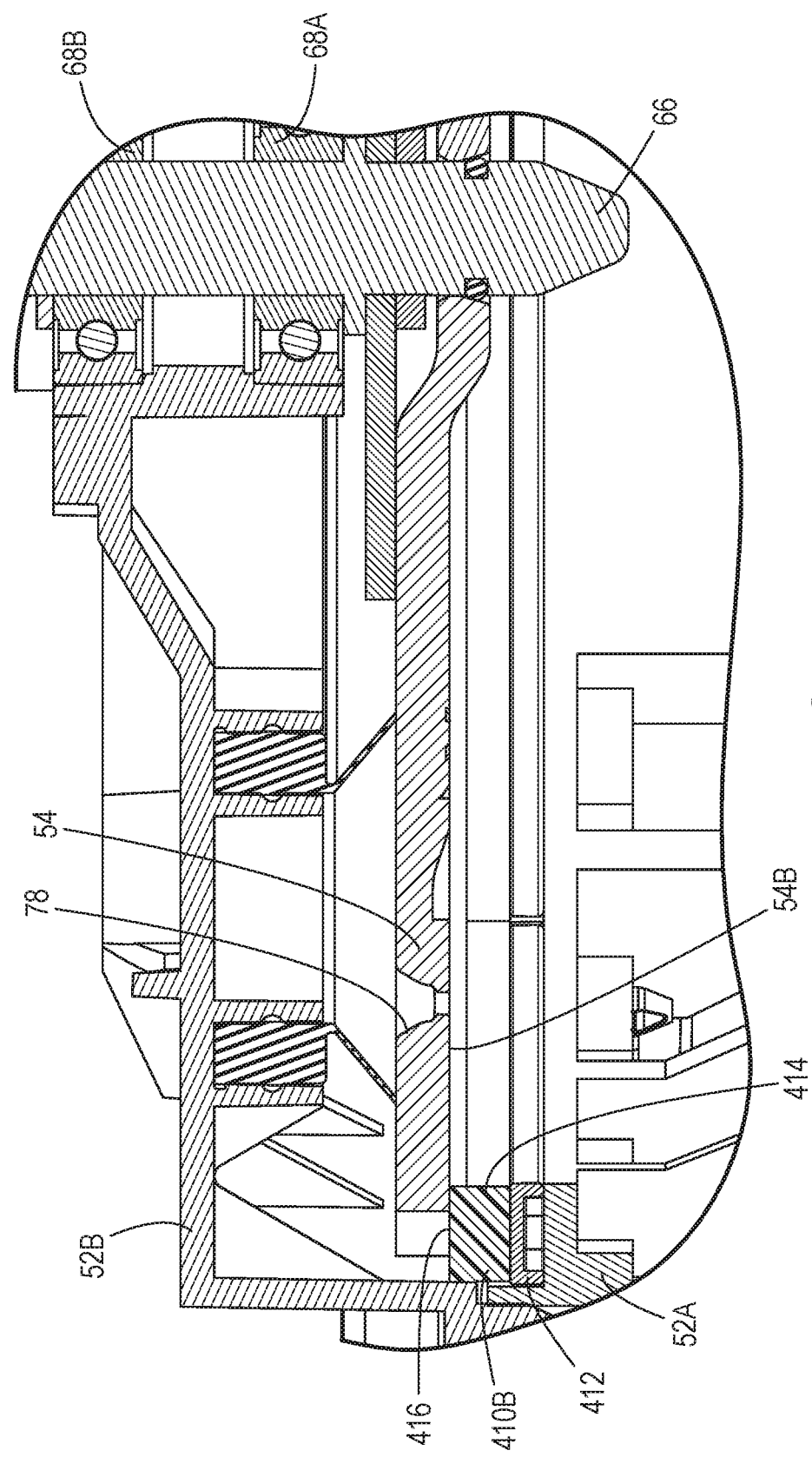
FIG. 24 is a partial cross-sectional view of the flexible seal with respect to the seed meter.
Figure 25:
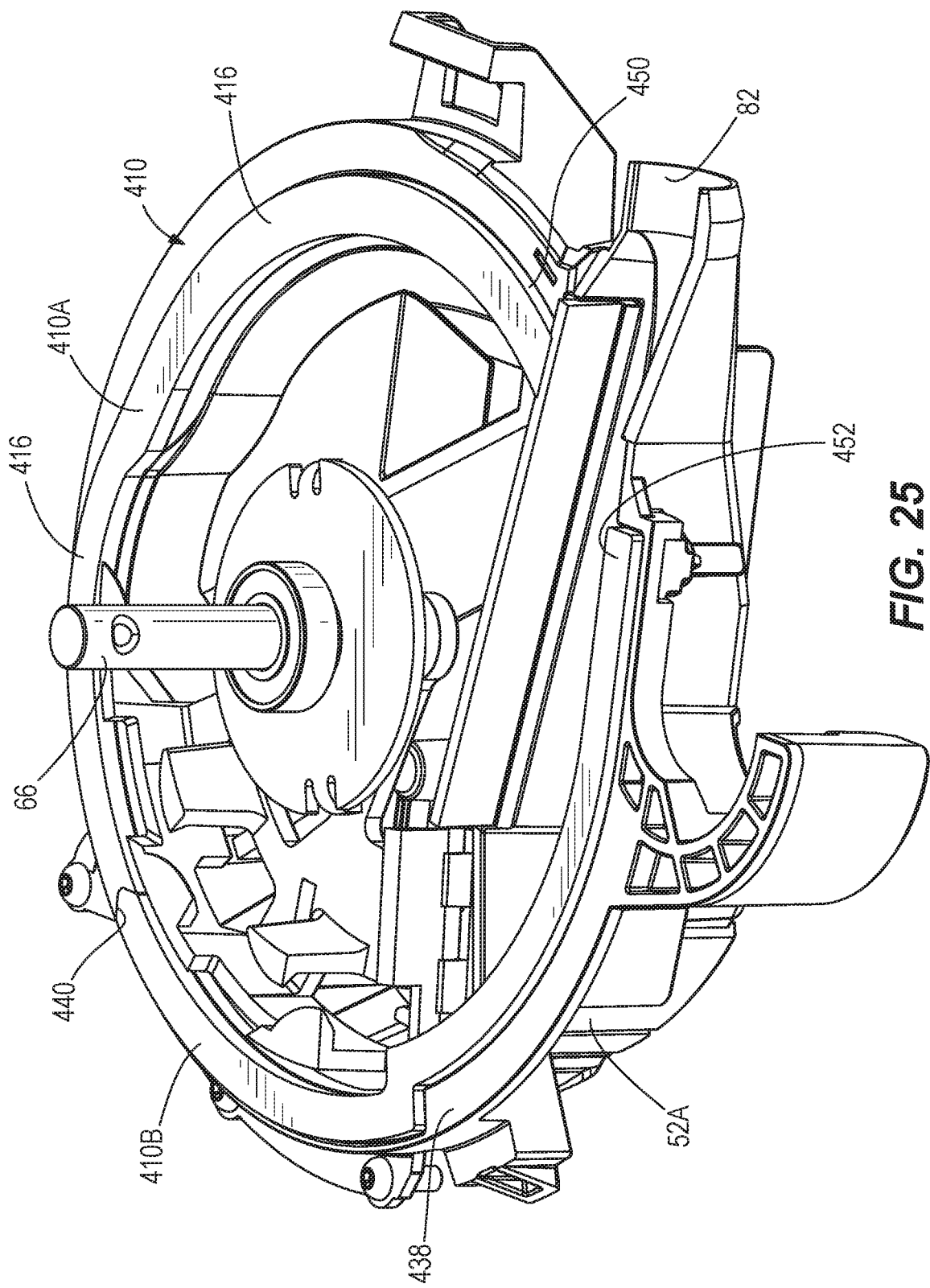
FIG. 25 is a perspective view of the first flexible seal relative to the seed meter.

As shown in FIGS. 23-26, the seed meter 44 includes a front or seed side of the seed disk housing 52A. The front side of the seed disk housing 52A includes the inlet 62 for seeds to transfer from the mini hopper 50 to the seed disk 54 (shown in FIG. 24), where the seeds are singulated prior to planting. The seed meter 44 further includes the rear or vacuum side of the seed disk housing 52B. The rear side 52B is opposite the front side 52A, and as shown in FIG. 24, supports the hub 66 about which the seed disk 54 rotates. Alternatively, in some embodiments, the hub 66 may be supported by (mounted to) the front side 52A. The rear side 52B further includes the air outlet/vacuum source 80 to retain seeds within the apertures 78 in the seed disk 54. Collectively, the front and rear sides 52A, 52B form the seed disk housing that includes the seed inlet 62 from the mini hopper 50, the seed outlet 82 from the seed disk 54, and the air outlet/vacuum source 80.

As shown in FIG. 23, the seal 410 includes the first flexible seal 410A and a second flexible seal 410B to collectively seal around the perimeter or periphery 438 of the front side of the seed disk housing 52A. The seal 410 terminates short of a completed loop to provide an opening for the seed outlet 82. Therefore, the seal 410 extends from a first end 450 at the seed outlet 82, along the curved length of the first seal 410A, along the curved length of the second seal 410B, and to a second end 452 at the opposite edge of the seed outlet 82. The second end 452 is opposite the first end 450. If the seed outlet 82 were offset from the central plane defined between the front and rear sides of the seed disk housing 52A, 52B such that the seed outlet 82 was formed fully within the front side of the seed disk housing 52A, the flexible seal 410 could form a completed loop. As shown, the first and second flexible seals 410A, 410B mate at a nonlinear interface 440 (e.g., chevron interface) to reduce the potential for a leakage path at the interface 440 and to prevent/prohibit expansion or alignment issues. Though shown in two components 410A, 410B, the flexible seal 410 could be formed of more or less pieces. Producing the flexible seal 410 with at least two components 410A, 410B limits waste in manufacturing by nesting multiple seals 410A, 410B within one another when cutting from a large sheet of material.

If seeds get stuck between the seed disk 54 and the housing 52 or stuck within the outer teeth 54A of the seed disk 54, the seed can be ground or pulverized. This may lead to a decrease in efficiency and may detrimentally increase friction between the disk 54 and the housing 52 if seeds become jammed therebetween. The flexible seal 410 is positioned against the seed-side planar face 54B of the seed disk to prevent seeds, especially small seeds like canola, from slipping between the seed disk 54 and the seed disk housing 52 when the seed disk is rotating. The seal 410 prevents or limits seed loss around the seed disk 54. The low-friction surface 416 rides against the seed disk 54. Shims (not shown) may be placed on sides of the bearings 68A, 68B to set the axial position of the seed disk 54 relative to the seed disk housing 52. However, use of the seal 410 may minimize or eliminate the need for shimming of the seed disk 54 relative to the housing 52.

Figure 29:
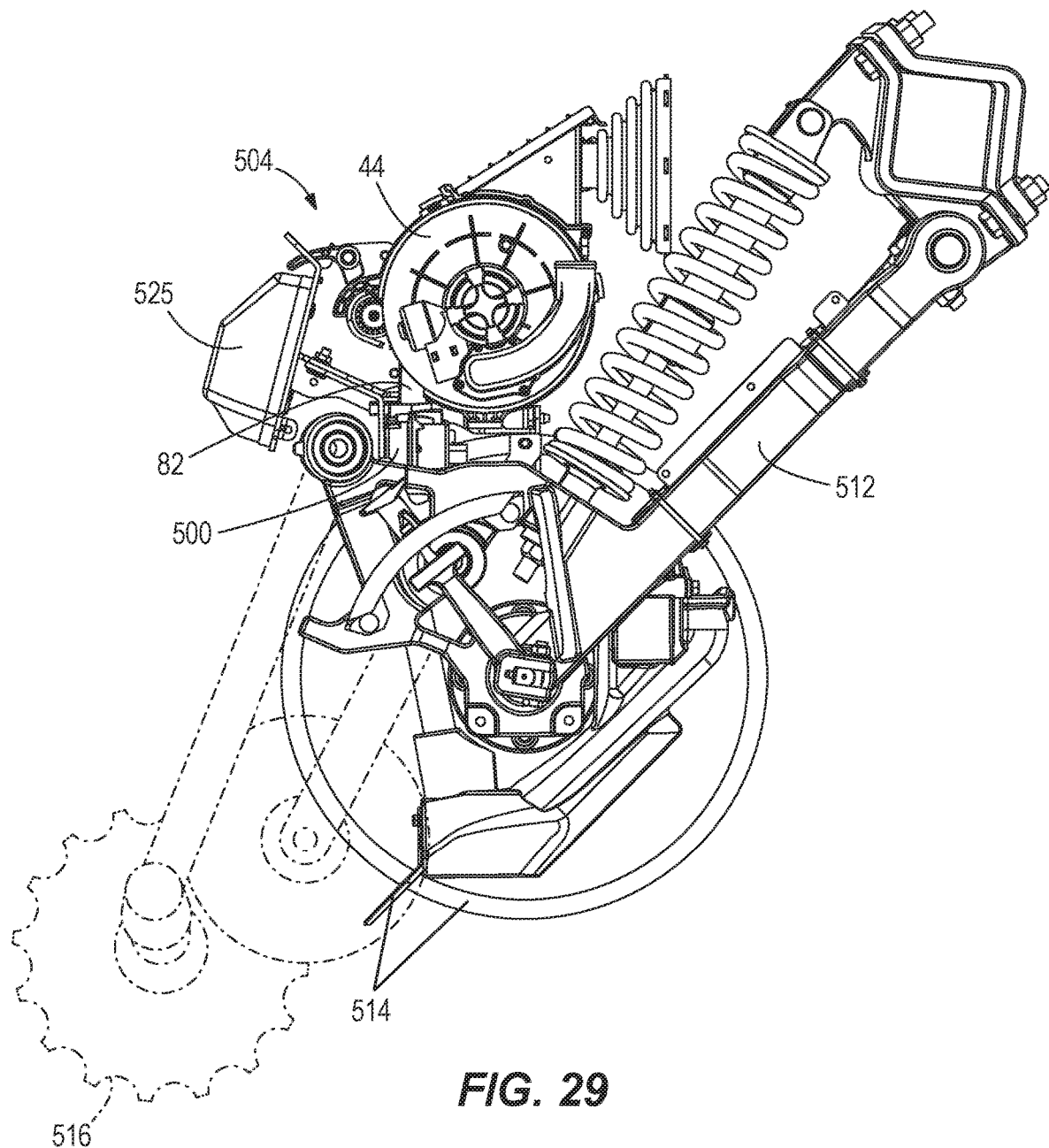
FIG. 29 is a side view of an exemplary air seeding row unit having a seed sensor according to one embodiment of the present disclosure.
Figure 32:
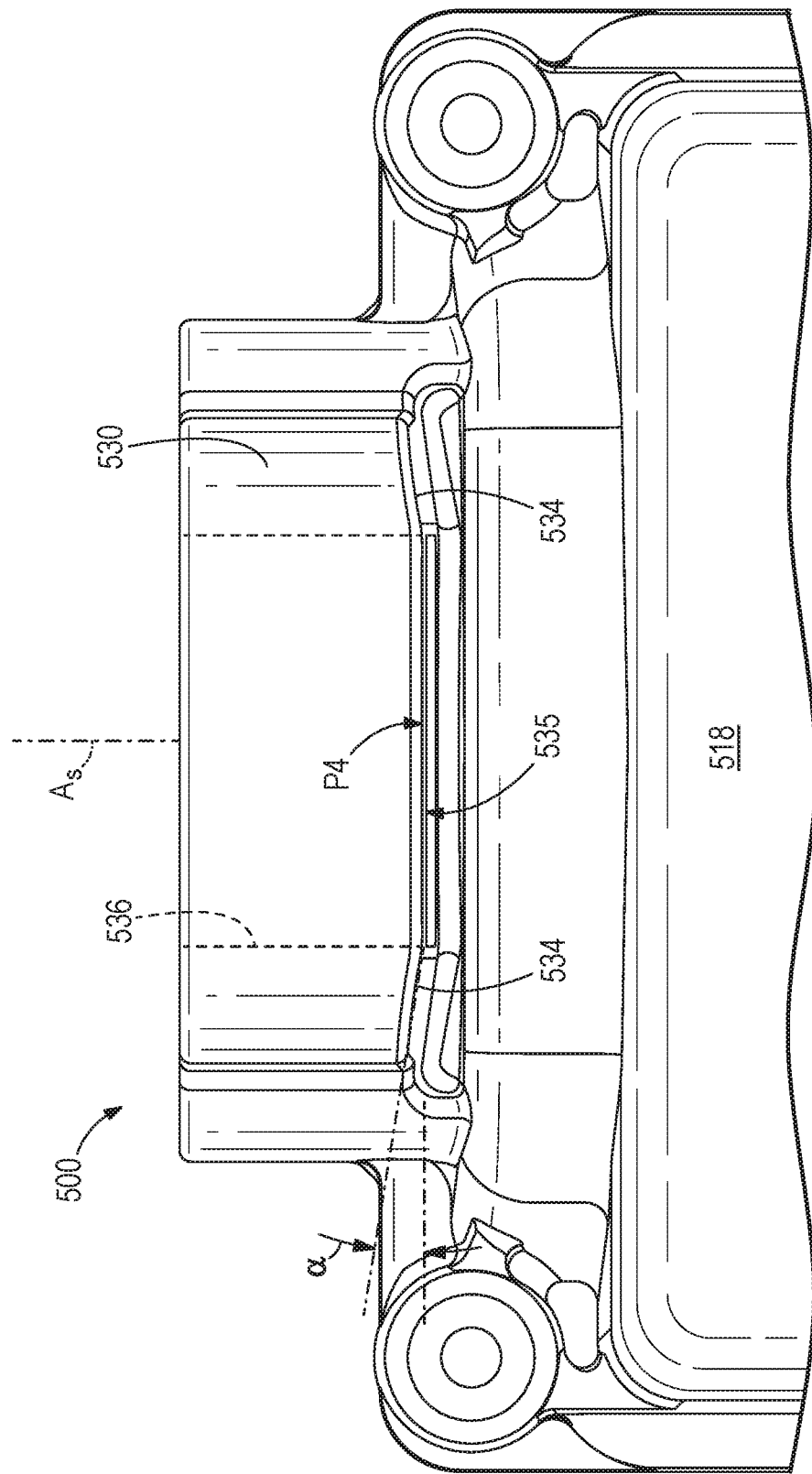
FIG. 32 is a detail rear view of an upper portion of the seed sensor having angled support surfaces to enable the configurations of both FIGS. 30 and 31.
Figure 33:
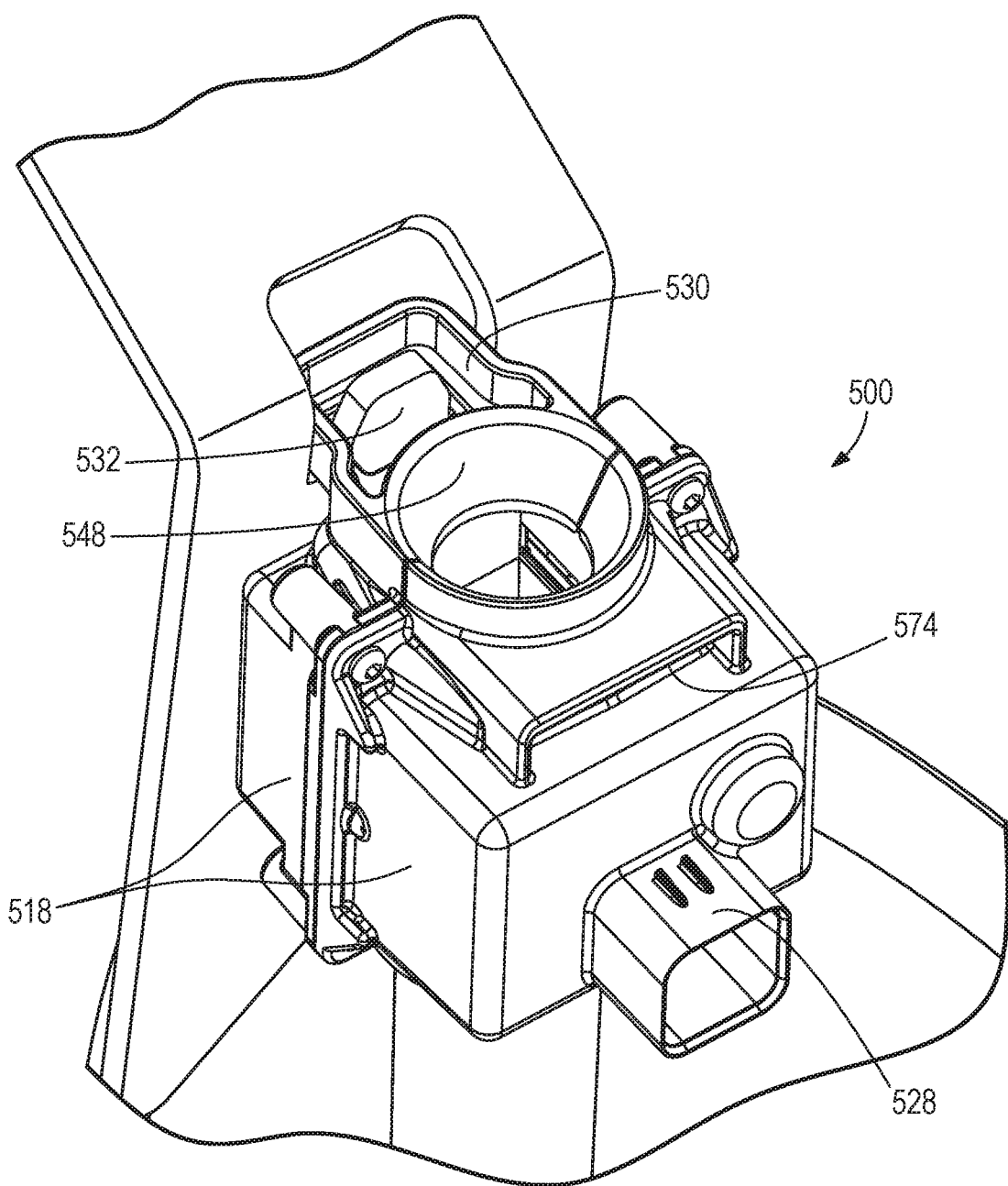
FIG. 33 is a perspective view of an upper portion of the seed sensor, illustrating a loop thereof engaged with a portion of the row unit frame.
Figure 34:
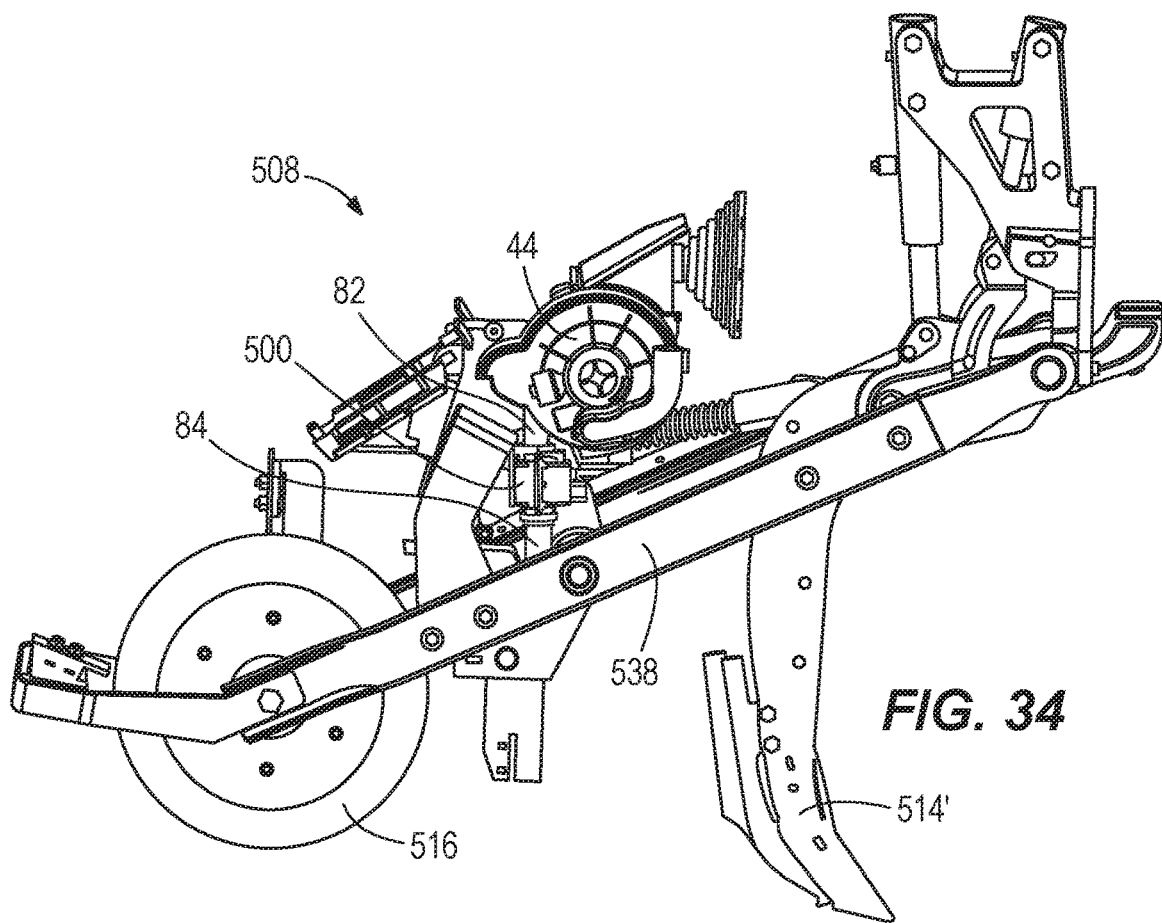
FIG. 34 is a side view of another exemplary air seeding row unit having the seed sensor of FIGS. 29-33.
Figure 40:
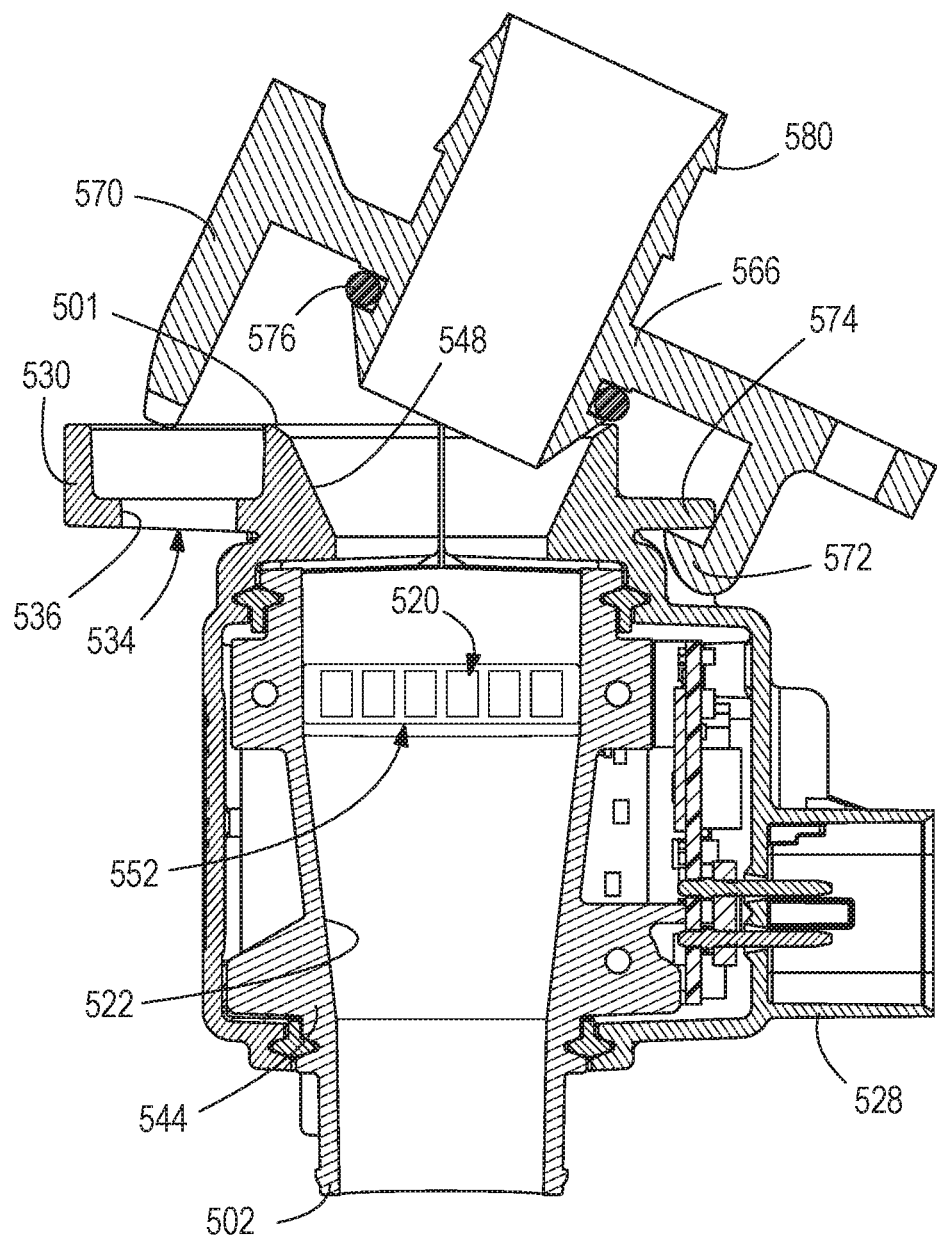
FIG. 40 is another cross-section of the seed sensor, identical to FIG. 39 except for the snap-on adapter being shown with a clip thereof being released from the seed sensor loop.

FIGS. 29 through 40 illustrate a seed sensor 500 including a number of features that enable its mounting and use in a variety of diverse configurations within the construct of an agricultural work vehicle 10 such as that of FIG. 1. In particular, FIGS. 29 and 34 illustrate the seed sensor 500 mounted in two different types of agricultural air seeder openers 504, 508 (or "row units"). In each case, the seed sensor 500 interfaces with the seed meter 44 on the opener 504, 508, but the nature of the interface is different as discussed further below. Further, the same seed sensor 500 can also be used in an in-line sensor configuration where the seed sensor 500 is positioned at the connection between two adjacent sections of seed hose. For example, such a configuration may be utilized in volumetric seeding where no device for seed metering is utilized. FIGS. 38-40 relate to such a configuration. For the purposes of this disclosure, the term "hose" may refer to hollow conduits of various types, constructions, and materials, which are sometimes referred to as "tubes" as well.

As shown in FIG. 29, the opener 504 includes an opener frame 512 that supports, among other things, the seed meter 44, a ground opener 514, a closing wheel 516, and the seed sensor 500. A press wheel can be provided between the ground opener 514 and the closing wheel 516. The seed sensor 500 is coupled between the seed meter outlet 82 and the outlet chute 84 (or "seed tube"). As will be discussed in further detail below, the seed sensor 500 includes a housing 518, a mounting structure (e.g., a bracket or loop 530, FIGS. 32 and 33), and a sensor unit (e.g., an optical sensor unit 520, FIGS. 39-40). The seed sensor 500 is hollow to define, between respective inlet and outlet ends 501, 502, an internal seed channel 522 defining a path for seeds to flow along a central axis $A_s$ through the seed sensor 500. As illustrated, every seed discharged from the seed meter 44 must pass through the seed sensor 500 to reach the ground furrow for seeding, and thus, the seed sensor 500 operates to detect and report (i.e., to a controller 525) each and every seed discharged from the seed meter 44 for seeding or drilling. To provide electrical communication from the seed sensor 500 to the controller 525 (and optionally to provide power to the seed sensor 500), the seed sensor 500 includes an electrical connector 528. The electrical connector 528 can be constructed as one half of a plug-and-socket pair in which interfitting bodies (e.g., molded plug and socket bodies) are respectively provided with conductor pins and matched conductor pin receivers. As shown in more detail in the later figures, the illustrated electrical connector 528 is constructed as a socket in which multiple conductor pins are housed so that a plug member having conductor pin receivers can be received at least partially within the socket while establishing electrical contact between the pins and pin receivers. In the illustrated construction, an outer surface of the housing 518 defines the electrical connector 528, e.g., as an integral portion thereof. The electrical connector 528 can be positioned adjacent the outlet end 502 as shown. Furthermore, the electrical connector 528 can be positioned on an opposite side of the central axis $A_s$ as compared to the mounting loop 530.

Figure 30:
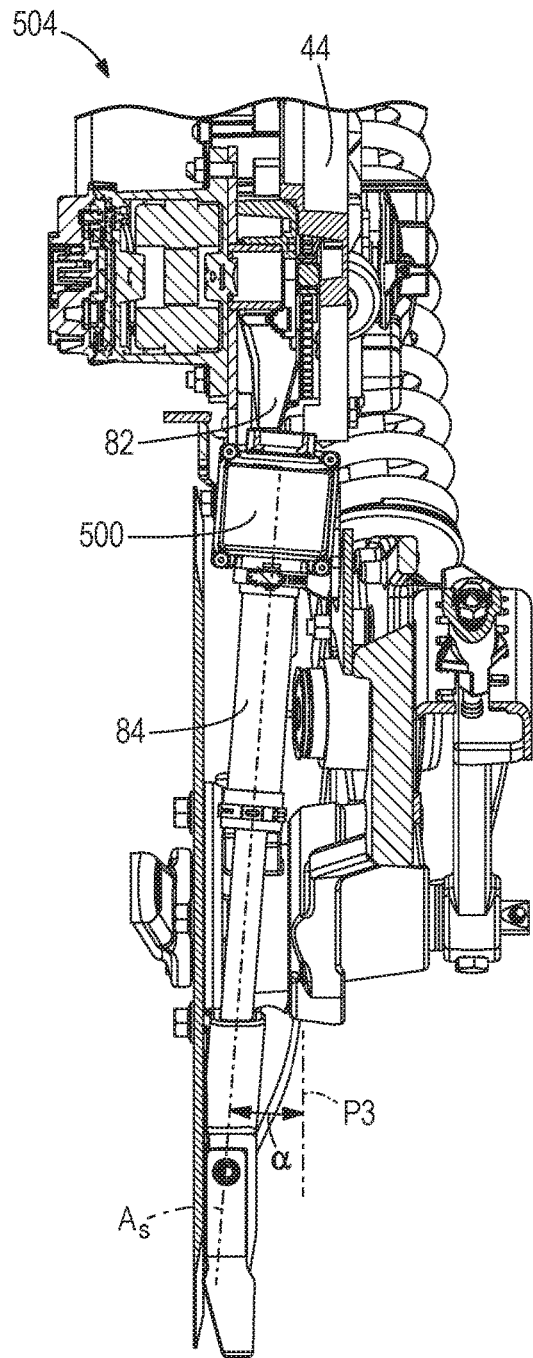
FIG. 30 is a rear view of a left-hand opener air seeding row unit according to the embodiment shown in FIG. 29.
Figure 31:
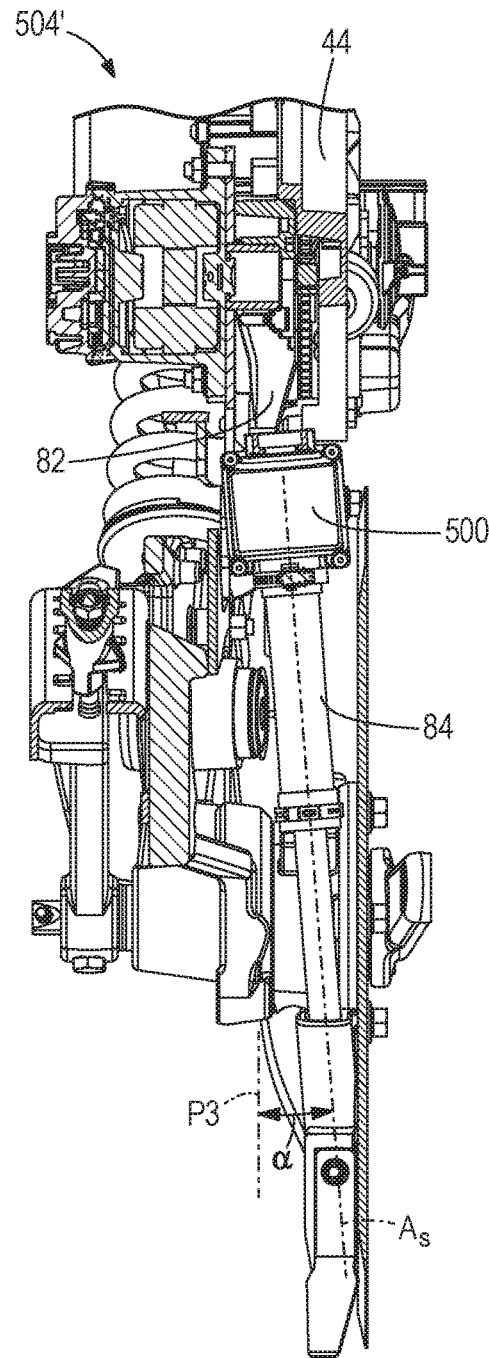
FIG. 31 is a rear view of a right-hand opener air seeding row unit according to the embodiment shown in FIG. 29.

As shown in FIGS. 30-32, the seed sensor 500 is structurally adapted for use in the opener 504, whether configured as a left-hand opener (FIG. 30) or a right hand opener 504' (FIG. 31). The openers 504, 504' are otherwise identical, and as can be seen in comparing FIGS. 30 and 31, the seed tube 84 can be oriented at an angle α from the central fore-aft plane P3, despite the seed meter 44 and seed meter outlet 82 being aligned with the central fore-aft plane P3. The angle α is introduced by a feature on the seed sensor 500 where it mounts to the opener frame 512. As shown in FIGS. 32 and 33, the mounting loop 530 loops over an upwardly extending tongue 532 of the opener frame 512. The loop 530 extends to define a plane P4 that is transverse to the central axis $A_s$ through the seed sensor 500, and an opening 536 is defined through the loop 530 in a direction parallel to the central axis $A_s$. A bottom surface of the loop 530 includes portions 534, for example opposite lateral side portions, angled oppositely from each other at the angle α (with reference to the plane P4). As shown, a portion of the bottom loop surface 535 between the side portions 534 can extend along the plane P4, or parallel to the plane P4, which may alternately be defined through a center or along a top surface of the loop 530. When the seed sensor 500 is mounted on the opener frame 512 with the loop 530 over the tongue 532, one of the side portions 534 engages the opener frame 512 to set the angle α of the seed sensor 500 and the seed tube 84 with respect to the central fore-aft plane P3 to the desired side for the opener 504, depending on whether the opener 504 is configured as a left-hand opener or a right-hand opener. The angle α may take a variety of values. In some constructions, the angle α is at least 2 degrees and not more than 10 degrees. In some constructions, the angle α is at least 2 degrees and not more than 6 degrees, and may for example be 4 degrees. The mounting of the seed sensor 500 is important in achieving the desired angular offset of the seed tube 84 as shown in FIGS. 30 and 31 because the seed tube 84 of the opener 504 hangs from the seed sensor 500 and is not separately mounted or fixed to the opener frame 512. For example, the upstream end of the seed tube 84 may be clamped onto the outlet end 502 of the seed sensor 500. However, this is unique to the opener 504, and the seed sensor 500 can also be used in a different type of configuration within the opener 508 of FIGS. 34-37.

In the opener 508 of FIGS. 34-37, the ground opener 514' (a hoe point in this case, as opposed to the disk ground opener of the opener 504) is provided with a substantial forward offset from the seed tube 84 such that the seed tube 84 can extend straight down from the seed meter 44. Furthermore, the opener frame 538 of the opener 508 is provided with a support 540 that extends below the seed sensor 500 and fixes a position and orientation of the upper end of the seed tube 84 to which the outlet end 502 of the seed sensor 500 is coupled. As such, the seed sensor 500 and the seed tube 84 may be devoid of a fixed connection therebetween (i.e., unsecured with no locking or clamping), other than the outlet end of the seed sensor 500 being set into and/or pressed against the seed tube 84. The connection between the seed sensor 500 and the seed tube 84 is furthermore devoid of any fasteners and does not require the use of tools for connection and disconnection. The opener frame 538 includes a tongue 532 like the opener 504, but the seed sensor 500 is supported from below by the support 540 such that it does not hang from the tongue 532 in some constructions. The seed sensor 500 may contact the tongue 532 with the un-angled portion of the bottom loop surface 535 between the side portions 534 in the case of the opener 508, or the loop 530 of the seed sensor 500 may simply pass over the tongue 532 without resting thereon. In the case of both the first and second openers 504, 508, the seed sensor 500, once mounted, provides a locating point for installation of the seed meter 44. In other words, the seed meter outlet 82 engages with the inlet end 501 of the seed sensor 500 to properly position the seed meter 44 on the opener 504, 508 before the seed meter 44 is ultimately secured to the opener frame 512, 538. The connection between the seed meter outlet 82 and the seed sensor 500 may be devoid of a fixed connection therebetween (i.e., unsecured with no locking or clamping), other than the seed meter outlet 82 being set into and/or pressed against the seed sensor inlet end 501. The connection between the seed sensor 500 and the seed meter outlet 82 is furthermore devoid of any fasteners and does not require the use of tools for connection and disconnection.

Figure 35:
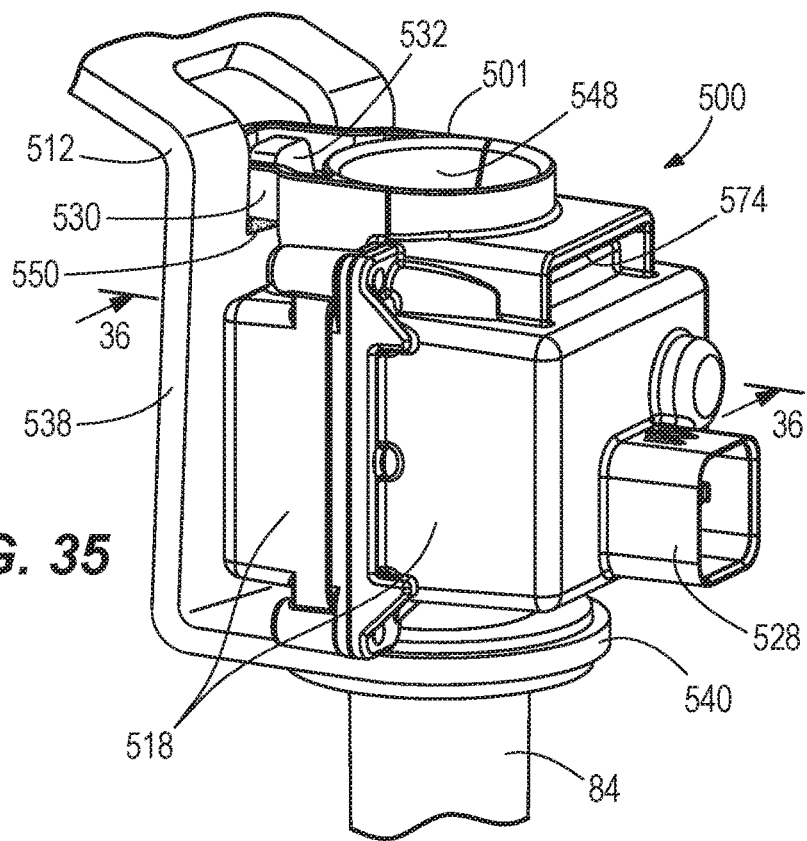
FIG. 35 is a perspective view of the seed sensor, illustrating the mounting configuration with the bracketry of the air seeding row unit.
Figure 36:
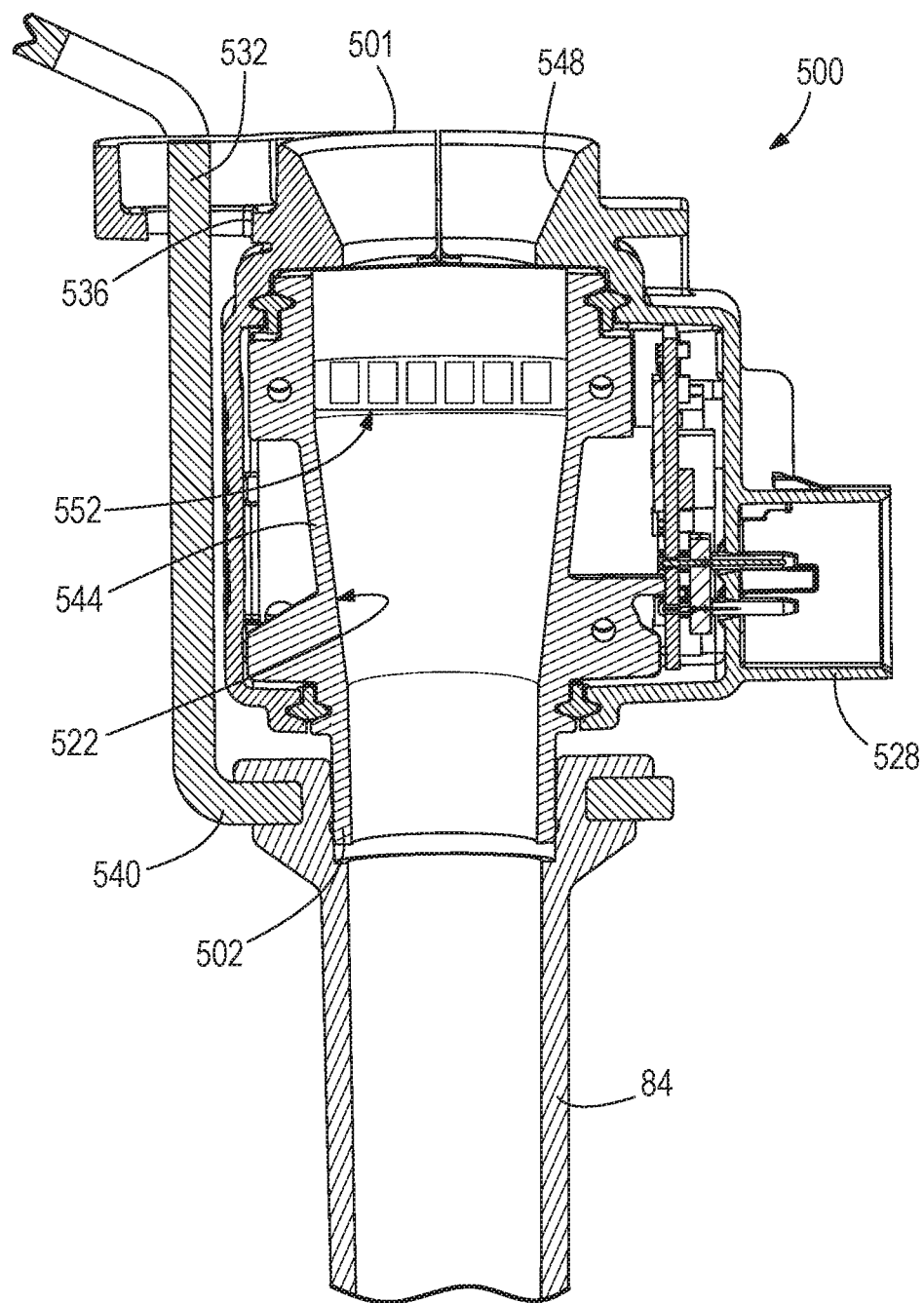
FIG. 36 is a cross-section view of the mounted seed sensor, taken along line 36-36 of FIG. 35.
Figure 37:
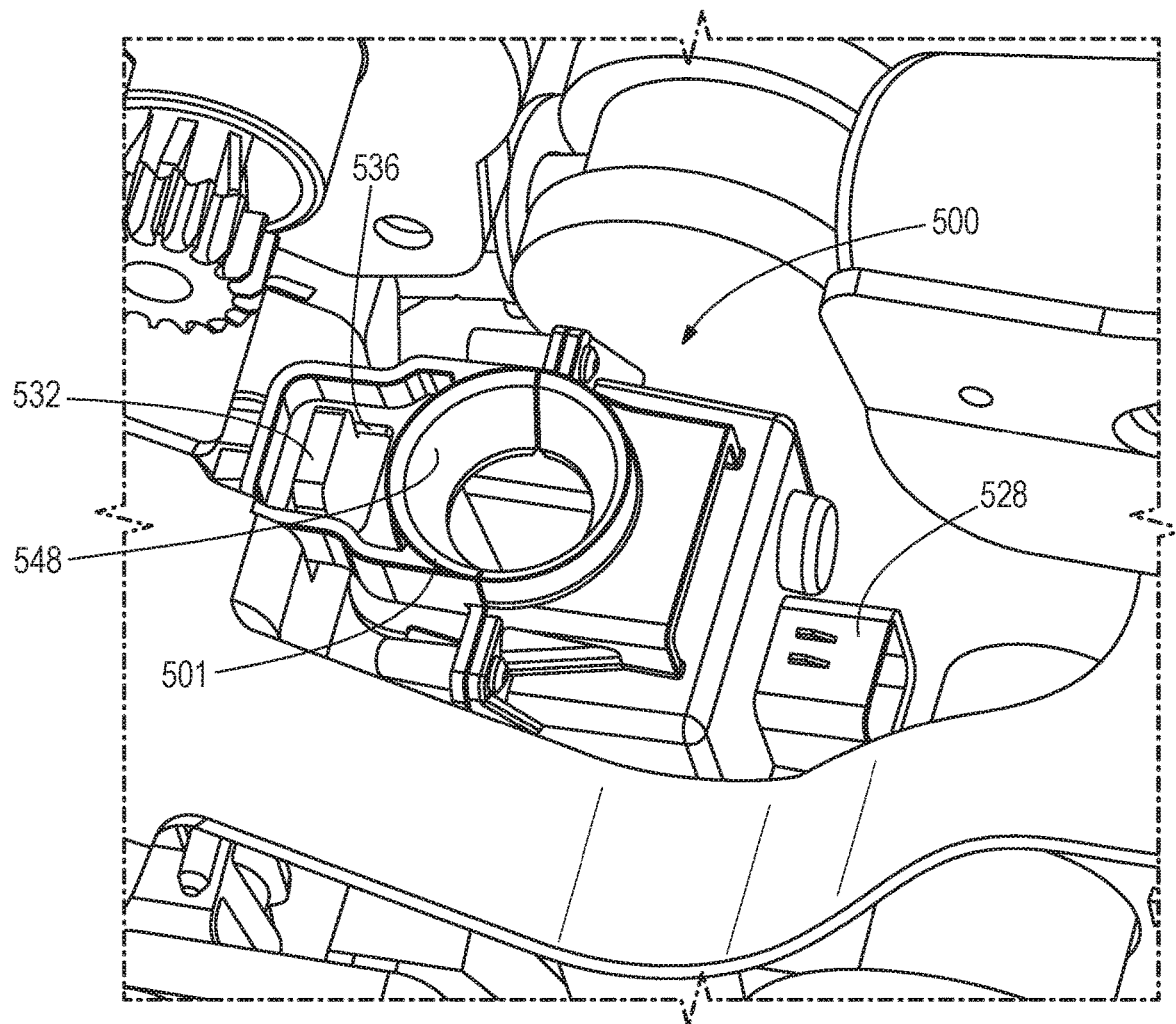
FIG. 37 is a perspective view of an upper portion of the seed sensor mounted on the frame of the air seeding row unit of FIG. 34.

The inlet end 501 of the seed sensor 500, which also forms the inlet end of the seed channel 522 through the sensor, is formed in the illustrated construction by the housing 518. Other portions of the seed channel 522, including interior to the housing 518 and down to the outlet end 502 that projects outward from the housing 518 according to the illustrated construction are formed by a separate conduit member 544 secured within the housing 518. The inlet end 501 directs seeds into an upstream end of the conduit member 544. More particularly, an inlet section 548 of the seed channel 522 extending from the inlet end 501 tapers in cross-section toward an interior of the seed sensor 500. Aspects of the cross-section of the seed channel 522 discussed herein refer to cross-sections taken perpendicular to the central axis $A_s$, unless noted otherwise, for example, as in the cross-section taken along the central axis $A_s$ shown in FIG. 36. The lengthwise cross-section of FIG. 36 illustrates the shape of the taper of the inlet section 548. The tapered inlet section 548 can form a section of a cone (i.e., frusto-conical), a section of a sphere (i.e., frusto-spherical), or a section of a revolved parabola, for example. The surface(s) defining the tapered inlet section 548 form the receiving end of the press-in or set-in connection with the seed meter outlet 82 discussed above. As shown in FIG. 35, a resilient member(s) 550 is provided at a location to be elastically compressed between the opener frame 512 and the loop 530 upon engagement of the seed meter outlet end 82 with the tapered inlet section 548 of the seed sensor 500. This may function to apply an upward bias force through the seed sensor 500 to the seed meter 44 to self-align or co-align these components together automatically upon installation. It should be noted that the resilient member(s) 550 can be integrated as part of the opener frame 512, the seed sensor, or may be separate therefrom.

The tapered inlet section 548 leads toward a target viewing position 552 defined by the sensor unit 520. As illustrated, the sensing unit 520 is positioned alongside the internal seed channel 522, within the housing 518, for example adjacent the conduit member 544. The sensor unit 520 can include optical sensor elements on one side of the seed channel 522 and one or more corresponding lighting elements on an opposite side of the seed channel 522. The lighting elements can emit light toward the optical sensor elements, and the interruption of light received due to passage of seeds can be detected and conveyed to the controller 525 as the seed count.

A cross-sectional area of the seed channel 522 at the target viewing position 552 is greater than the area of the cross-section directly upstream, at a downstream end of the tapered inlet section 548. From the target viewing position 552, the seed channel 522 tapers in cross-section toward its outlet end. Moreover, it is noted that the seed channel 522 at the location of the target viewing position 552 is flat-sided in cross-section, taken perpendicular to the central axis $A_s$. This contrasts with the circular cross-section at both the inlet and outlet ends 501, 502. Thus, the seed channel 522 not only changes in cross-sectional area along the axial direction, but also includes at least two regions of shape transformation—one upstream of the target viewing position 552 and one downstream of the target viewing position 552. Due to the joint construction of the seed channel 522, only part of which is defined by the conduit member 544, the inlet end of the conduit member 544 can have a flat-sided cross-section. As illustrated, the cross-section of the seed channel 522 is rectangular at both the inlet end of the conduit member 544 and at the target viewing position 552 just downstream.

As shown in FIGS. 38-40, a third configuration for the seed sensor 500 includes an in-line configuration along a run of seed hose for example, apart from any seed meter. The seed sensor 500 in such a configuration is provided with an adapter (e.g., an inlet end adapter 566). The inlet end adapter 566 has a downstream end received within the tapered inlet section 548 of the seed channel 522. The inlet end adapter 566 is a snap-on adapter that can be attached to and detached from the seed sensor housing 518 by hand, without tools. A resilient clip 570 of the inlet end adapter 566 is received by and secured with the opening 536 defined by the loop 530. The inlet end adapter 566 also engages the seed sensor 500 on the opposite side from the mounting loop 530. In particular, a hook 572 of the inlet end adapter 566 is received by a receptacle 574 formed in the housing 518 at a position opposite the loop so that the inlet end adapter 566 can pivot about the hook 572 to slide the resilient clip 570 through the opening 536, while simultaneously compressing a seal 576 of the inlet end adapter 566 into the tapered inlet section 548. In clipped engagement, opposing prongs of the resilient clip 570 engage respective retainer surfaces of the loop 530, and these retainer surfaces can be the bottom surface side portions 534 that are individually angled in opposite directions with respect to the transverse reference plane P4. The inlet end of the inlet end adapter 566 is formed by a barbed stem 580 adapted for engagement with the interior surface of a seed hose end (e.g., a 1-inch inner diameter hose). Likewise, the outlet end 502 of the seed sensor as formed by the protruding portion of the conduit member 544 can be coupled with another seed hose end (e.g., by insertion into the seed hose end and/or a hose clamp).

The seed meters 44 are mounted to a mount or mounting bracket 610 at a height above the ground and above the ground system 38, and specifically, the motor 72 and the seed meter housing 52 are positioned on the mount 610. With the mini-hopper 50 mounted to the seed meter housing 52, the mini-hopper 50 is likewise positioned on the mount 610. The mount 610 is fixed relative to the ground system via a frame 612.

Figure 43:
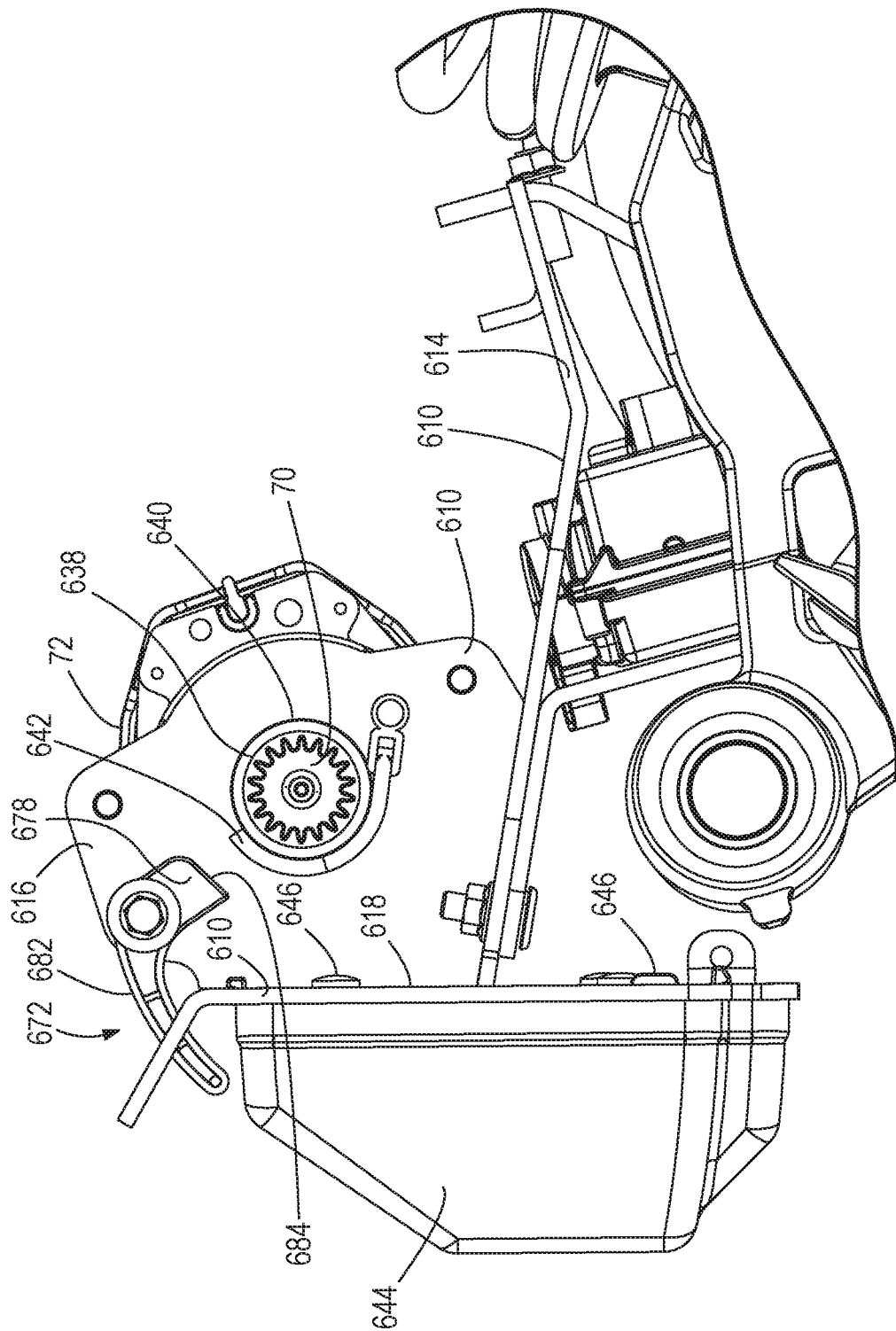
FIG. 43 is a side view of a motor, a motor output shaft, and a mounting bracket of the seed meter of FIG. 1.
Figure 44:
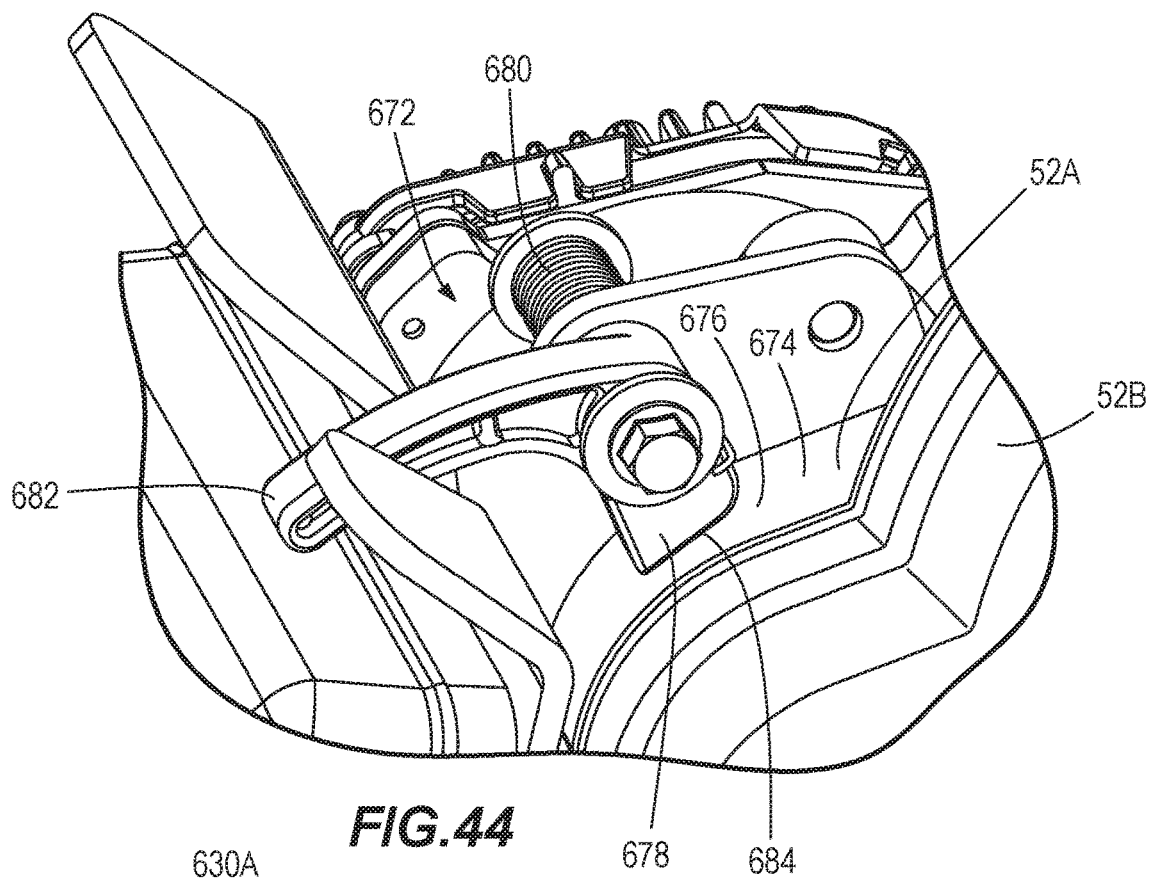
FIG. 44 is a perspective view of a release lever of the seed meter of FIG. 1.

As shown best in FIG. 43, the mount 610 includes a meter mounting portion 614, a motor mounting portion 616, and a controller mounting portion 618. The three mounting portions 614, 616, 618 may be formed of a single component, or may otherwise be formed by multiple components attached (e.g., fastened, welded) to one another. The meter mounting portion 614 extends between two frame mounting points 620A, 620B, where the mount 610 is fastened to the frame 612. Specifically, fasteners 622 (e.g., threaded fasteners, rivets, etc.) extend through the frame 612 and into the mount 610 to fix the mount 610 to the frame 612. The frame mounting points 620A, 620B are axially offset from one another to distribute the holding forces in multiple planes. The location and orientation of the mounting points 620A, 620B shown in FIG. 43 further dictates that the meter mounting portion 618 includes a bend 626 to facilitate alignment with the mounting points 620A, 620B.

Figure 45:
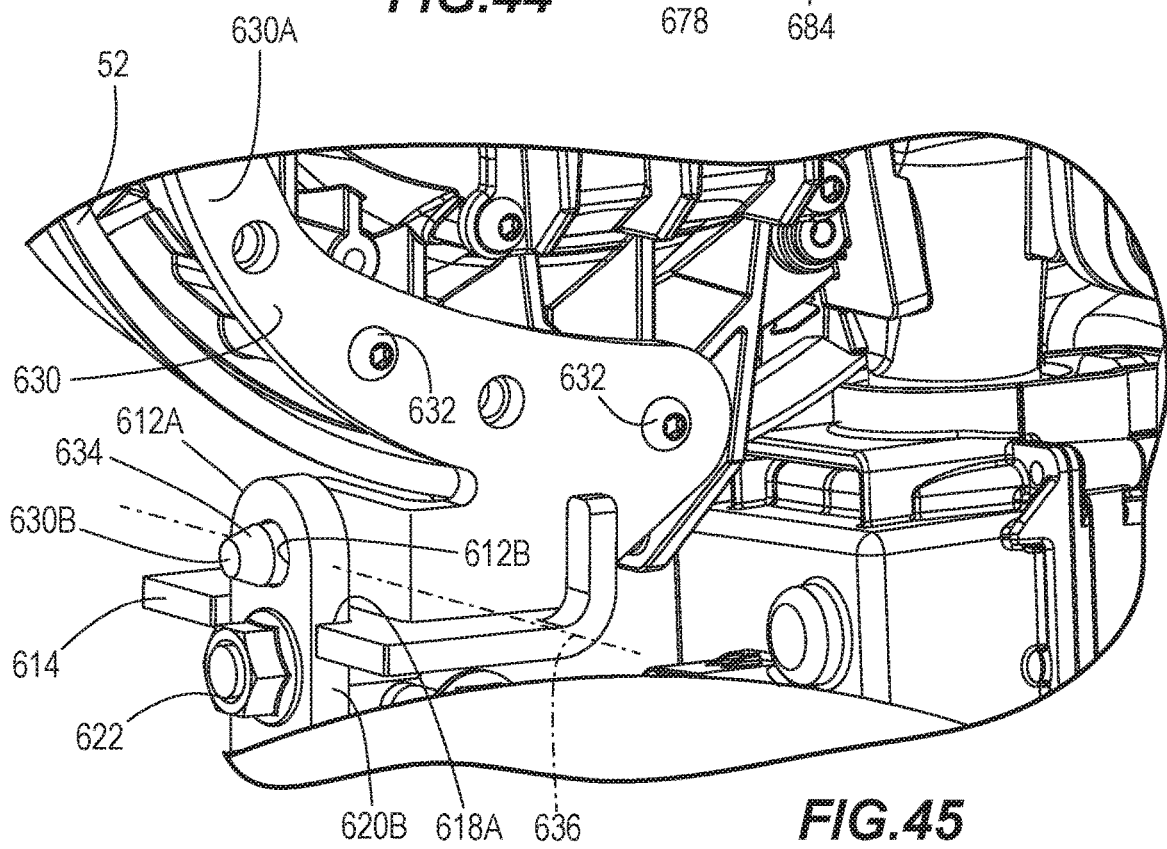
FIG. 45 is a perspective view of a pivot point of the seed meter housing of FIG. 1 relative to the mounting bracket.

As shown in FIG. 45, the frame 612 includes a tab 612A that extends through a cutout or slot 618A in the meter mounting portion 614. The tab 612A includes an aperture 612B to function as a pivot point for the seed meter 44. More specifically, a bracket 630 is attached to the seed meter housing 52 (the first side of the seed meter housing 52A) with fasteners 632 (e.g., threaded fasteners) at a proximal end 630A and extends away from the seed meter 44 to a distal end 630B defined by a pivot member 634. The pivot member 634 is insertable into the aperture 612B in the tab 612A and is moveable within the aperture 612B such that the seed meter housing 52 is rotatable about a rotational axis 636 at the pivot member 634 between a disengaged position (FIG. 41) and an engaged position (FIG. 42).

Figure 47:
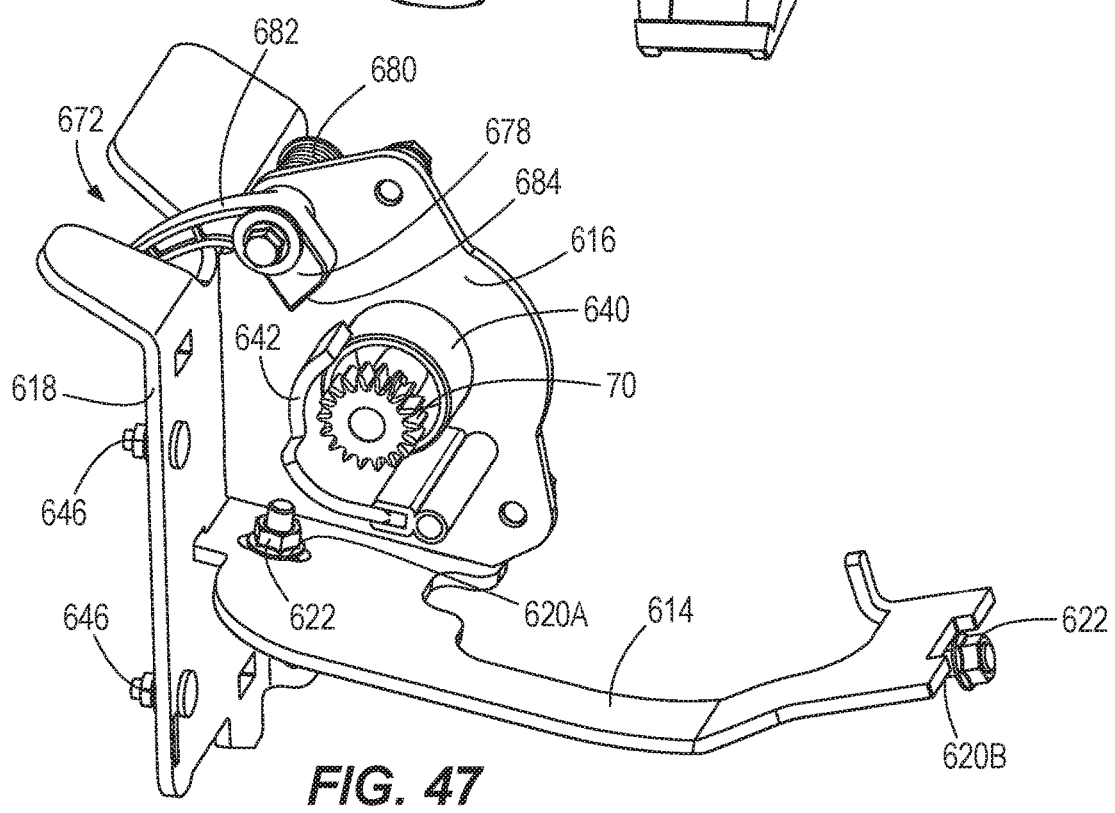
FIG. 47 is a perspective view of the mounting bracket and the motor output shaft.

Referring once again to FIG. 43, the motor mounting portion 616 of the mount 610 extends perpendicular from the meter mounting portion 614. The motor mounting portion 616 includes motor mounting points (not shown) for attaching and fixing the motor 72 to the mount 610. The motor mounting portion 616 further includes an aperture 638 extending through the motor mounting portion 616. With the motor 72 mounted to the motor mounting portion 616, the output shaft of the motor 72 extends through the aperture 638 such that the motor output gear 70 (mounted to the shaft) is on the side of the motor mounting portion 616 opposite the motor 72. A boss feature 640 surrounds the output gear 70 and the aperture 638 and includes a non-planar engagement surface 642, which will be described in greater detail below with respect to FIGS. 47, 48A, and 48B.

Figure 42:
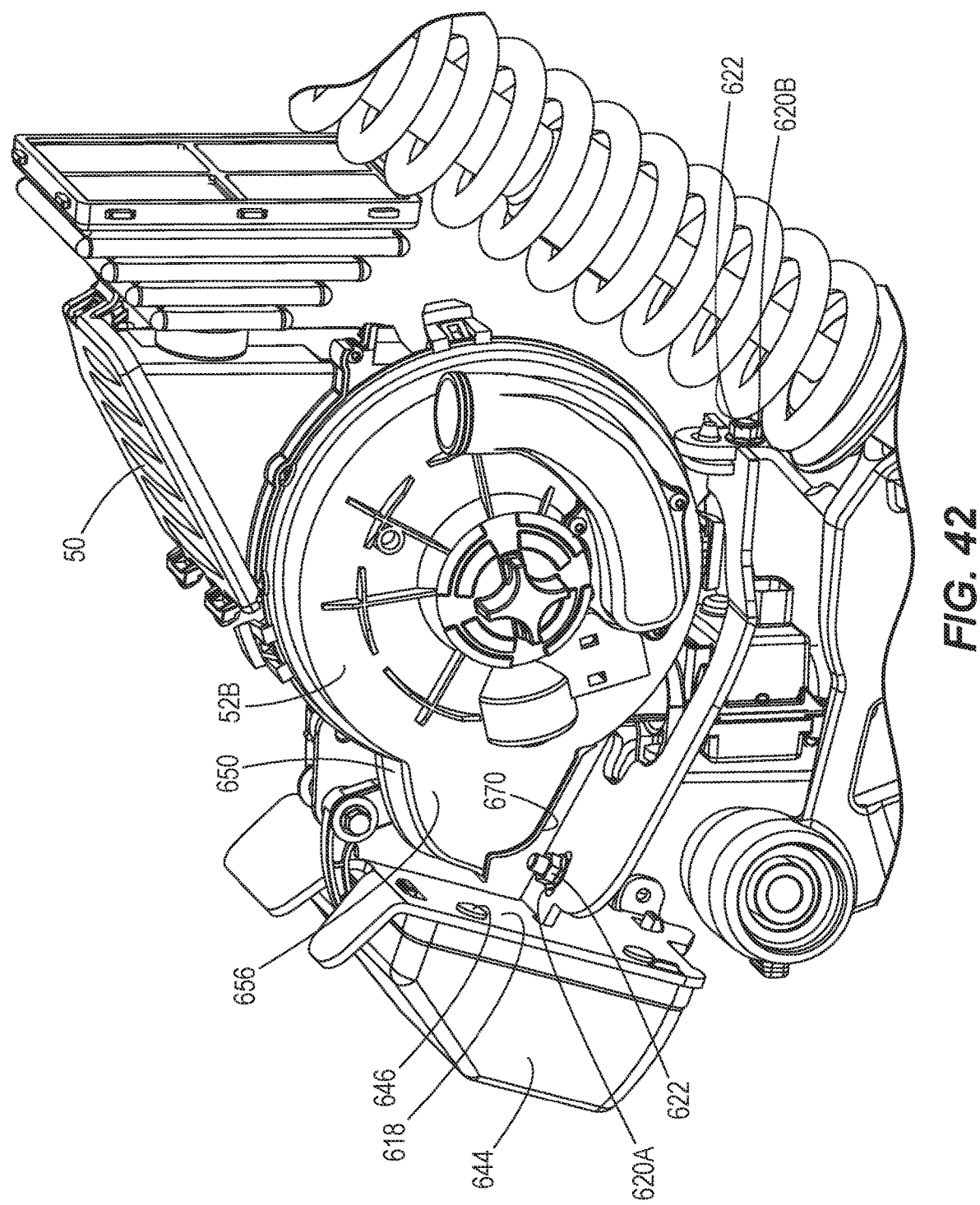
FIG. 42 is a perspective view of the seed meter housing of FIG. 1A in the operational position.

With reference to FIGS. 42-43, the controller mounting portion 618 is perpendicular to the meter and motor mounting portions 614, 616. A controller 644 is mounted to the controller mounting portion 618 via fasteners 646 (e.g., threaded fasteners). The controller 644 may control various aspects of the seed meter 44 such as controlling actuation of the motor 72 and receiving inputs from various sensors.

Figure 41:
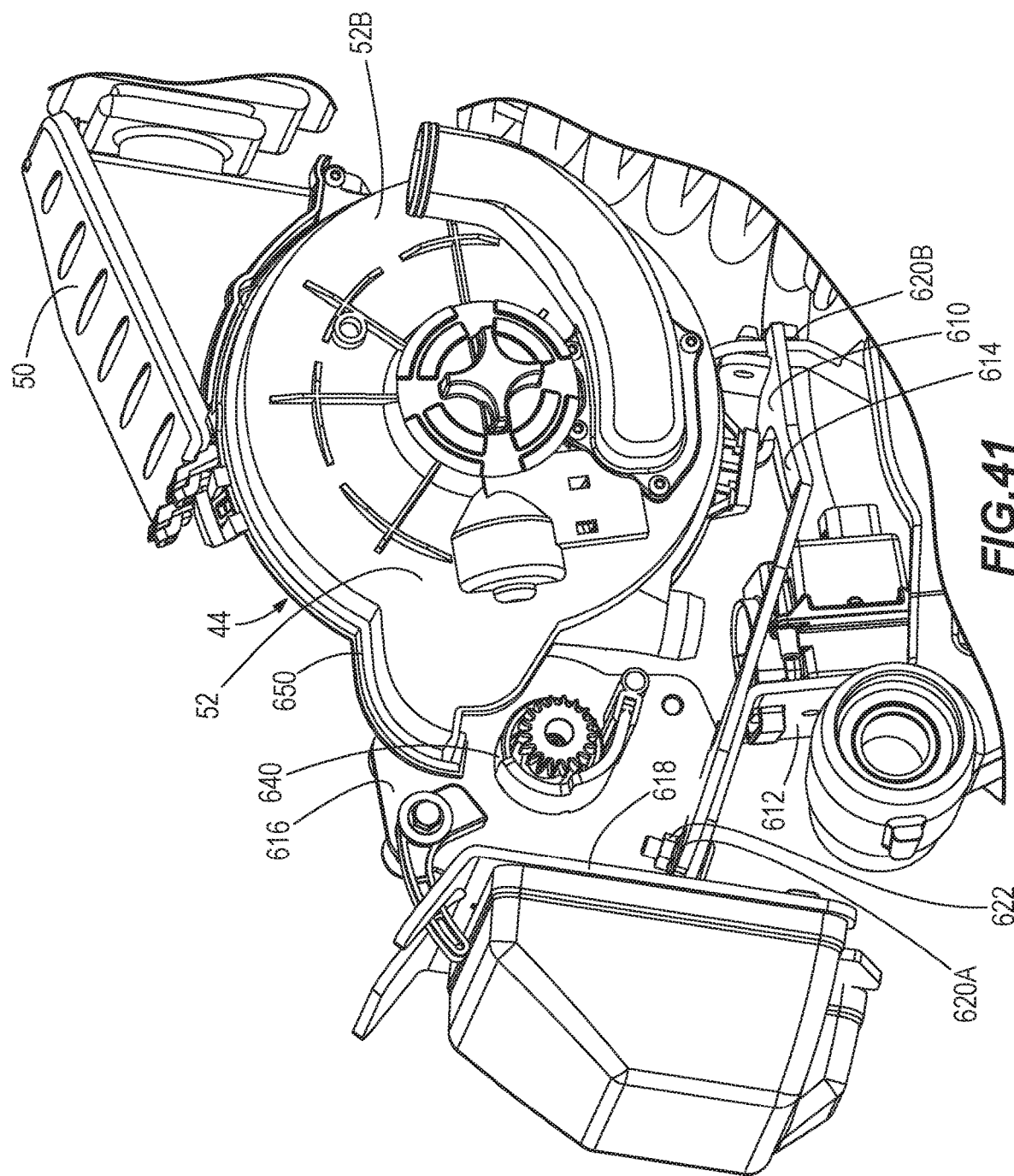
FIG. 41 is a perspective view of a seed meter having a seed meter housing rotated out of an operational position relative to a support structure.
Figure 46:
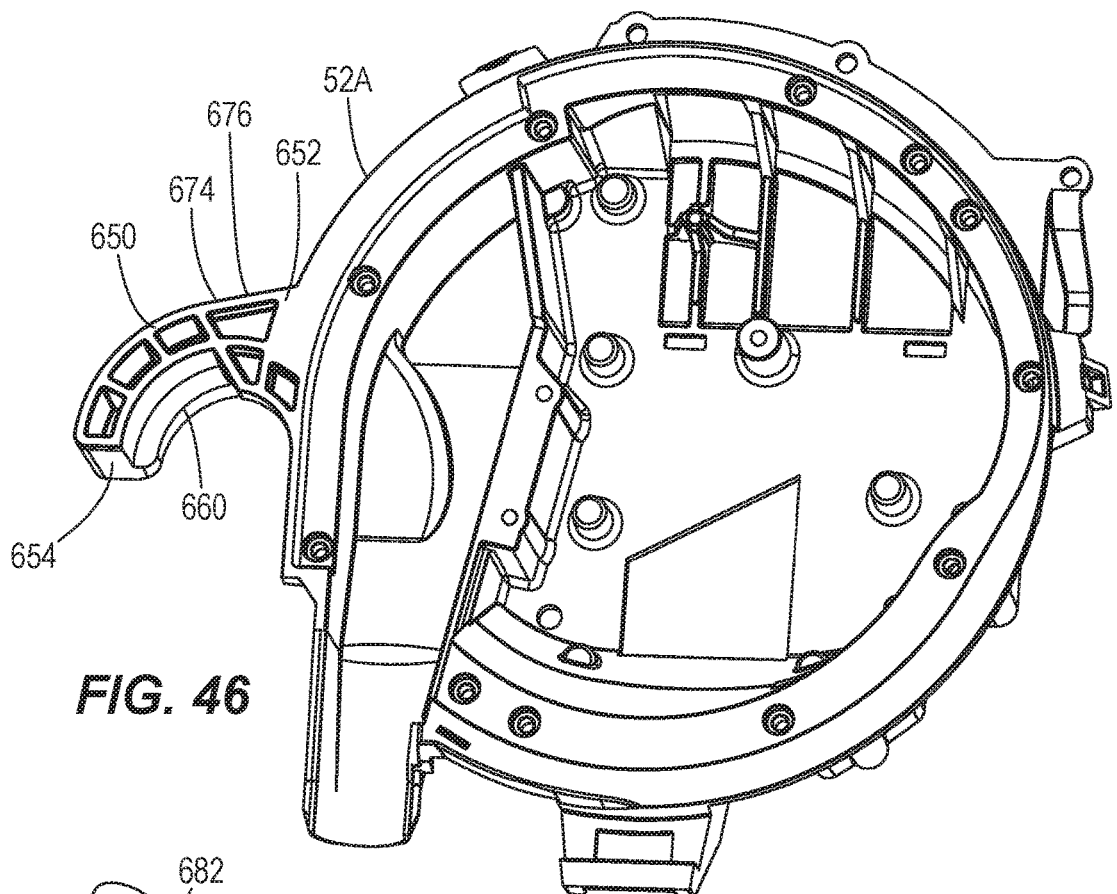
FIG. 46 is a perspective view of a seed side of the seed disk housing including a nose for engaging the mounting bracket.

The seed meter housing 52 which houses the seed disk 54 is shown primarily in FIGS. 41, 42, and 46. As discussed above, the seed meter housing 52 includes the first and second sides 52A, 52B, which in combination with the seed disk 54 mounted therein, define first and second cavities 46, 48 on opposing sides of the seed disk 54. The seed disk 54 includes radial teeth 54A that, when in the engaged position (FIG. 42) enmesh (either directly, or indirectly with one or more intermediate gears positioned therebetween) with the teeth 70A of the output gear 70 (as shown in FIG. 7). The meshing interface between the seed disk 54 and the output gear 70 (and/or an intermediate gear) is defined within the seed meter housing 52 and more specifically within a hook or hook-shaped nose 650 of the seed meter housing 52.

The hook 650 is formed with the meter housing 52 and is formed partially of the first side of the seed meter housing 52A and partially of the second side of the seed meter housing 52B. The majority of the seed meter housing 52 (excepting for the hook 650) houses the seed disk 54 in the first and second chambers 46, 48. The hook 650 extends from the majority of the meter housing 52 and extends from a base 652 attached to the portion of the seed meter housing 52 defining the chambers 46, 48. The hook 650 extends from the base 652, along a curved path, to a tip 654 spaced away from the base 652 and the chambers 46, 48. As shown in FIG. 42, at least the second side of the seed meter housing 52A includes a shroud 656 spanning the distance between the base 652 and the tip 654 to define a chamber 658 (FIG. 48A) within the hook 650 (i.e., between the tip 654 and the base 652). An opening 670 of the shroud 656 or the hook 650 allows the hook 650 to be placed over the motor output gear 70 when transitioning from the disengaged position (FIG. 41) to the engaged position (FIG. 42). Therefore the chamber 658 is in communication with an exterior of the seed meter housing 52 through the opening 670. As the chamber 658 is in communication with the chambers 46, 48 surrounding the seed disk 52, the chambers 46, 48 are likewise in communication with the exterior of the seed disk housing 52 via the opening 670.

The hook 650 includes an interior surface 660 (in facing relation with the chamber 658) between the tip 654 and the base 652, and at least a portion of the interior surface 660 defines a non-planar engagement surface or portion 662. The non-planar engagement surface 662 of the hook 650 interacts with and engages the non-planar engagement surface 642 of the motor mount portion 616 when the seed meter 44 is in the engaged position (FIG. 42).

As shown in FIG. 48A, the non-planar engagement surface 662 of the hook 650 extends from a position between the base 652 and the tip 654 to the tip 654. The engagement surface 662 follows a curved path along the length of the hook 650 such that a thickness (as shown for example by the thickness of the tip at measurement 664) of the portion of the hook 650 partially defined by the engagement surface 662 decreases as it approaches the tip 654. As shown, the thickness of the portion defined by the engagement surface 662 decreases monotonically from the portion of the engagement surface 662 nearest the base 652 to the tip 654.

As shown in FIG. 48B, the non-planar engagement surface 642 of the motor mounting bracket 616 extends along the boss feature 640 that surrounds the motor output gear 70. The engagement surface 642 follows a curved path along the boss feature 640 to a tip 668, the curved path being formed opposite the engagement surface 662 of the hook 650. Therefore, when in the engaged position, the engagement surfaces 642, 662 mate against one another along the engagement surfaces 642, 662. The non-linear engagement ensures that the teeth 70A of the motor output gear 70 are axially aligned with the teeth 54A of the seed disk 54. Further, as the surfaces 642, 662 are non-linear, additional rotation of the engagement surface 662 of the hook 650 relative to the engagement surface 642 of the motor mounting bracket 616 results in opposing normal forces against the surfaces 642, 662 (as illustrated by arrows 666A, 666B on the respective surface being acted on). The normal forces need to be overcome to disengage the surfaces 642, 662.

In addition to the engagement provided by the mating non-planar engagement surfaces 642, 662, the seed meter 44 includes a latch system 672 for maintaining the seed disk housing 52 in the engaged position. In other words, the latch system 672 maintains the intermeshing relationship between the seed disk 54 and the motor output gear 70. An external surface 674 of the hook 650 (i.e., on the first portion of the seed housing 52A) includes a second engagement surface 676 for engaging the latch mechanism 672. Specifically, the latch mechanism 672 includes a cam 678 that is biased by a spring 680 (e.g., torsion spring) to a locked position when the seed meter 44 is in the engaged position (FIG. 42). The cam 678 is attached to a lever or handle 682 and the cam/handle system 678, 682 is mounted to the motor mounting portion 118 with the torsion spring 680. The handle 682 can be actuated by a user to manually rotate a cam surface 684 of the cam 678 out of the engaged position (in engagement with the second engagement surface 676 of the seed disk housing 52) to a disengaged position. The handle 682 and cam 678 are biased by the spring 680 to automatically return to the engaged position, where the cam surface 684 rests against the second engagement surface 676 of the seed disk housing 52.

To transition the seed meter 44 from the disengaged position (FIG. 41) to the engaged position (FIG. 42), the user rotates the seed meter housing 52 about the rotational axis 636 defined at the pivot member 634 and the tab 612A of the frame 612. The seed meter housing 52 is rotated such that the motor output gear 70 is inserted through the opening 670 in the shroud 656 and into the chamber 658 defined by the hook 650 and the shroud 656. As the teeth 54A of the seed disk 54 and the teeth 70A of the output gear 70 are rotated toward one another, the tip 654 of the hook 650 is rotated about the boss feature 640 with the non-planar engagement surfaces 642, 662 in facing relation to one another. The teeth 54A of the seed disk 54 mesh with the teeth 70A of the output gear 70 as a gap between the engagement surfaces 642, 662 decreases until the engagement surfaces 642, 662 contact one another. Further pressure can be applied to the seed meter housing 52 (i.e., the hook 650 of the seed meter housing 52) to increase the pressure between the engagement surfaces 642, 662, as described above with respect to the forces illustrated with arrows 666A, 666B.

As the seed meter housing 52 is rotated toward the engaged position, the second engagement surface 676 of the hook 650 contacts the cam 678. To reach the engaged position, the seed meter housing 52 overcomes a spring force of the torsion spring 680, thereby rotating the cam 678 from the biased position relative to the engagement surface 676 and permitting the seed meter housing to extend past. Once in the engaged position, the cam surface 684 rotates via the torsion spring 680 to the biased position to hold the seed meter housing 52 in the engaged position.

To transition the seed meter 44 from the engaged position (FIG. 42) to the disengaged position (FIG. 41), the user rotates the handle 682 to disengage the cam surface 684 from the second engagement surface 676. Then, the user is able to rotate the seed disk housing 52 about the rotational axis 636 to disengage the teeth 54A of the seed disk 54 from the teeth 70A of the motor output gear 70.

Figure 49:
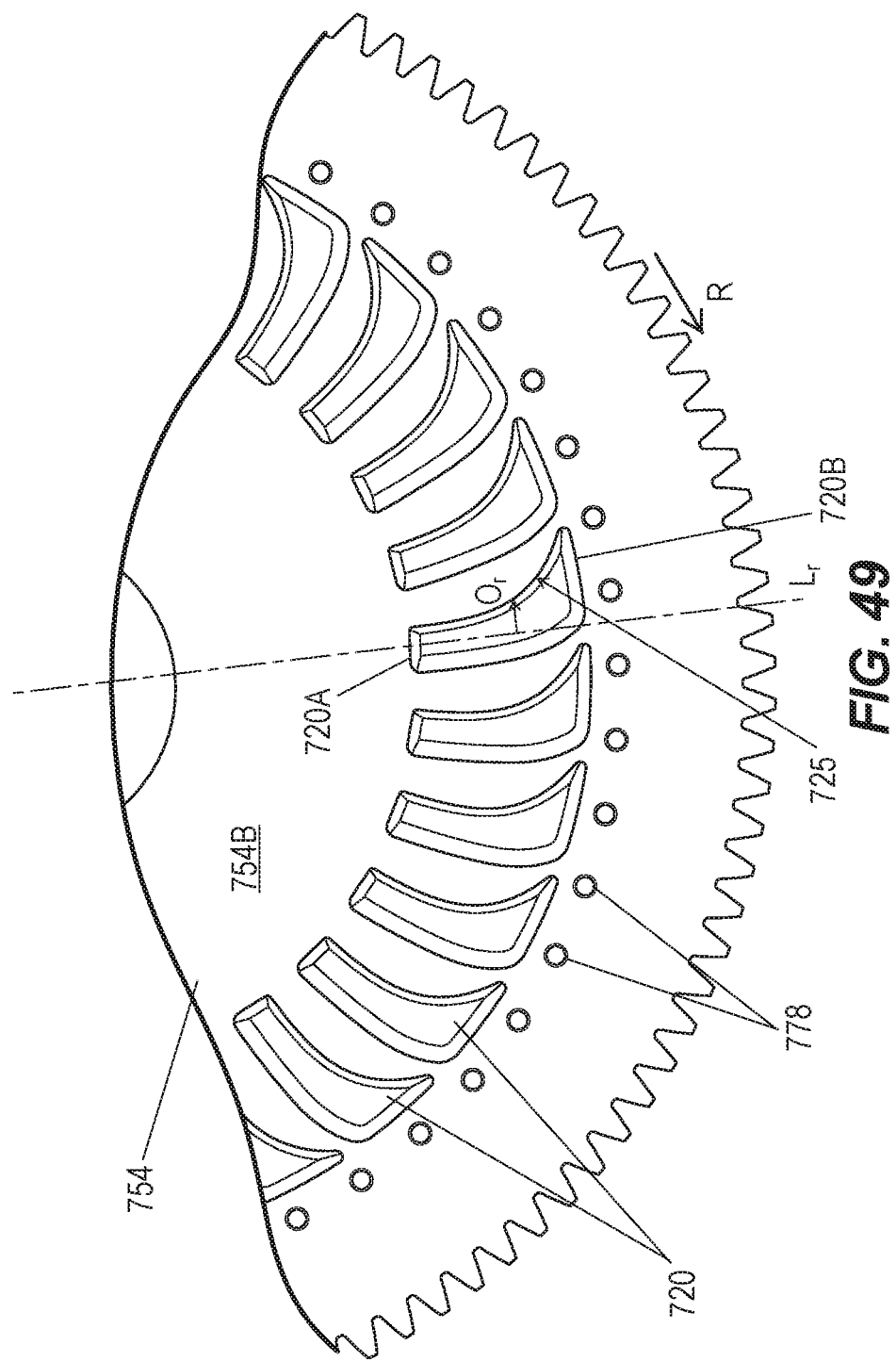
FIG. 49 is a perspective view of a seed meter disk having an agitator structure according to one embodiment of the present disclosure.

FIG. 49 is a detail view illustrating a seed disk 754 for the seed meter 44 of FIG. 2. The seed disk 754 generally conforms to the features and function as set forth for the seed disk 54 above, except as specifically noted herein. Thus, reference is made to the preceding drawings and description for all other features of the seed disk 754. As with the seed disk 54, the seed disk 754 of FIG. 49 includes a circumferential array of seed openings 778 and a circumferential array of agitators in the form of agitator pockets 720. The agitator pockets 720 are formed as depressions in the seed-side face 754B of the seed disk 754. Such depressions or other agitator structures may be formed integrally as a single piece with the body (e.g., molded plastic body) forming the seed disk 754. Due to the rotational nature of the seed disk 754 and the predetermined rotational direction R for the seed disk 754, each agitator pocket 720 has a radially inner end 720A, a radially outer end 720B, and a predefined forward-facing surface 725 extending therebetween. The term "forward-facing" is not meant to refer to positioning at a leading edge of the agitator pocket 720, and in fact the forward-facing surface 725 is positioned at the trailing edge of the agitator pocket 720. Each corresponding forward-facing surface 725 forms at least part of the trailing edge of the agitator pocket 720. The forward-facing surface 725 is the surface that is facing toward the seed pool to engage the seeds as the seed disk 754 rotates in the rotational direction R. In the case of a pocket, this is the trailing edge, but other arrangements are optional, e.g., where the agitator has a form other than that shown.

At least a portion of the trailing edge of one or more of the agitator pockets 720 among the array of seed agitator pockets 720 is backswept so that a circumferential-direction offset $O_r$ increases toward the radially outer end. The offset $O_r$ is measured circumferentially opposite the rotational direction R as a distance from a radial reference line $L_r$ rotationally ahead of the forward-facing surface 725 with respect to the rotation direction R. The backswept portion of the forward-facing surface 725 is non-linear, although in some constructions it may be made up of multiple linear segments. As illustrated, the backswept portion is curvilinear, forming a smooth curve without linear segments or sharp edges therein. In some constructions, the backswept portion makes up the entire trailing end or the entire forward-facing surface 725, and the entire forward-facing surface 725 is non-linear. In combination with the backswept portion as defined above, other portions of the forward-facing surface 725 can have other configurations, e.g., one or more linear segments (radially extending or otherwise), one or more additional curved or swept segments, etc. In some constructions, including the illustrated construction, the backswept portion extends to a radially outer end of the forward-facing surface 725. Although all of the agitator pockets 720 are shown to have identical structures, each of which has a forward-facing surface 725 with a non-linear, backswept portion, shape characteristics may vary among the agitators within the seed disk 754. Of course, any or all of the size, radial position, and circumferential spacing of the illustrated agitator pockets 720 may be modified in other constructions. While the array of agitator pockets 720 is a ring-shaped array in which all are positioned at a common radial offset from the central axis 68, other circumferential arrays may be less uniform, and may include a subset of agitator pockets and/or other structures at at least one different radial position.

Figure 50A:
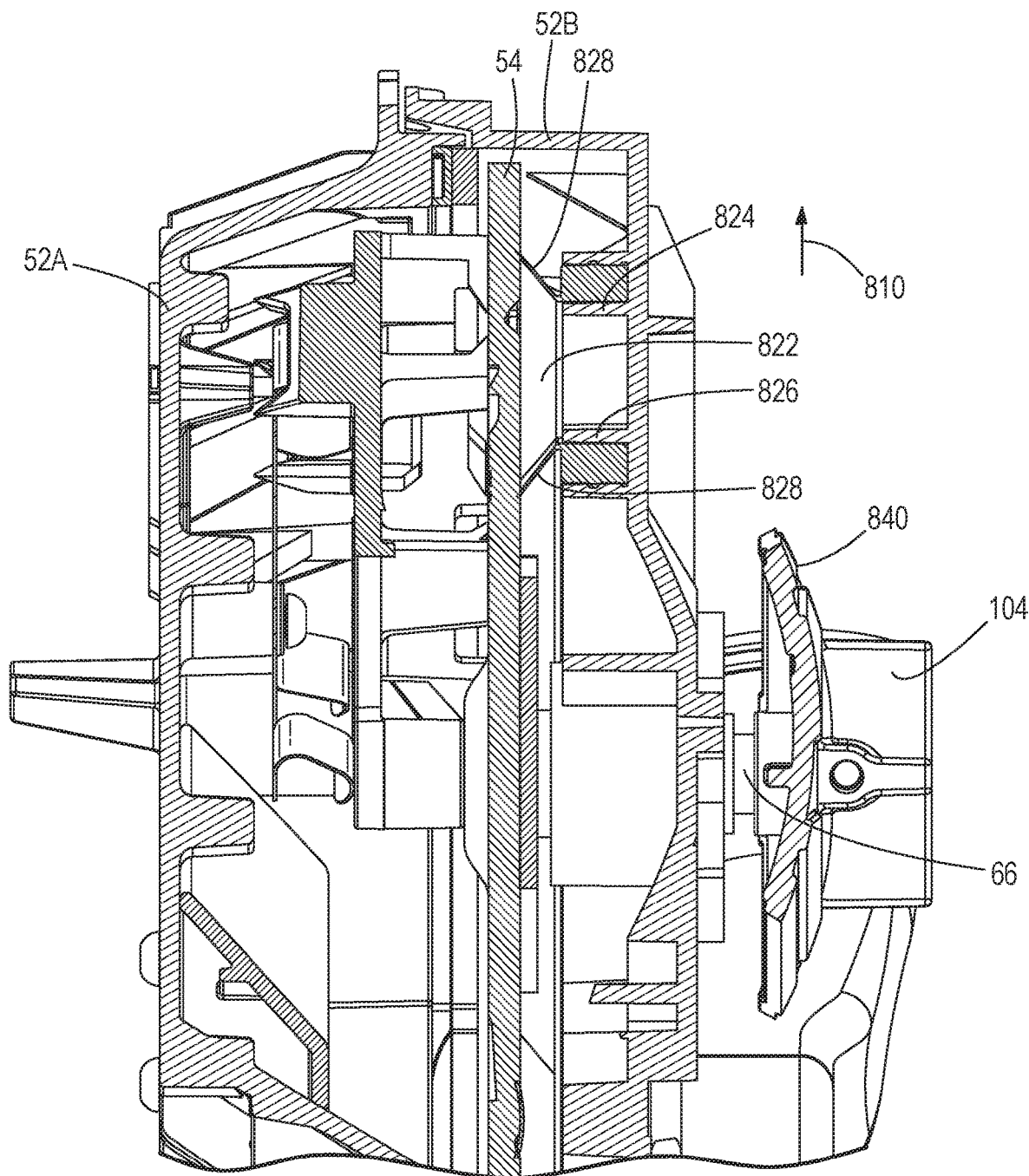
FIG. 50A is a section view through a seed meter having a seed disk housing with drain holes.
Figure 51:
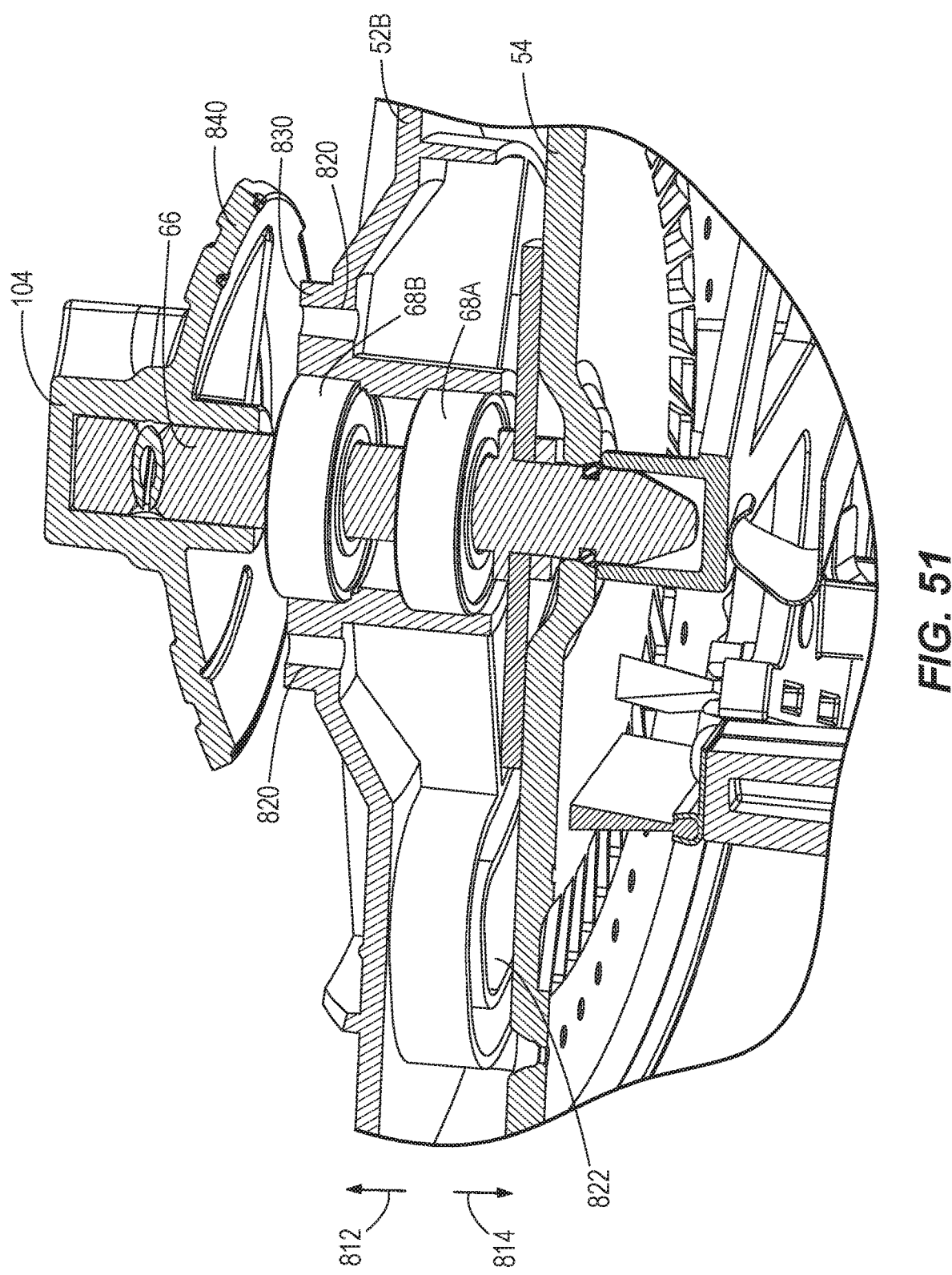
FIG. 51 is a section view through the seed meter, transverse to the view shown in FIG. 1.

Seed meters 44 are positioned in a vertical or upright orientation when in use (when singulating and planting seeds) and may be rotated to any number of stowed positions when in transport or in storage. The arrow 810 shown in FIG. 50A illustrates the upright orientation (i.e., opposing gravity) when the seed meter 44 is in use. The arrows 812, 814 shown in FIG. 51 illustrate two storage orientations in which the upright direction (i.e., opposing gravity) is transverse to the upright direction shown by the arrow 810 in FIG. 50A. Further positions at an angle between the arrows 810, 812, 814 shown in FIGS. 50A and 51 may be further storage or transport positions. Regardless of the specific angle or orientation, the seed meter 44 is rotatable relative to the gravitational direction between a plurality of positions and is operable to maintain these plurality of positions (i.e., be locked into position for use, transport, or storage).

It is beneficial to limit the amount of rain that enters the seed meter 44 (i.e., within the seed meter housing 52). Water build-up can lead to decreased efficiency of the singulating disk 54 in the singulating meter 44, increased wear to moving components, and can further lead to premature germination of seeds. As such, it is likewise beneficial to drain water from within the seed disk housing 52 to prevent or limit the build-up of water within the housing 52. As the seed meter 44 is rotatable between various positions, rainfall can have various ingress points based on the orientation of the seed meter 44 relative to the gravitational direction, as described above. Therefore, devices for limiting rain ingress for rotatable seed meters 44 require structure that limits rain ingress in multiple orientations without detrimentally modifying the functionality of the seed meter 44.

As shown in FIG. 51, the metering element or seed disk 54 is mounted within the housing 52 between the front and rear portions or sides 52A, 52B of the seed disk housing 52. The seed disk 54 is rotatably mounted and axially positioned within the housing 52 on a hub 66. The hub 66 is mounted on the bearings 68A, 68B located within the housing 52 and defines the axis of rotation 68 of the seed disk 54. The hub 66 extends from the internal end 66A at the seed disk 54 to an external end 66B outside of the seed disk housing 52. A handle 104 is fixed to the external end 66B such that rotation of the handle 104 rotates the hub 66 and likewise rotates the seed disk 54. An operator can manually rotate the handle 104 to check the functionality of the seed disk 54 (e.g., check if the seed disk 54 is stuck).

Figure 50B:
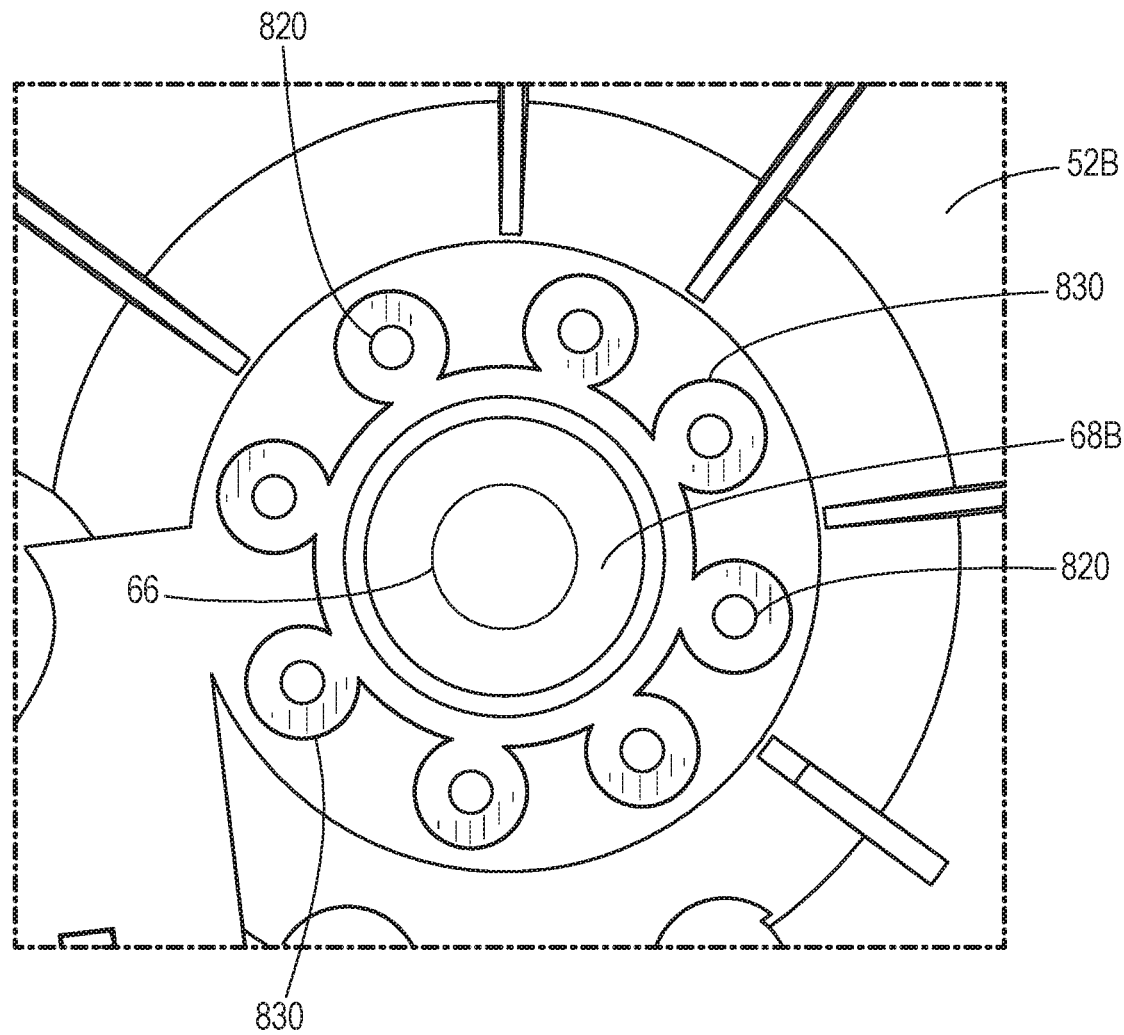
FIG. 50B is a schematic illustration of the arrangement of the drain holes.

FIGS. 50A, 50B, and 51 show apertures or drain holes 820 located in the housing 52 of the seed meter 44 and specifically in the rear or vacuum side of the seed meter 52B. As shown in FIG. 50B, the drain holes 820 are spaced radially about the hub 66 at even intervals. Other drain hole arrangements (i.e., more or less drain holes 820, size of drain holes 820, positioning of drain holes 820, etc.) may be utilized.

As shown in FIGS. 50A and 51, a vacuum cavity 822 is part of the second cavity 48 (defined between the vacuum-side face 54C of the seed disk 54 and the rear side of the seed disk housing 52B) and is defined between two sidewalls 824, 826 extending axially (parallel to the rotational axis 68) from the rear side of the seed disk housing 52B. As shown in FIG. 51, the two sidewalls 824, 826 may be formed by a single sidewall forming a circuit. Further, a rubber seal 828 (FIG. 50A) may extend from the sidewalls 824, 826 to the installed seed disk 54 to seal the vacuum cavity 822. The vacuum cavity 822 is an airflow path between the seed openings 78 of the seed disk 54 and the vacuum source/air outlet 80 to hold seeds within the seed openings 78. The drain holes 820 are located outside of the vacuum cavity 822 so as to not affect the vacuum draw of the seed meter 44.

In the upright orientation shown in FIG. 50A, the orientation of the drain holes 820 (transverse to the direction of rainfall or the direction of gravity) limits the amount of water that enters the drain holes 820. Further, the drain holes 820 are positioned within boss features 830 (e.g., stubs or protuberances) that extend axially outward from the remainder of the seed disk housing 52 (i.e., in the axial direction of the drain holes 820). The boss features 830 further redirect the rain water that streams down the outside of the seed disk housing 52 around the drain holes 820.

In the first storage/transport orientation (shown on FIG. 51), the drain holes 820 are axially aligned with the gravitational direction. However, the handle 104 limits or prohibits rainfall from entering the drain holes 820. The handle 104 includes an umbrella dome 840 that is dome-shaped and extends over the drain holes 820 in the first storage/transport orientation. The umbrella dome 840 directs rainfall that impinges against the umbrella dome 840 (and would otherwise fall through the drain holes) to an outer edge 842, away from the drain holes 820. Therefore, even in the rotated orientation in which vertical rainfall were to fall through the drain holes 820, the handle 104 prohibits or limits rain ingress through the drain holes 820.

In the second storage orientation (also shown in FIG. 51), the drain holes 820 are axially aligned with the gravitational direction, but are located below the seed meter housing 52 (i.e., in facing relationship to the ground). Therefore, the drain holes 820 are not in a position to receive rainfall, but may otherwise be susceptible to spray from contact between a ground surface and wheels 12 (e.g., vehicle wheels, wheel for transporting the seed meter, etc.) or the ground system 38 or splashing. The shape of the umbrella dome 840 (along with the direction of gravitational flow of water) limits the ingress of splashed or sprayed water into the seed disk housing 52 in the second storage/transport mode or orientation. Further, in the second storage/transport orientation, the drain holes 820 provide an outlet path for any water that is within the seed disk housing 52 such that seed within the mini-hopper 50 and the seed disk housing does not sit within a pool of water. The water falls out the drain holes 820 and collects within the underside of the umbrella dome 840 until the water fills the hollowed dome 840 or the seed meter 44 is rotated.

If the seed meter 44 is otherwise rotated toward or away from the work vehicle 10 (i.e., about an axis parallel to the rotational axis of the seed disk), the drain holes 820 function similar to the upward orientation shown in FIG. 50A, with the drain holes 820 still extending transverse to the direction of rainfall.

Figure 52:
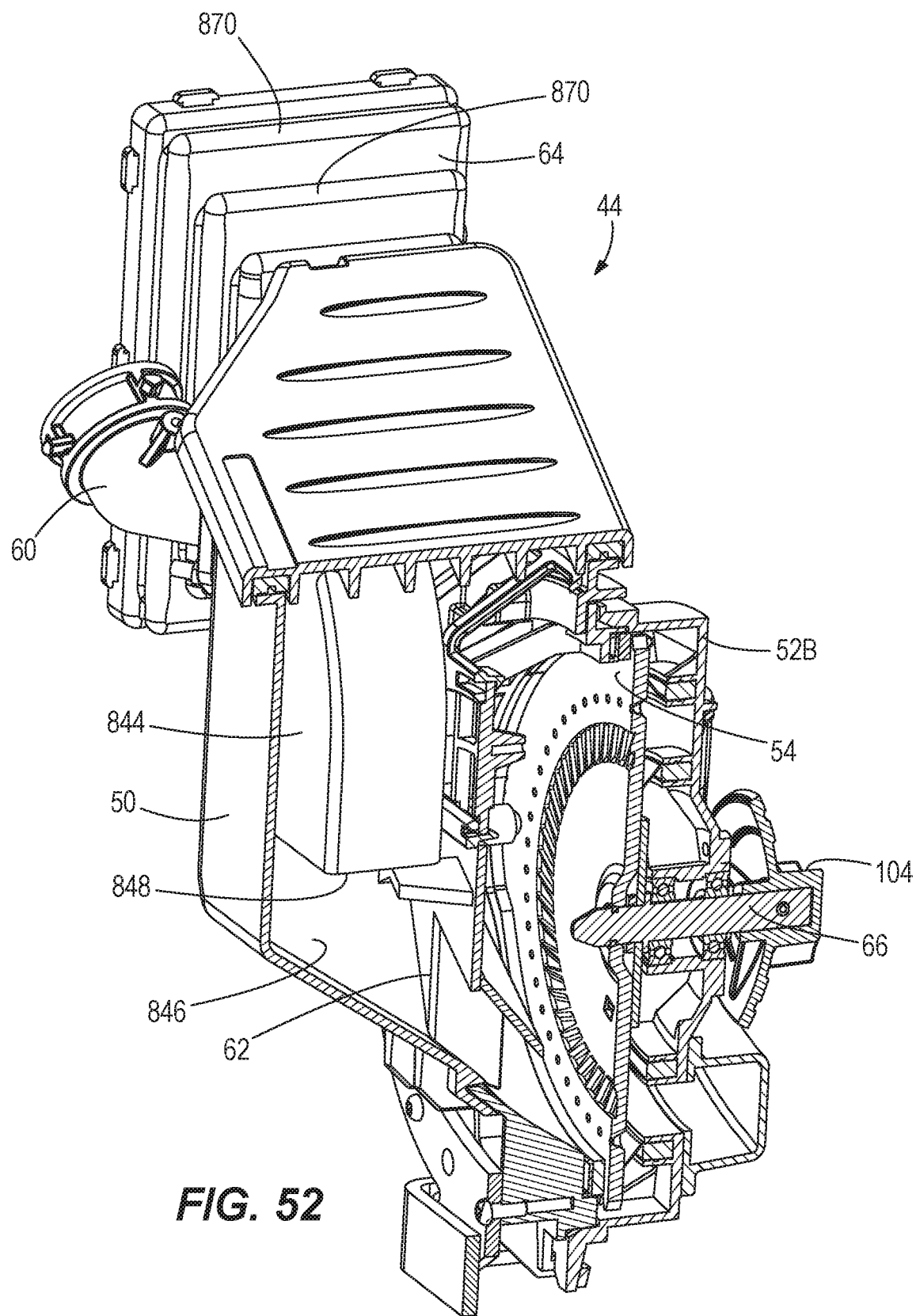
FIG. 52 is a perspective cross-sectional view of the seed meter.
Figure 53:
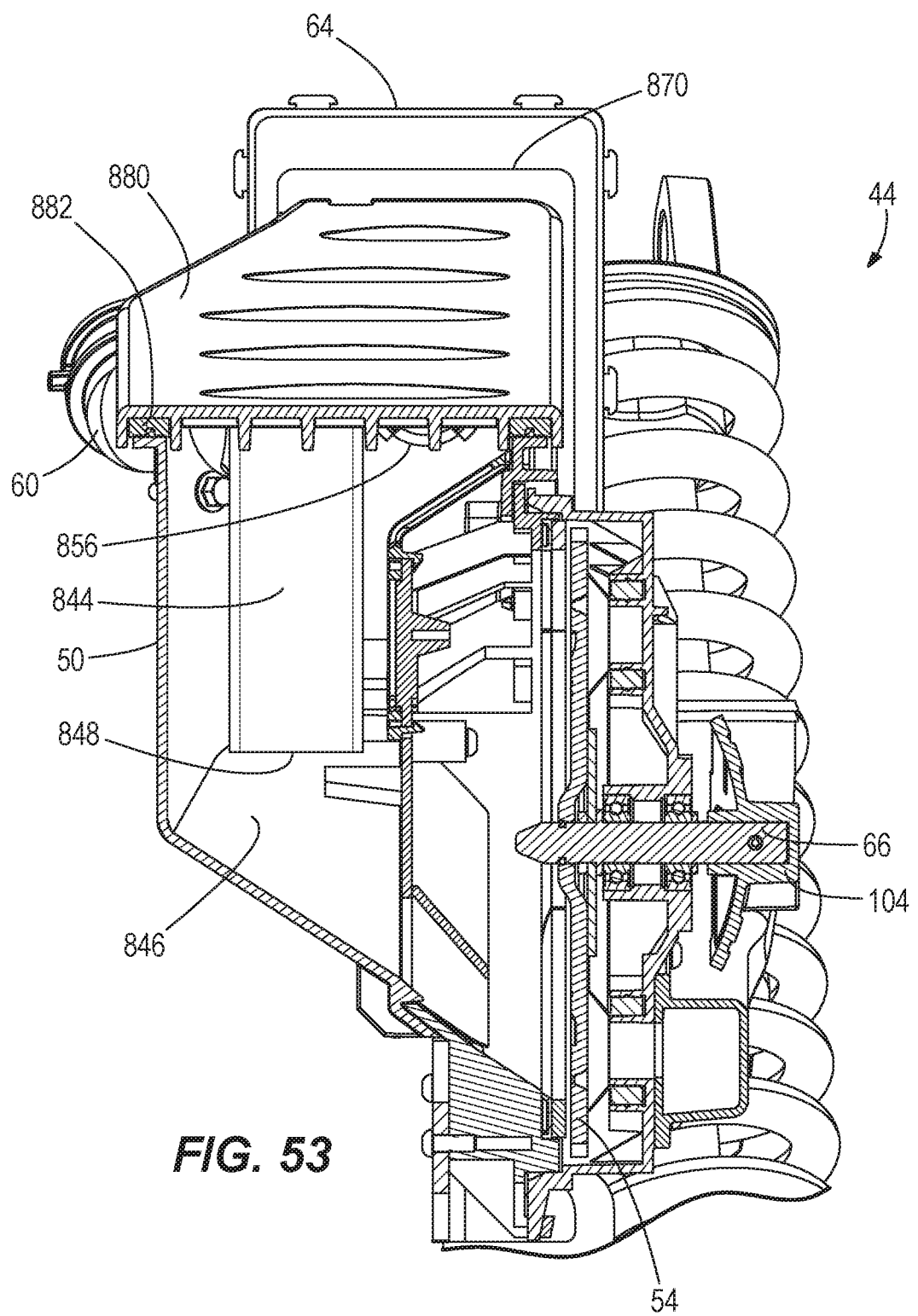
FIG. 53 is a side view of the seed meter shown in FIG. 3.
Figure 54:
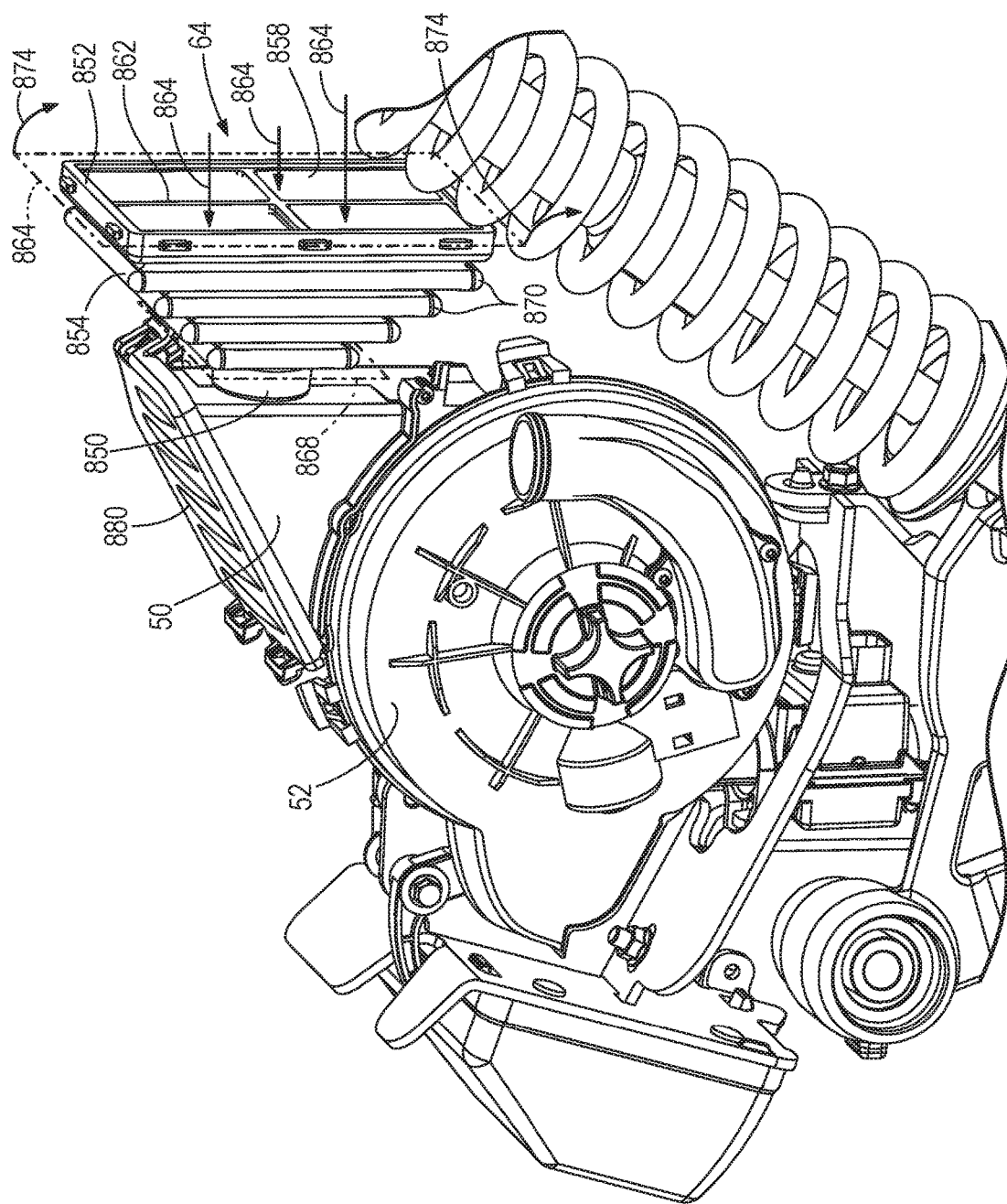
FIG. 54 is a perspective view of the seed meter mounted to a supporting structure.

FIGS. 52-54 illustrate a majority of the seed meter 44 in greater detail, especially with respect to the seed receptacle or mini-hopper 50. As described above with respect to FIGS. 2-4, the mini-hopper 50 is a housing or receptacle for storing seeds and includes the seed inlet 60 for introducing seeds to the mini-hopper 50 (e.g., volumetrically metered from a larger hopper 28), an air inlet 64 for providing airflow to produce a pressure differential to facilitate the vacuum function of the seed meter 44, and a seed/air outlet 62. The seed/air outlet 62 (referred to as a seed outlet) is an opening in the front side of the seed disk housing 52 for introducing seeds in the mini-hopper 50 to the seed disk 54. The seed inlet 60 to the mini-hopper 50 includes a chute 844 that extends downward from the wall of the mini-hopper 50 into a seed chamber 846, with a chute outlet 848 positioned at the end of the chute 844 to direct seeds to the bottom of the mini-hopper 50 (i.e., toward the seed outlet 62 of the mini-hopper 50). The air inlet 64 is mounted to a wall of the mini-hopper 50 and is positioned above the outlet 848 of the seed inlet chute 844.

It is beneficial to keep water out of the mini-hopper 50 to prevent premature germination of seeds within the mini-hopper 50 and to improve airflow at the seed disk 54. The air inlet 64 provides a path from the environment to the mini-hopper 50, and therefore is provided with structure to limit rain ingress into the mini-hopper 50.

The air inlet 64 includes a proximal end or first end 850 for engaging the mini-hopper, a distal end or second end 852 opposite the first end 850, and a hollow air inlet boot 854 extending therebetween. Airflow into the mini-hopper 50 through the air inlet 64 travels through an aperture 858 at the second end 852, along a channel defining an airflow path through the air inlet boot 854, and out an aperture 856 at the first end 850. The first end 850 is attached (e.g., removably fixed) to the mini-hopper 50 at the first end 850 via an interference fit, a mating interface, or a fastener such as a hose clamp or an adhesive.

The boot 854 is made of a waterproof elastic substance (such as rubber or other polymer) and is stepped in size from a first cross-sectional size at the first end 850 of the air inlet 64 to a second cross-sectional size at the second end 852, the second cross-sectional size being greater than the first. The boot 854 includes discrete cross-sectional portions, similar to a step pyramid having rectangular stepped regions that increase in size monotonically. In other words, at the second end 852 of the air inlet 64, the boot 854 includes a rectangular cross-section, followed by a number (e.g., five) of successive rectangular cross-sections of increasingly diminished dimensions, at which point the boot 854 reaches the first end 850 of the air inlet 64.

A screen 862 is positioned at the second end 852 of the air inlet 64 to prohibit or reduce the amount of dirt and debris from entering the mini-hopper 50 through the air inlet 64. Further, the increased cross-sectional area of the second end 852 (relative to the first end 850) reduces the air velocity drawn into the second end 852 of the air inlet 64, decreasing the probability of large debris from suctioning against and covering the screen 862.

The boot 854 has a mass and elasticity that allows the air inlet 64 to sag via gravity relative to the mini-hopper 50, as denoted by arrow 874. Written another way, with the first end 850 of the boot fixed to the mini-hopper 50, the second end 852 bows down relative to the mini-hopper 52. Therefore, the screen 862 (covering the opening 858 at the second end 852 of the air inlet 64) is oriented away from an upward orientation regardless of the position of the seed meter 44 (e.g., use and storage/transport orientations shown in FIGS. 50A and 51). In other words, the screen 862 covering the second end 852 of the air inlet 64 has an airflow intake direction (as illustrated with arrows 864) transverse to a plane 866 of the screen 862 and the airflow intake direction 864 has an upward vertical component (i.e., opposing gravity). Therefore, rainfall is not able to fall directly into the air inlet 64 through the opening 858 at the second end 852 regardless of the orientation of the seed meter 44 relative to the ground. Further, the ridges or steps 870 formed by the varied cross section of the boot 854 redirect the rain water that streams down the outside of the boot 854 away from the second end 852.

Airflow from the boot 854 enters the mini hopper 50 through the first end 850. The airflow path into the first end 850 is defined as being normal to a plane 868 defined by the opening 856 at the first end 850. The planes 866, 868 are non-parallel due to the gravitational sagging at the second end 852 such that the planes 866, 868 intersect.

The seed meter 44 further includes additional features to limit rain ingress into the seed meter 44. The mini-hopper 50 includes a lid 880 that is removable to provide user access to the contents of the mini-hopper 50. One example of a further feature to limit rain ingress is a foam seal 882 located between the mini-hopper lid 880 and the mini-hopper 50. When the mini-hopper lid 880 is snapped into place upon the mini-hopper 50, the foam seal 882 is compressed to form a seal therebetween, thereby limiting rain ingress at the interface between the mini-hopper 50 and the lid 880. The foam seal 882 may be attached to one or both of the lid 880 and the mini-hopper 50 via a snap feature, adhesive, or other fastener.

The seed meter 44 of each row unit 45 has one or more hose connections, e.g., a seed hose connection at the seed inlet 60 to receive seeds to be metered, a vacuum hose connection at the air outlet 80 to a vacuum source (not shown), and in many cases "jumper" hose connections that interconnect two or more seed meters 44 of different row units 45. For example, the seed and/or +/−pressure source may be supplied indirectly, through an intermediate row unit 45, to some of the other row units 45. An example of this is the jumper seed outlet 60A shown in FIG. 55 to be jointly formed with the seed inlet 60 so that a portion of seeds received by the seed inlet 60 enter into the mini hopper 50, while another portion of the seeds are passed through the seed outlet 60A to form a jumper circuit to another seed meter 44. These examples are merely exemplary and it is specifically noted that other combinations and arrangements of connections are possible, while utilizing aspects of the invention. It is also specifically reiterated that the seed metering, and thus the corresponding air hose connections, may be configured to positively pressurize the seed side of the seed meter rather than pulling vacuum on the opposite side.

Although the above described hose connections in agricultural vehicles are known to be tool-less, the ease of connection and disconnection by hand without tools may come at the expense of occasional nuisance disconnections. Thus, there is a need for an improved tool-less hose connection in agricultural work vehicles such as the vehicle 10 of FIG. 1, among others. This may be especially true as machines continue to get wider, with more row units 45 needing to be fed by so-called Seed-On-Demand (SOD) systems. This has led to more complexity with a need to add jumper circuits, as briefly mentioned above, in which a single nozzle in a bulk seed tank (i.e., commodity container 28, FIG. 1) is used to provide seed flow to more than one seed meter 44. Similarly, as singulation seed-metering technology is applied to air-seeders which typically have many more row units, these circuits continue to become more complex, with many more hoses and connecting components to make the entire system work.

In typical two-piece tool-less bayonet connectors on agricultural work vehicles, one piece of the connector includes one or more 90-degree slots or channels with closed ends, while the other piece includes a corresponding number of circular cross-section pins or pegs that are received within the slots. The connection is made by axial sliding of the two pieces together with the pins aligned with the inlets of the corresponding slots, followed by a relative rotation about the axis so that the pins travel circumferentially to the closed ends of the corresponding slots. Although the general construction and assembly technique used by the present invention are similar to that of the traditional bayonet connectors described above, one or both of the slots and the pins have a unique shape as described below. The invention takes advantage of a highly convenient tool-less coupling structure for engaging and disengaging connections by hand, while greatly reducing or eliminating nuisance disconnections. In particular, the force vectors needed to disconnect the components shown in FIGS. 55-59 are highly specific force vectors (e.g., a nearly straight axial compression vector to compress an internal compression seal 904, or excessive rotational force). The same geometry also enables easy connection due to a significant difference in mechanical advantage when rotating the bayonet-style connection in the "engage" direction vs the "disengage" direction. In describing the nature of the coupling structure or bayonet-style connection, it should be understood that these may refer to any one or more of the seed outlet 60, the jumper seed outlet 60A, the air outlet 80, and/or any other tool-less coupling found on a conduit within an agricultural work vehicle including pneumatic conduits or chemical conduits. The seed outlet 60, the jumper seed outlet 60A, and the air outlet 80 are referred to collectively as connector pieces in that they are operable to form a connection or coupling structure with another complementary connector piece. Exemplary complementary connector pieces are illustrated herein as the hose connector 908 of FIG. 56-57 and the plug connector 912 of FIG. 58.

As shown in FIG. 55, the connector pieces respectively formed by the seed outlet 60 and the jumper seed outlet 60A are each provided with at least one pin (e.g., diametrically opposed pair(s) of pins 916 as shown). The pins 916 extend or protrude from an outer side wall of the seed outlet 60 and the jumper seed outlet 60A in a direction radially outward, or transverse to a central axis defined by the conduit formed by the seed outlet 60 or jumper seed outlet 60A, respectively. The hose connector 908, which has a hose interface portion 918 (e.g., including barbed exterior surface) for insertion and retention into a hose 920 as shown in FIG. 56, is provided with at least one slot complementary to the pin(s) 916 (e.g., diametrically opposed pair(s) of slots 924 as shown). Each slot 924 is a bayonet-type slot having an approximately 90-degree slot configuration for reception of one of the pins 916 in an axial entry direction, followed by a circumferential coupling direction. Each slot 924 includes an inlet portion 924A for receiving the pin 916 in the initial axial coupling direction, prior to rotation for securement. The inlet portions 924A are provided at a distal end 928 of the hose connector 908 and extend axially therefrom. Further details of the slots 924 are described with reference to the detail view of FIG. 59, along with FIG. 56. From the inlet portion 924A, each slot 924 includes a connector portion 924B having a directional component extending circumferentially toward a seat or receiving pocket 924C for holding the pin 916 in a secured position. The connector portion 924B can be at least partially defined by a first ramp comprising a flat ramp surface 930. The ramp surface 930 can be less steep in angle than a back-side ramp surface 932 leading from the first ramp surface 930 to the receiving pocket 924C.

In particular, a first angle $\theta_1$ is defined by the ramp surface 930 with respect to a reference plane P9 defined by the distal end 928 of the hose connector 908. The first angle $\theta_1$ can be substantially less than a second angle $\theta_2$ defined by the back-side ramp surface 932 with respect to the reference plane P9. For example, the second angle $\theta_2$ can be at least 1.5 times, or at least 2 times the first angle $\theta_1$. In some constructions, the second angle $\theta_2$ is at least 2 times the first angle $\theta_1$ and not more than 3 times the first angle $\theta_1$. In some constructions, inclusive of the illustrated construction, the second angle $\theta_2$ is over 30 degrees, and the first angle $\theta_1$ is under 30 degrees. Thus, speaking strictly to assembly and disassembly by the exertion of relative rotation or torque (not including applied axial force), assembly torque to seat the pins 916 can be less than a disassembly torque to unseat the pins 916 (e.g., 20 percent, 30 percent, 50 percent reduction or more) for a given compression seal 904, which is arranged to require a predetermined amount of elastic compression against an end surface 940 of the connector piece during both assembly and disassembly. This means that the user can more readily attach the coupling than detach it by exerting rotational force. In fact, the mechanical advantage discrepancy may make it possible for the average user to be able to engage the coupling by exerting only a rotational torque by hand, while it may be impossible for the average user to be able to disengage the coupling by exerting only a counter-rotational torque by hand. This greatly improves the security of the joint against nuisance uncoupling without necessitating fasteners or the use of tools. It is also explicitly noted that the second angle $\theta_2$ can be 90 degrees (perpendicular to the plane P9 and aligned with the central conduit axis), or over 90 degrees (i.e., such that the back-side ramp surface 932 is "backswept" to extend down and to the left from the ramp surface 930 in FIG. 59, rather than down and to the right). Such configurations actually demand a separate axial compression force in addition to a disengaging torque, as disengaging torque alone does not result in the application of an axial compression force.

Further, each of the pins 916 has a cross-section shape that is not a circle, as is most common in most conventional couplings. In fact, the pins 916 may be non-round in cross-section (i.e., having a shape not conforming to a circle, oval, ellipse, or combinations thereof). For example, each of the pins 916 can have a cross-section shape that includes at least one flat surface and one or more edges or corners. For example, the illustrated pins 916 include a flat or planar surface 944A that lies against the flat or planar back-side ramp surface 932 when the pin 916 is seated in the receiving pocket 924C. Another portion 944B of the pin 916, which may optionally be curved or formed to include one or more flat surfaces, can directly abut a complementary-shaped base surface of the slot 924, which together with the back-side ramp surface 932 forms the receiving pocket 924C. Because the flat shape of the back-side ramp surface 932 matches the shape of the pin portion surface 944B, these may be referred to as a surface-matched pair. In fact, multiple surface portions of the receiving pocket 924C (or the entirety of the receiving pocket 924C) may form a surface-matched pair with the corresponding portion(s) of the pin 916.

Although the back-side ramp surface 932 is provided for translation of the pin 916 during disengagement, the rotational forces for disengagement are quite high due to the matching cross-section shapes or surfaces therebetween, and the steep angle $\theta_2$ of the back-side ramp surface 932. Thus, to effect disengagement, the user is to apply a separate axial compression force between the seed inlet 60 (or other first connector piece) and the corresponding hose connector 908 (or other second connector piece), bringing the first and second connector pieces toward one another and compressing the compression seal 904, prior to or during application of a disengagement torque. As long as the user is properly informed of the procedure, no additional hardship is enacted (e.g., such as the requirement for tools and/or additional fastening elements), and the likelihood of an unintentional disengagement is greatly reduced.

Figure 59:
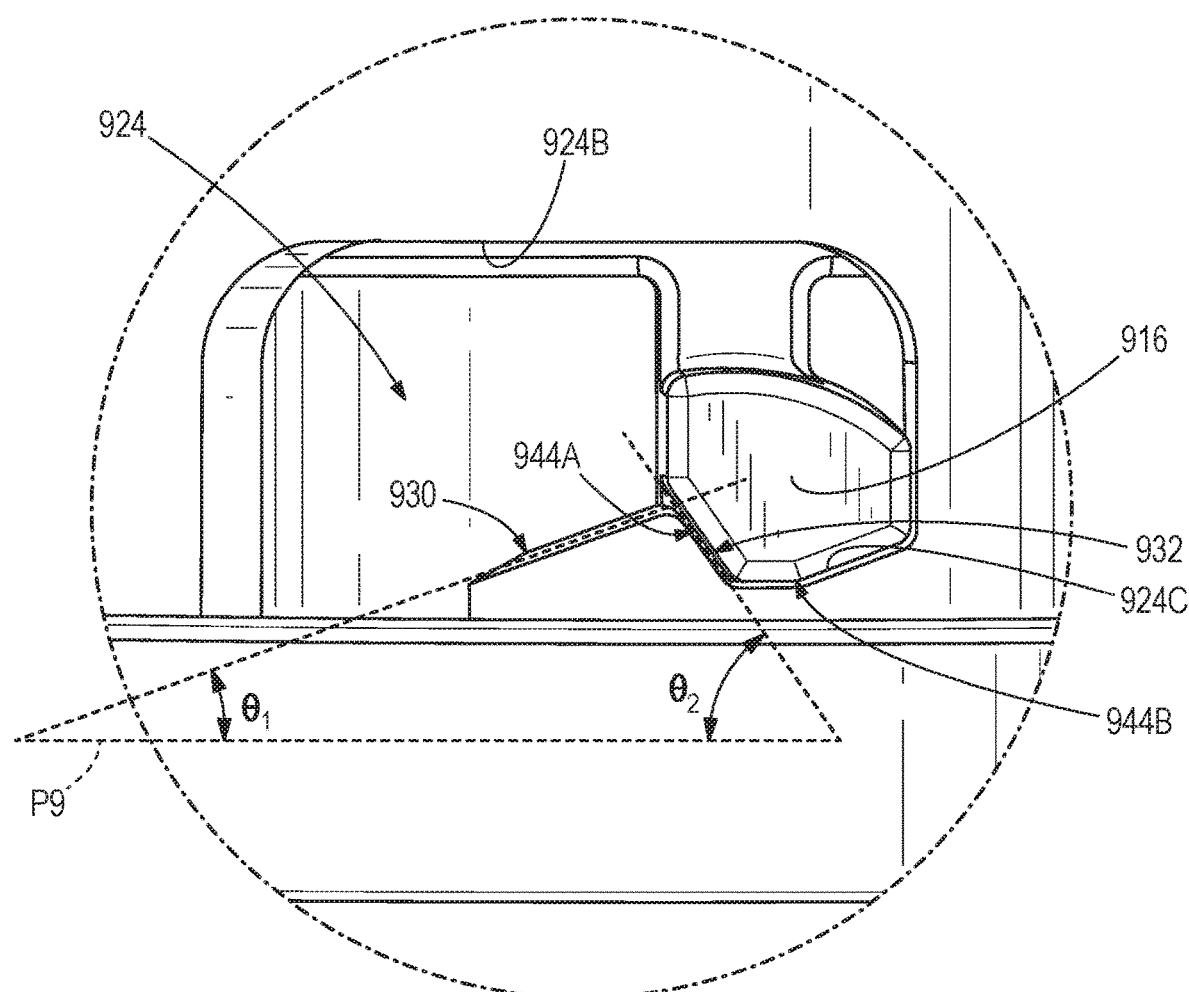
FIG. 59 is a detail view of the quick-connect coupling of FIG. 57 or FIG. 58, illustrating a pin-slot interface and ramp angles formed by the slot.

It should be noted that the features described above, which at times make specific reference to the seed inlet 60 and the hose connector 908 shown in FIGS. 57 and 59 are also applicable to other embodiments. Without duplicating the relevant description, the features described above with respect to the pins 916 and the slots 924 may also apply to other combinations of connector pieces. For example, the jumper seed outlet 60A has the same arrangement of pins 916 as provided on the seed inlet 60 and discussed above. Further, a plug connection piece 950 (FIG. 58) has the same arrangement of slots 924 as the slots 924 formed on the hose connector 908. The plug connection piece 950 can be an optional accessory for the seed meter 44 or other device, that caps off or closes the conduit formed by the complementary connector piece (in the illustrated case the seed inlet 60) when not necessary to flow air or commodity through it. Though not shown, the plug connection piece 950 also includes the compression seal 904 as in the hose connector 908. However, in other constructions, the compression seal 904 or similar component(s) may be incorporated into the opposite connector piece (i.e., the connector pieces having the pins 916, such as the seed inlet 60, the jumper seed outlet 60A, or the air outlet 80). Furthermore, it is conceived that the pins 916 and the slots 924 may be exchanged, partially or fully, so that the connector pieces having the pins 916 as illustrated will include one or more slots 924, and the connector pieces having the slots 924 as illustrated will include one or more pins 916. Although disclosed in the context of an agricultural work vehicle, and more particularly connections for a seed meter, features of the tool-less coupling structures disclosed may find use in a variety of other fields of use. Even within agricultural work vehicles, the disclosed coupling structures may find application in any one or more of: seed hose couplings, air pressure hose couplings (pressure or vacuum meter), and fertilizer hose couplings, among others.

Figure 60:
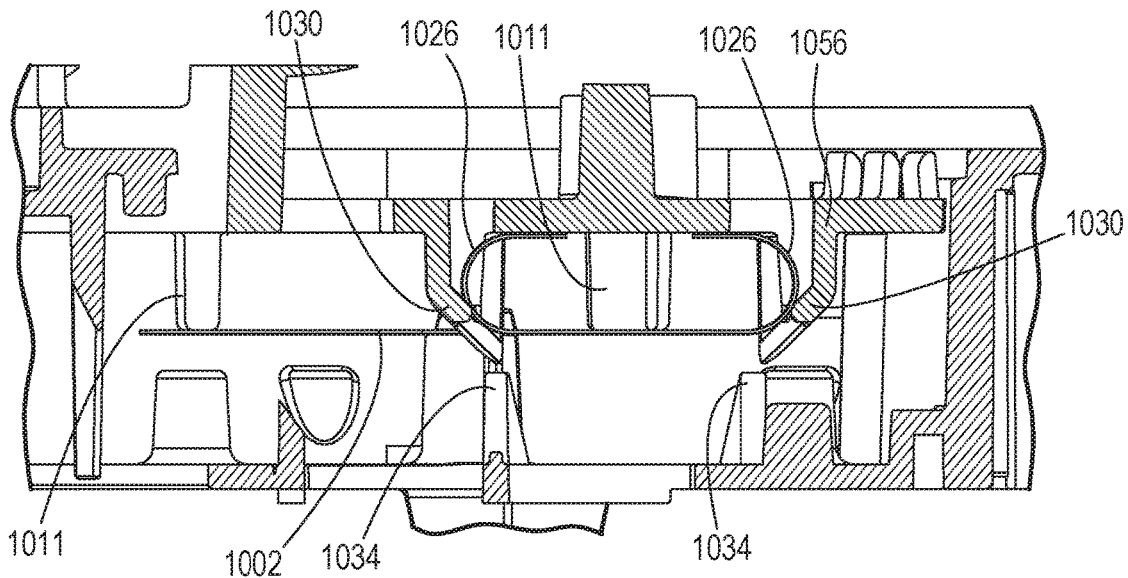
FIG. 60 is a cross-section of a seed meter housing and seed singulator according to another embodiment of the present disclosure.
Figure 61:
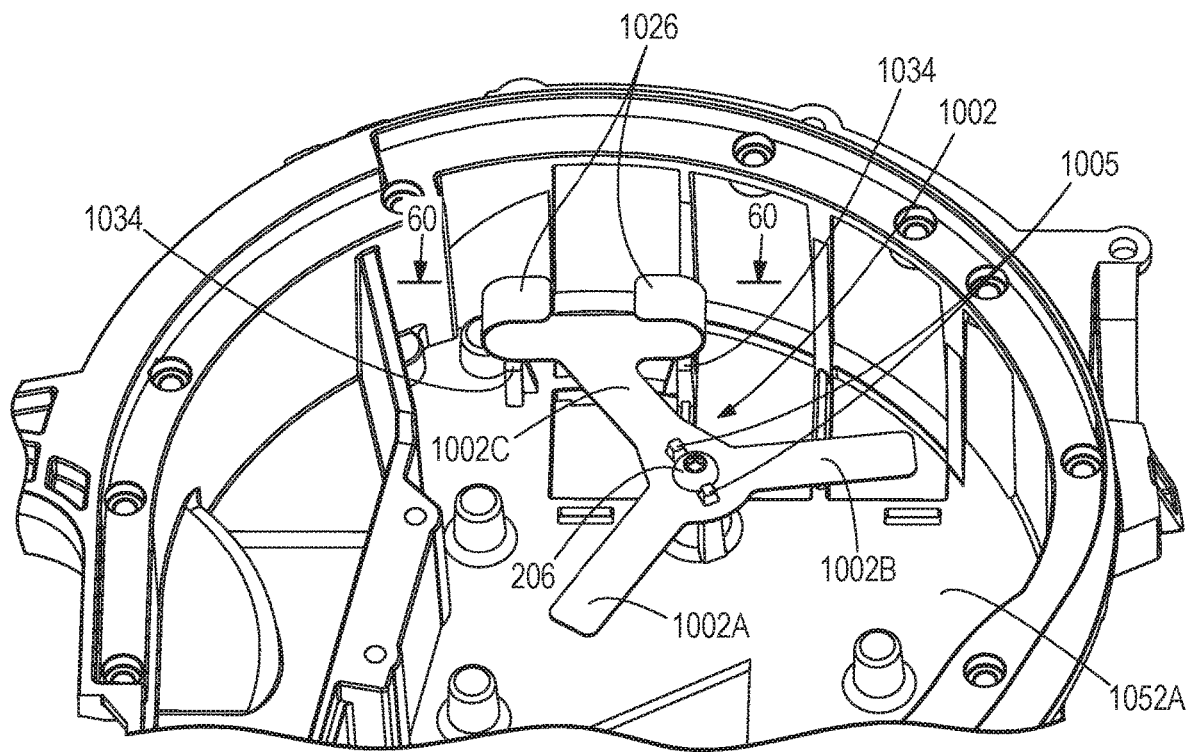
FIG. 61 is a perspective view of a biasing spring for the seed singulator positioned in the seed meter housing of FIG. 60.
Figure 62:
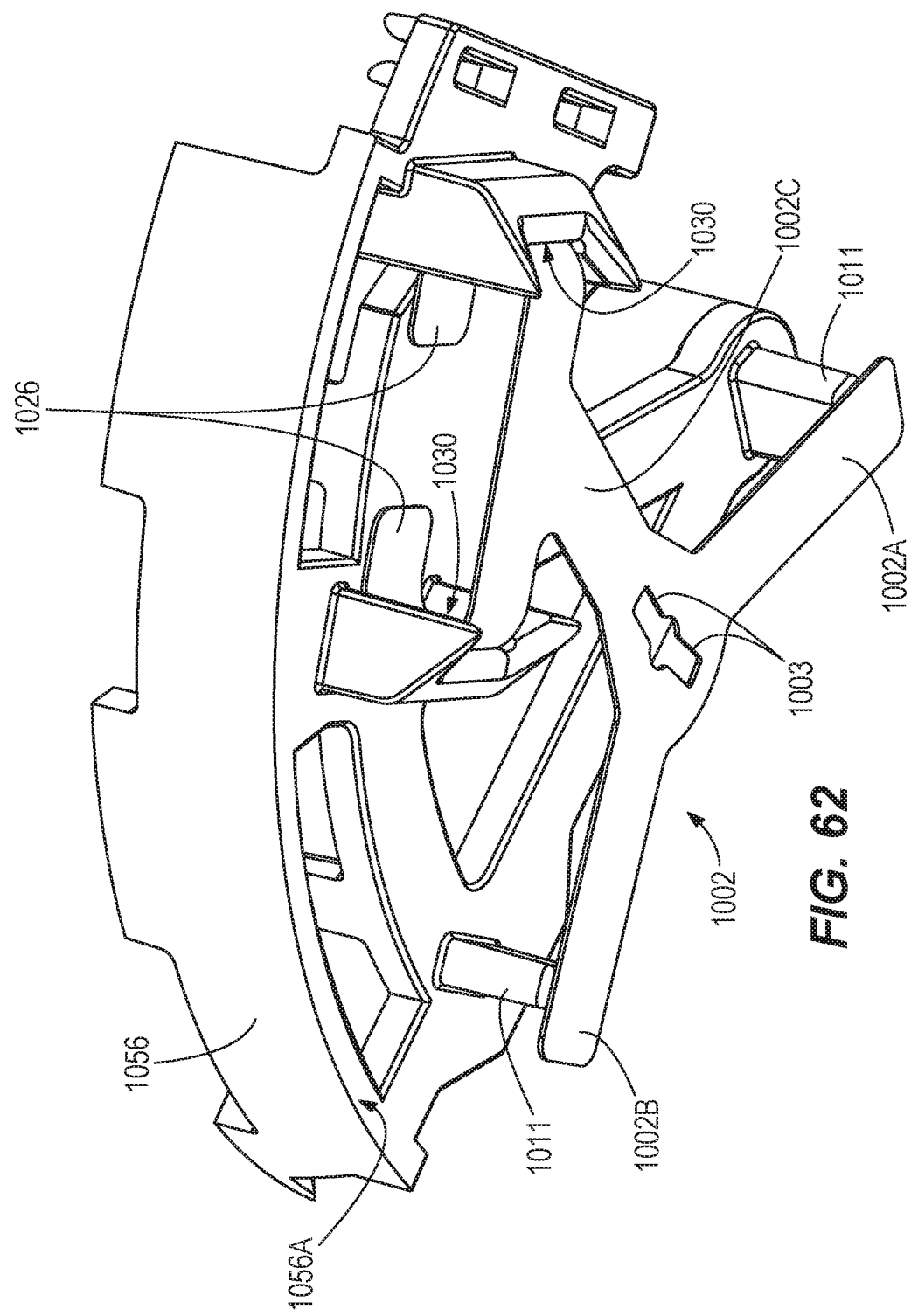
FIG. 62 is a perspective view of the seed singulator assembled with the spring of FIGS. 60-61.
Figure 63:
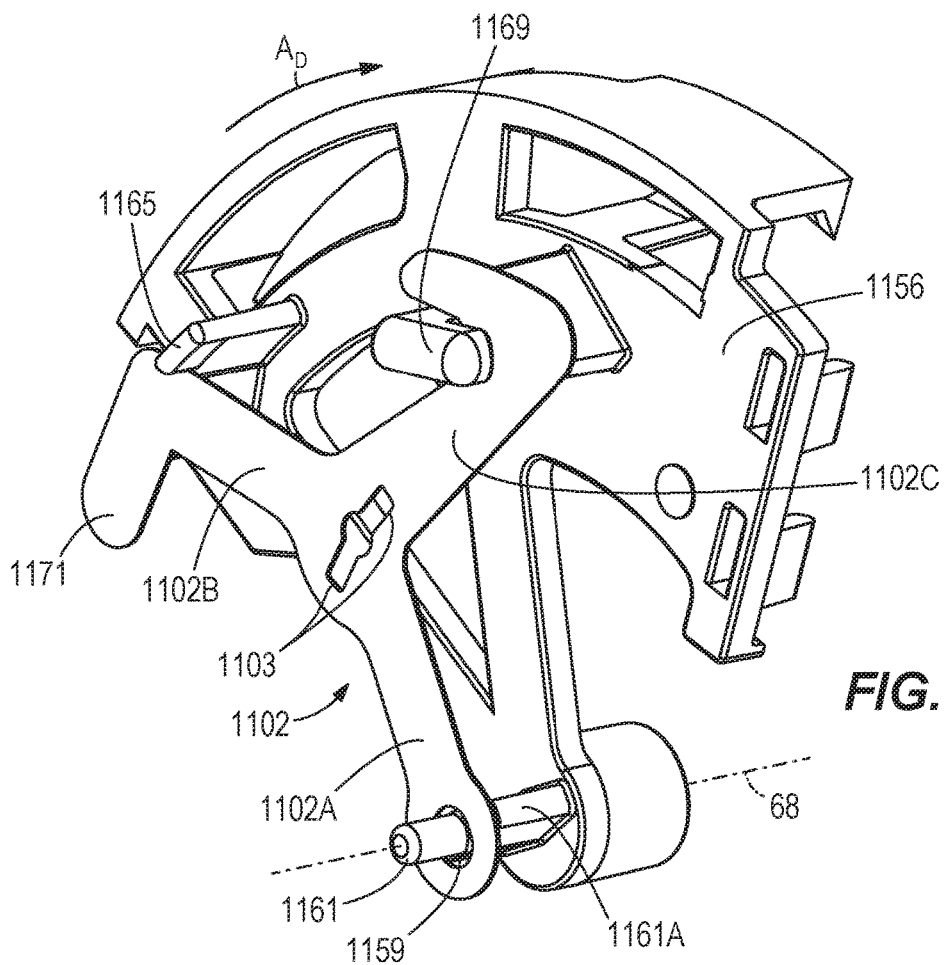
FIG. 63 is a perspective view of a biasing spring and seed singulator according to another embodiment of the present disclosure.
Figure 64:
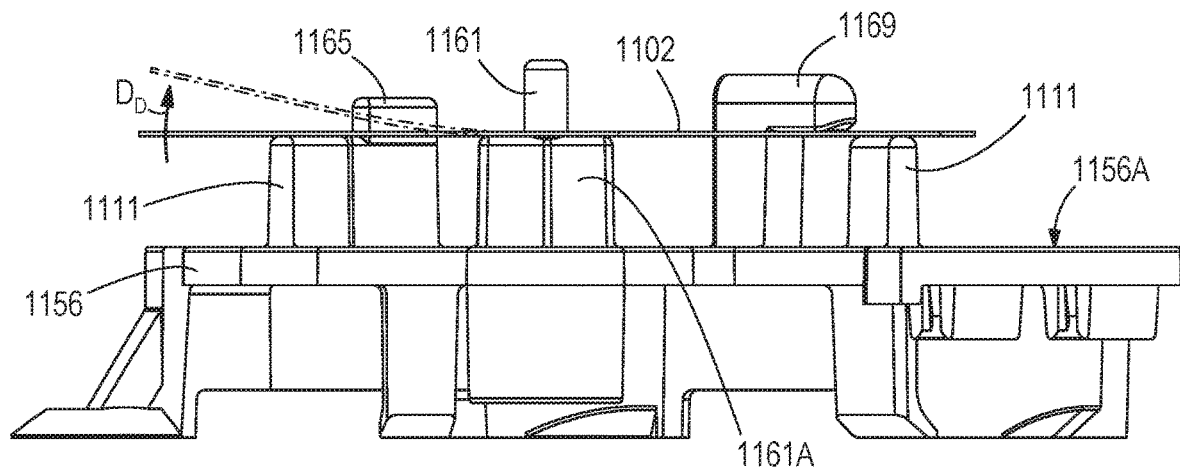
FIG. 64 is a bottom view of the biasing spring and seed singulator of FIG. 63.

FIGS. 60-62 illustrate a singulator 1056 according to another embodiment of the disclosure. Each of the singulator 1056, the cooperating biasing spring 1002, and the cooperating seed meter front housing 1052A have variations in form and function compared to those illustrated in FIGS. 7-15 and described in the preceding text. However, many features and functions are retained and thus, the following description focuses on the specific variations, while reference is made to the preceding description for features that are not specifically modified. Initially, it is noted that the biasing spring 1002 is not provided with the opening 242 for the positioning pin 238, which also is not present in the front housing 1052A. Rather, the orientation of the biasing spring 1002 with respect to the front housing 1052A is provided by one or more notches 1003 (e.g., extended cutout(s) adjacent the central fastening aperture of the biasing spring 1002) and one or more cooperating posts 1005 of the front housing 1052A that engage into the notch(es) 1003 when in the assembled position. Thus, the position of the biasing spring 1002 can be reliably controlled, despite the biasing spring 1002 being secured by a single fastener 206 to the front housing 1052A. The notch(es) 1003 and the post(s) 1005 may be reversed in other constructions. Further, the backstop 234 of the front housing 52A (centrally located between the prongs 226, FIG. 9) is removed in favor of a pair of backstops 1034 that are spaced apart to overlie the biasing spring wings or prongs 1026 (of the third arm 1002C) and also the corresponding recesses or pockets 1030 of the singulator 1056. As such, during assembly of the singulator 1056 onto the pre-assembled biasing spring 1002 in the front housing 52A, each spring prong 1026 is more directly backed-up or supported for obtaining a reliable engagement of the prongs 1026 into the pockets 1030, rather than simply deflecting the prongs 1026 of the biasing spring 1002, although inward deflection of the prongs 1026 toward each other occurs in order to seat the prongs 1026 into their respective pockets 1030. Finally, it is noted that the remaining arms 1002A, 1002B of the biasing spring 1002 are flat and not bent or contoured to reach toward the singulator back side 1056A. Rather, the singulator 1056 is formed with extensions or protrusions 1011 that extend from the back side 1056A to reach toward the plane defined by the spring arms 1002A-C. As such, the biasing spring 1002 is entirely flat or planar, with the exception of the prongs 1026.

FIGS. 63-66 illustrate a singulator 1156 according to another embodiment of the disclosure. Each of the singulator 1156, the cooperating biasing spring 1102, and the cooperating seed meter front housing 1152A have variations in form and function compared to those illustrated in FIGS. 7-15, or FIGS. 60-62 and described in the preceding text. However, many features and functions are retained and thus, the following description focuses on the specific variations, while reference is made to the preceding description for features that are not specifically modified. Initially, it is noted that the biasing spring 1102 is not provided with prongs and the singulator 1156 is not provided with snap-in recesses for such prongs. In fact, the singulator 1156 of FIGS. 63-66 is not assembled to the biasing spring 1102 in a direction parallel to the central axis 68. As discussed below, the assembly of the singulator 1156 to the biasing spring 1102 may occur in a direction perpendicular to the central axis 68, or particularly, a circumferential direction about the central axis 68. As such, there is no need for backstops 234, 1034, and such features are not present in the front housing 1152A. Orientation of the biasing spring 1102 with respect to the front housing 1152A is provided by one or more notches 1103 (e.g., extended cutout(s) adjacent the central fastening aperture of the biasing spring 1002) and cooperating post(s) 1105 (FIG. 65) of the front housing 1152A as described above. The manufacture of the biasing spring 1102 can be further simplified by eliminating all out-of-plane bends, resulting in the biasing spring 1102 having a planar construction throughout all three arms 1102A-C. However, each of the arms 1102A-C incorporates additional features to facilitate assembly and removal of the singulator 1156 onto the biasing spring 1102. First, along the central axis 68, an opening 1159 is formed in the first spring arm 1102A to receive a locating pin 1161 that extends from the singulator back side 1156A. The locating pin 1161 extends from a singulator protrusion 1161A that acts as a standoff, providing a shoulder for limiting axial-direction movement between the singulator 1156 and the biasing spring 1102 so that the biasing spring 1102 can transfer its biasing force to the singulator 1156 through the protrusion 1161A. Similarly, the singulator 1156 is formed with extensions or protrusions 1111 that extend from the back side 1156A to contact the spring arms 1102B, 1102C. In fact, as with other embodiments, the spring arms 1102A-C are deflected, upon installation of the seed meter disk 54, from the point of fixture of the biasing spring 1102 to the front housing 1152A (e.g., fastener 206) to allow biasing force to be applied to the singulator 1156 for pressing it against the seed meter disk 54. This is accomplished in this particular embodiment by the two protrusions 1111 and the protrusion 1161A.

Figure 65:
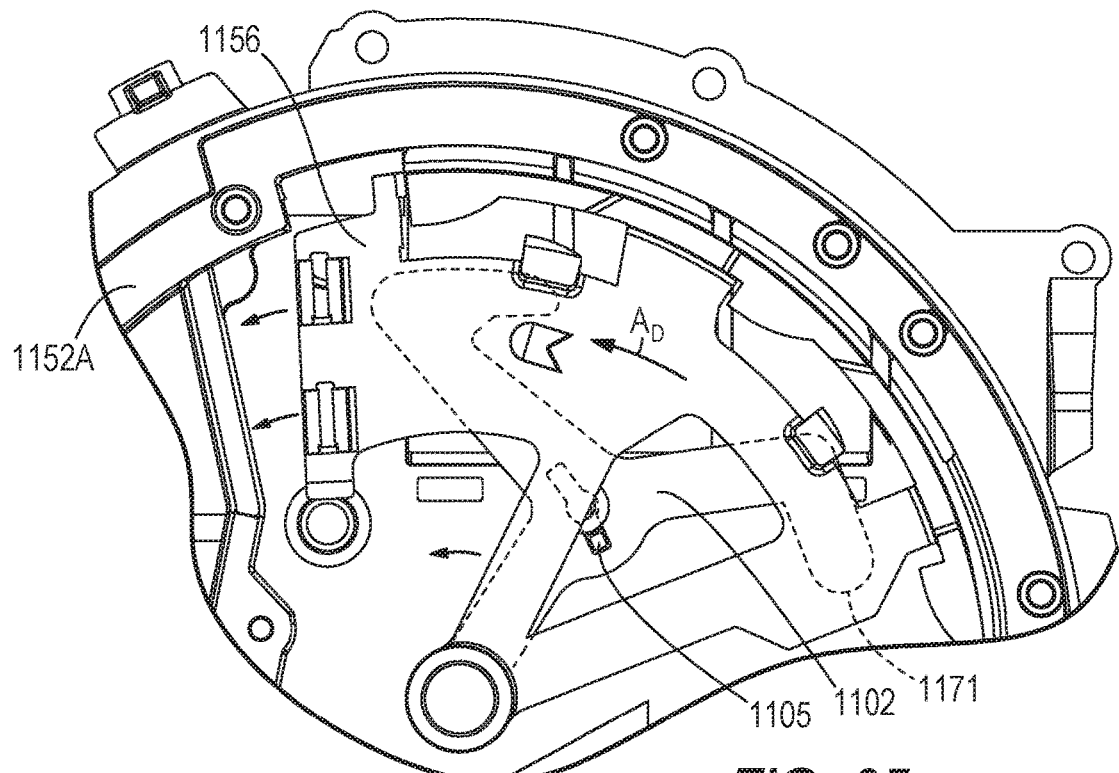
FIG. 65 is a front view of the seed singulator of FIGS. 63-64 in a pre-assembly position with respect to the biasing spring and seed meter housing.
Figure 66:
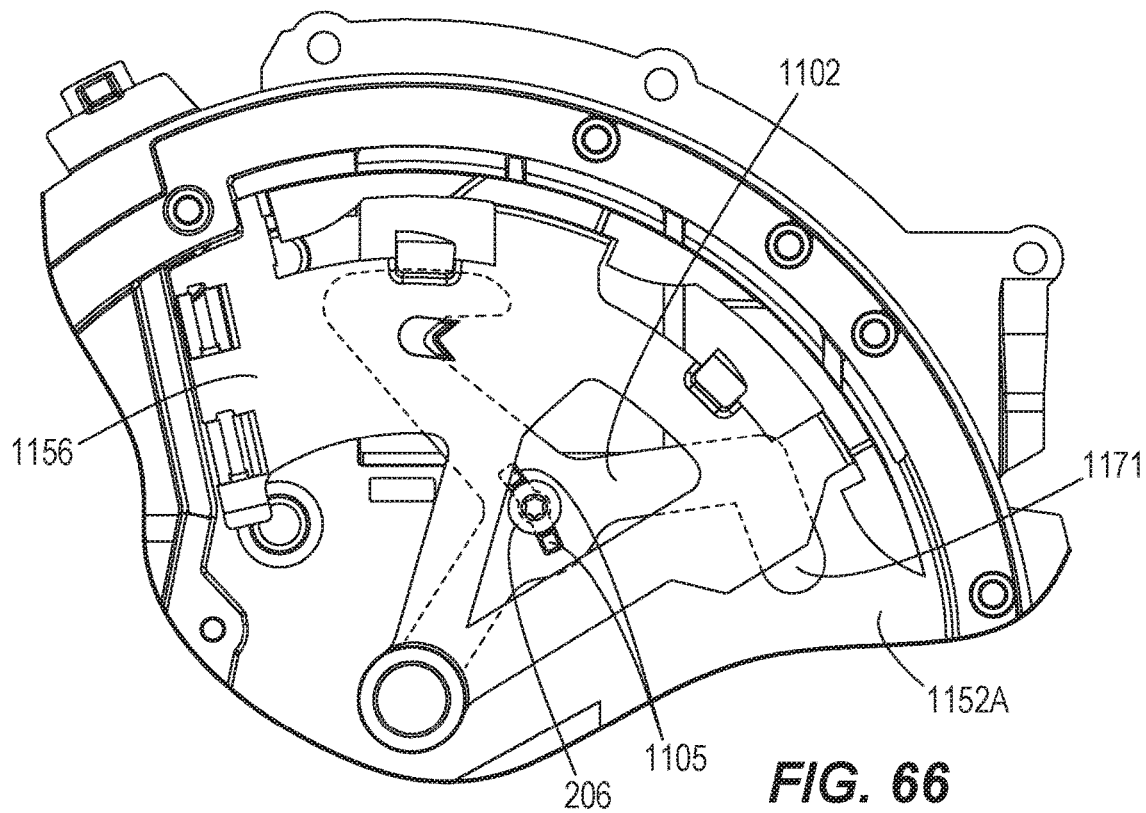
FIG. 66 is a front view of the seed singulator of FIGS. 63-65 in an assembled position with respect to the biasing spring and seed meter housing.

With respect to FIGS. 65 (pre-assembly) and 66 (assembled), it is noted that the biasing spring 1102 is first secured to the front housing 1152A, and then the singulator 1156 is installed to the biasing spring 1102 by inserting the pin 1161 through the opening 1159 at a first rotational angle about the central axis 68 and then rotating the singulator 1156 with respect to the biasing spring 1102 about the central axis 68 to a final rotational angle. In doing so, the singulator 1156 automatically snaps into engagement with the biasing spring 1102. This engagement is accomplished by a bumper step 1165 of the singulator 1156, which in this construction is formed integrally as an extension with one of the protrusions 1111. In the first rotational angle, prior to final assembly, the bumper step 1165 overlaps with the second spring arm 1102B when viewed axially. Further, the bumper step 1165 extends axially even further beyond the protrusions 1111. Thus, pressing the biasing spring 1102 into place axially causes a deflection of the second spring arm 1102B (an amount greater than the operating amount). The assembly rotation in the direction $A_D$ brings the bumper step 1165 out of alignment with the second spring arm 1102B, allowing the second spring arm 1102B to seat axially against the protrusion 1111. Optionally, a side edge of the second spring arm 1102B may be seated against a side edge of the bumper step 1165. During the assembly rotation, a protruding hook 1169 of the singulator 1156 hooks behind the third spring arm 1102C. The protruding hook 1169 is positioned to limit the amount of available assembly rotation of the singulator 1156 with respect to the biasing spring 1102. The hook 1169 also prevents the singulator 1156 from unintentionally axially sliding off the biasing spring 1102 when the seed meter is opened. Optionally, the end of the third spring arm 1102C may also be shaped as a hook. In any case, the assembly results in the singulator 1156 being rotationally trapped to the desired orientation with respect to the biasing member 1102 by the bumper step 1165, the hook 1169, and the second and third spring arms 1102B, 1102C. In order to remove the singulator 1156 from the biasing spring 1102, the singulator 1156 is rotated opposite the assembly direction $A_D$. However, this first requires that the second spring arm 1102B is deflected back in the direction $D_D$ (FIG. 64) so that the bumper step 1165 can pass under the spring arm 1102B without blocking rotation of the singulator 1156. For this purpose, the second spring arm 1102B can be provided with a planar extending tab 1171 to improve access when assembled (FIG. 66).

Figure 67:
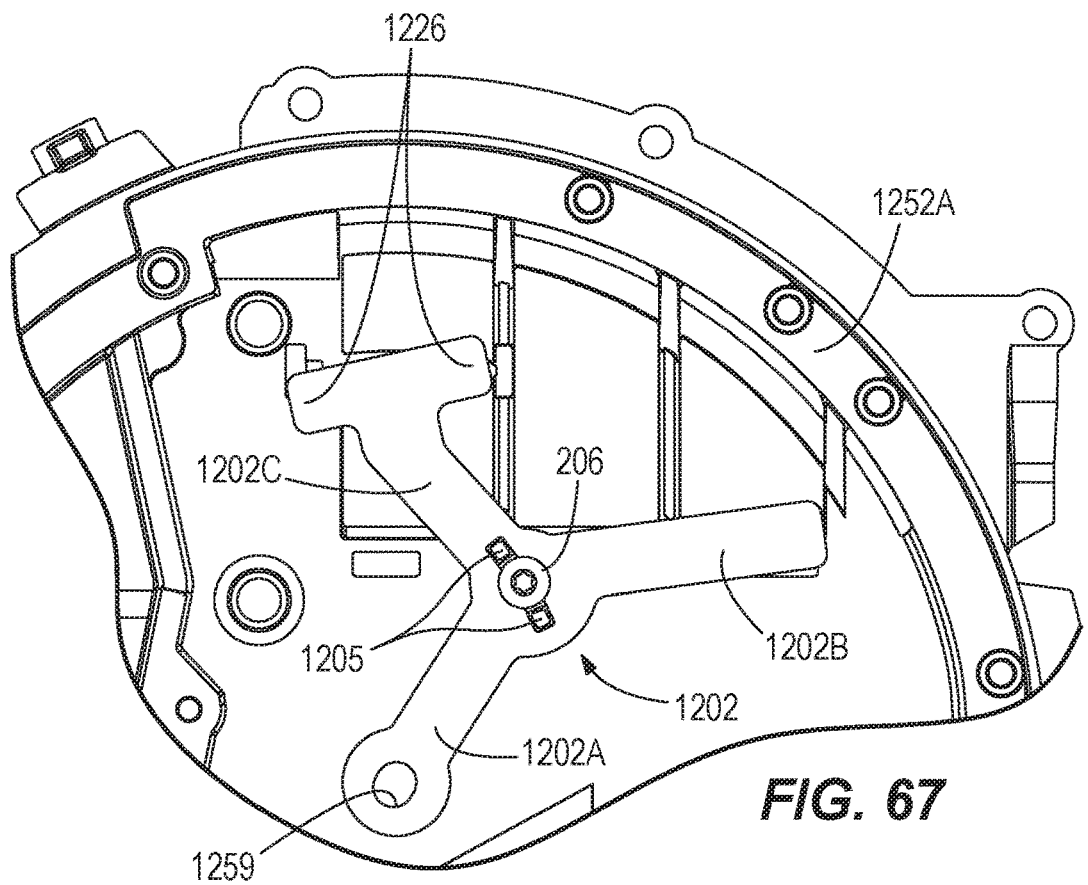
FIG. 67 is a front view of a biasing spring in a seed meter housing for a seed singulator according to another embodiment of the present disclosure.
Figure 68:
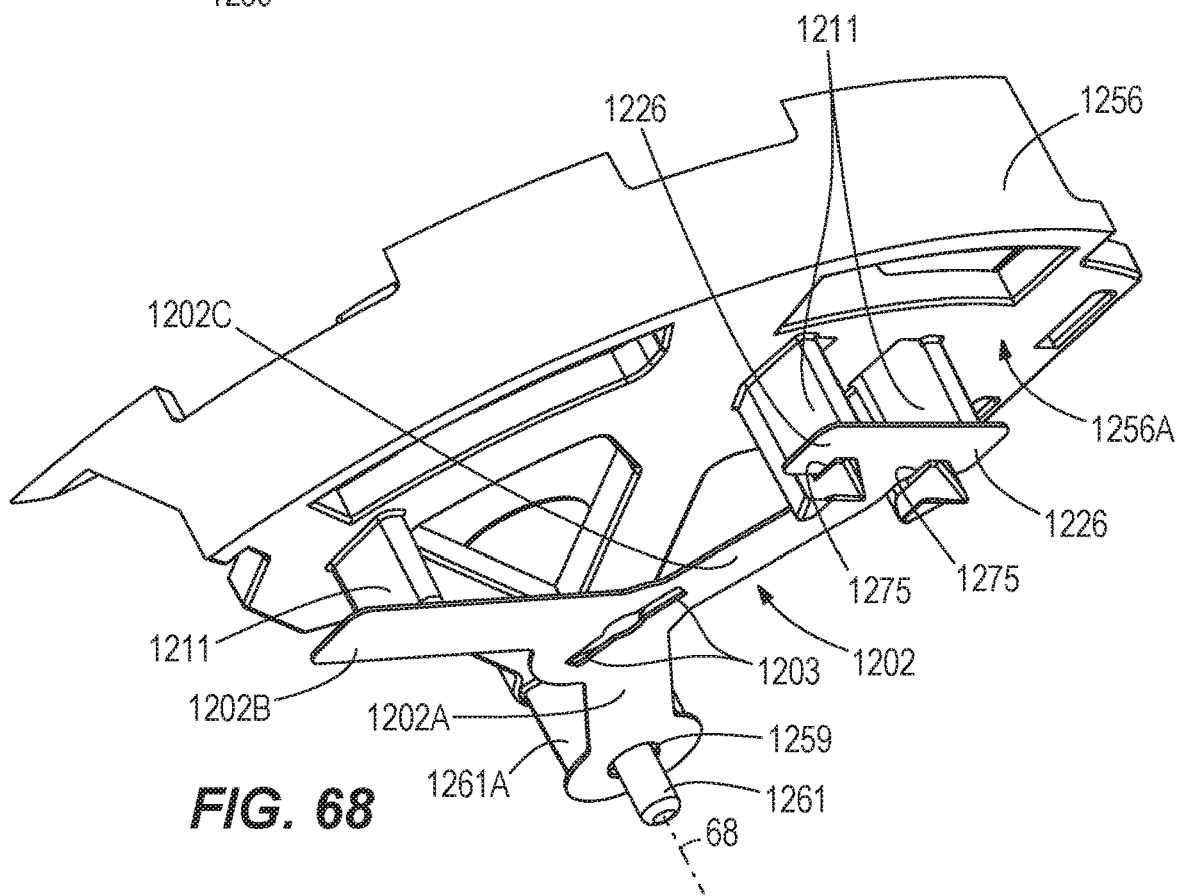
FIG. 68 is a perspective view of the biasing spring of FIG. 67 assembled with a seed singulator.
Figure 69:
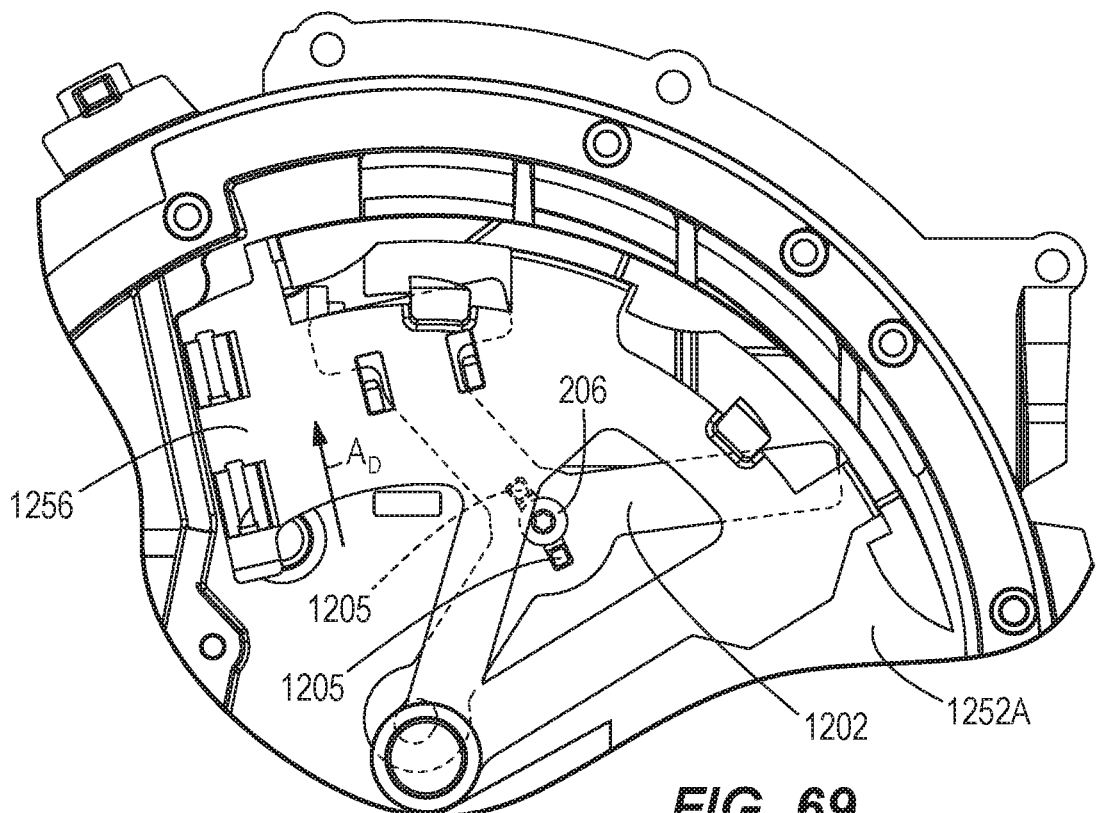
FIG. 69 is a front view of the seed singulator of FIG. 68 in a pre-assembly position with respect to the biasing spring and seed meter housing.
Figure 70:
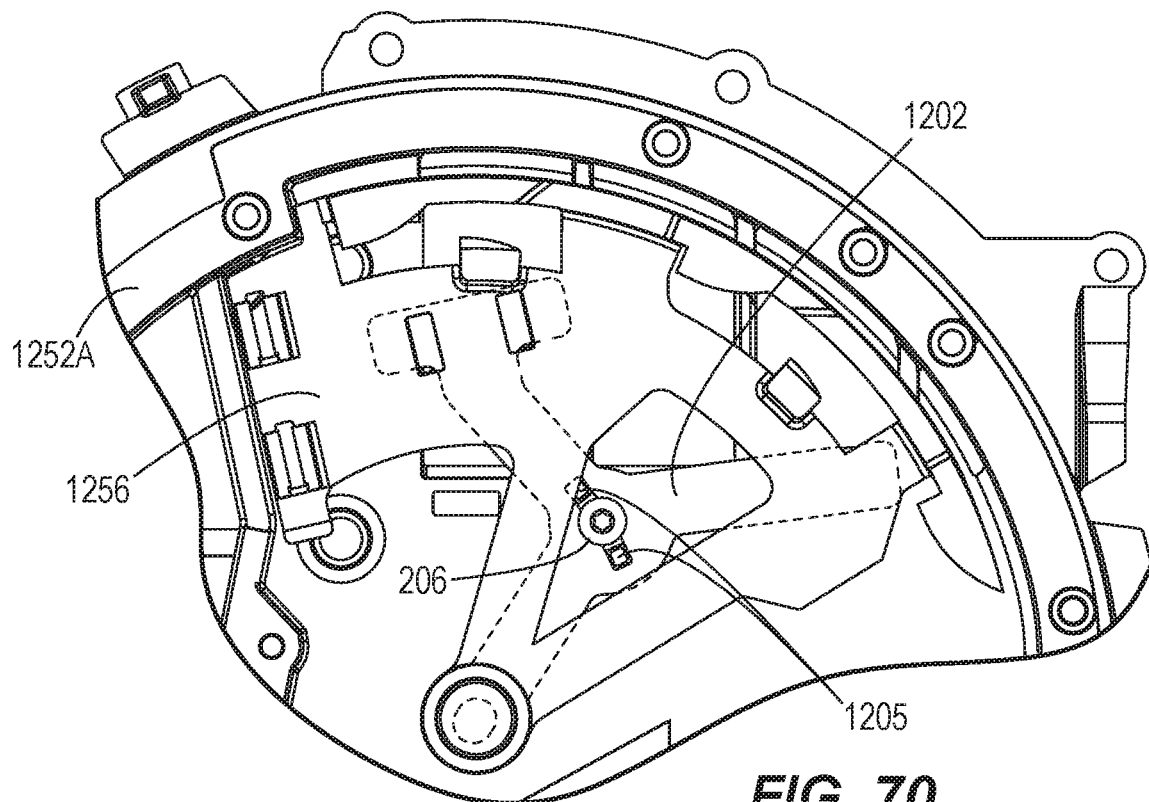
FIG. 70 is a front view of the seed singulator of FIGS. 68-69 in an assembled position with respect to the biasing spring and seed meter housing.

FIGS. 67-70 illustrate a singulator 1256 according to another embodiment of the disclosure. Each of the singulator 1256, the cooperating biasing spring 1202, and the cooperating seed meter front housing 1252A have variations in form and function compared to those illustrated in FIGS. 7-15, FIGS. 60-62, and FIGS. 63-66, and described in the preceding text. However, many features and functions are retained and thus, the following description focuses on the specific variations, while reference is made to the preceding description for features that are not specifically modified. Initially, it is noted that the biasing spring 1202 is provided with one or more notches 1203 (e.g., extended cutout(s)) adjacent the central fastening aperture of the biasing spring 1202) for orienting the biasing spring 1202 by cooperating with one or more posts 1205 of the front housing 1252A, as described above. Along the central axis 68, at the end of the first spring arm 1202A, an opening 1259 receives the pin 1261 of the singulator 1256, similar to that of FIGS. 63-66. The pin 1261 extends from a singulator protrusion 1261A that acts as a standoff, providing a shoulder for contact with the first spring arm 1202A. Furthermore, because the biasing spring 1202 is flat throughout and not bent or contoured, the singulator 1256 is formed with one or more extensions or protrusions 1211 that extend from the back side 1256A to reach toward the ends of the second and third spring arms 1202B, 1202C. It is shown in FIGS. 67 and 68 that the third spring arm 1202C can be formed with one or more wings 1226 that extend transversely from the direction of extension of the third spring arm 1202C. As shown, the end of the third spring arm 1202C is formed in a T-shape with two oppositely-extending wings 1226. The singulator protrusions 1211 for the third arm 1202C are formed with cooperating slots 1275 that receive the wings 1226. The slots 1275 receive the wings 1226 with little or no axial direction clearance, and are not open for assembly in a direction parallel to the central axis 68. As shown in FIG. 69 (pre-assembly) and FIG. 70 (assembled), the assembly direction $A_D$ for the singulator 1256 is radially outward (e.g., purely radially or at least having a radially outward component). As such, assembly of the singulator 1256 to the pre-installed biasing spring 1202 includes assembling the singulator 1256 in a first, pre-assembly position whereby the pin 1261 extends through the opening 1259, with clearance, and whereby the singulator 1256 is offset in a radial direction from the final assembly position. From here, the singulator 1256 is slid (e.g., radially outwardly) along the assembly direction $A_D$ to engage the wings 1226 into the slots 1275. Removal of the singulator 1256 requires sliding in a direction opposite the assembly direction $A_D$ before the singulator 1256 can be axially pulled away from the biasing spring 1202.

What is claimed is:

1. A seed metering system for metering a plurality of seeds, the seed metering system comprising:
   a meter housing having a first side and a second side, wherein a seed inlet is positioned at the first side and an aperture is positioned at the second side;
   a hub mounted within the aperture;
   a retaining member located at the hub, and
   a metering member positioned on the hub;
   wherein the metering member compressively engages the retaining member.

2. The seed metering system of claim 1, wherein the hub is rotatably mounted within the aperture and the metering member is rotatable with the hub.

3. The seed metering system of claim 1, wherein the hub includes an annular channel, and wherein the retaining member is a resilient retaining member positioned within the annular channel.

4. The seed metering system of claim 3, wherein the hub includes a head having a tapered nose and a cylindrical portion adjacent the tapered nose, and wherein the annular channel is located in the cylindrical portion.

5. The seed metering system of claim 3, wherein the resilient retaining member is one of an elastomeric O-ring or a metal C-ring.

6. The seed metering system of claim 1, wherein the metering member includes a front side for receiving at least some of the plurality of seeds and a rear side opposite the front side, wherein the hub abuts the rear side of the metering member.

7. The seed metering system of claim 6, wherein the metering member includes an aperture, wherein the hub is configured to extend through the aperture of the metering member, and wherein the retaining member is configured to engage the aperture of the metering member when the hub abuts the rear side of the metering member.

8. The seed metering system of claim 1, wherein the metering member includes a front side for receiving at least some of the plurality of seeds, a rear side opposite the front side, and an aperture extending between the front side and the rear side, wherein the aperture increases in diameter from the rear side of the metering member to the front side of the metering member.

9. The seed metering system of claim 8, wherein the retaining member is deformable within the aperture.

10. The seed metering system of claim 1, wherein the metering member is a seed disk having a plurality of seed openings, the seed metering system further comprising a singulator positioned adjacent to the seed disk.

11. The seed metering system of claim 1, wherein the retaining member is a spring biased plunger.

12. The seed metering system of claim 1, wherein the retaining member is a ball.

* * * * *